(12) United States Patent
Ikegami et al.

(10) Patent No.: US 8,991,201 B2
(45) Date of Patent: Mar. 31, 2015

(54) EJECTOR CYCLE SYSTEM

(75) Inventors: Makoto Ikegami, Anjo (JP); Hiroshi Oshitani, Toyoto (JP); Etsuhisa Yamada, Kariya (JP); Naohisa Ishizaka, Okazaki (JP); Hirotsugu Takeuchi, Nagoya (JP); Takeyuki Sugiura, Anjo (JP); Takuo Maehara, Toyohashi (JP)

(73) Assignee: Denso Corporation, Kariya (JP)

( * ) Notice: Subject to any disclaimer, the term of this patent is extended or adjusted under 35 U.S.C. 154(b) by 323 days.

(21) Appl. No.: 12/806,683

(22) Filed: Aug. 19, 2010

(65) Prior Publication Data

US 2010/0319393 A1    Dec. 23, 2010

Related U.S. Application Data

(62) Division of application No. 11/478,489, filed on Jun. 29, 2006, now abandoned.

(30) Foreign Application Priority Data

Jun. 30, 2005  (JP) .................................. 2005-191156
Aug. 11, 2005  (JP) .................................. 2005-233169
Aug. 18, 2005  (JP) .................................. 2005-237651

(51) Int. Cl.
F25B 39/04        (2006.01)
F25B 1/06         (2006.01)
(Continued)

(52) U.S. Cl.
CPC ................. F25B 41/00 (2013.01); F25B 9/008 (2013.01); F25B 31/002 (2013.01); F25B 40/00 (2013.01);
(Continued)

(58) Field of Classification Search
USPC .......................... 62/170, 500, 228.1, 173, 225
See application file for complete search history.

(56) References Cited

U.S. PATENT DOCUMENTS 2,512,869 A      6/1950  McBroom
4,686,835 A  *   8/1987  Alsenz ............................ 62/223
(Continued)

FOREIGN PATENT DOCUMENTS

EP    1 519 123    3/2005
JP    53-18852     2/1978
(Continued)

OTHER PUBLICATIONS

Office Action dated Oct. 23, 2009 in corresponding Chinese Application No. 2008 10131001.4.
(Continued)

*Primary Examiner* — Alexandra Elve
*Assistant Examiner* — Henry Crenshaw
(74) *Attorney, Agent, or Firm* — Harness, Dickey & Pierce, PLC

(57)  ABSTRACT

An ejector cycle system with a refrigerant cycle through which refrigerant flows includes an ejector disposed downstream of a radiator, a first evaporator that evaporates refrigerant flowing out of the ejector, a throttling unit located in a branch passage and depressurizes refrigerant to adjust a flow rate of refrigerant, and a second evaporator located downstream of the throttling unit. In the ejector cycle system, a flow ratio adjusting means adjusts a flow ratio between a first refrigerant flow amount depressurized and expanded in a nozzle portion of the ejector and a second refrigerant flow amount drawn into a refrigerant suction port of the ejector, based on a physical quantity related to at least one of a state of refrigerant in the refrigerant cycle, a temperature of a space to be cooled by the first and second evaporators, and an ambient temperature of the space.

18 Claims, 27 Drawing Sheets

(51) Int. Cl.
*F25B 41/04* (2006.01)
*F25B 41/00* (2006.01)
*F25B 31/00* (2006.01)
*F25B 9/00* (2006.01)
*F25B 40/00* (2006.01)
*F25B 49/02* (2006.01)

(52) U.S. Cl.
CPC .......... *F25B 49/02* (2013.01); *F25B 2309/061* (2013.01); *F25B 2341/0011* (2013.01); *F25B 2341/0012* (2013.01); *F25B 2400/12* (2013.01); *F25B 2500/19* (2013.01); *F25B 2600/023* (2013.01); *F25B 2600/112* (2013.01); *F25B 2600/2513* (2013.01); *F25B 2700/19* (2013.01); *F25B 2700/1933* (2013.01); *F25B 2700/2102* (2013.01); *F25B 2700/21151* (2013.01); *Y02B 30/743* (2013.01)
USPC .................. 62/191; 62/183; 62/223; 62/500

(56) References Cited

U.S. PATENT DOCUMENTS

| | | | |
|---|---|---|---|
| 6,360,552 | B1 | 3/2002 | Lee et al. |
| 6,477,857 | B2* | 11/2002 | Takeuchi et al. ................ 62/500 |
| 6,574,987 | B2 | 6/2003 | Takeuchi et al. |
| 6,675,609 | B2 | 1/2004 | Takeuchi et al. |
| 6,698,221 | B1* | 3/2004 | You .............................. 62/196.4 |
| 6,920,922 | B2 | 7/2005 | Takeuchi |
| 6,964,178 | B2* | 11/2005 | Aikawa et al. ................. 62/434 |
| 7,178,359 | B2* | 2/2007 | Oshitani et al. ................ 62/500 |
| 7,367,200 | B2 | 5/2008 | Ikegami et al. |
| 2001/0054293 | A1* | 12/2001 | Gustafson et al. ............. 62/183 |
| 2002/0000095 | A1 | 1/2002 | Takeuchi et al. |
| 2003/0131611 | A1 | 7/2003 | Oshitani et al. |
| 2003/0221445 | A1* | 12/2003 | Smolinsky ..................... 62/498 |
| 2004/0040340 | A1* | 3/2004 | Takeuchi et al. ............... 62/500 |
| 2004/0079102 | A1 | 4/2004 | Umebayashi et al. |
| 2004/0206111 | A1* | 10/2004 | Ikegami et al. ................ 62/500 |
| 2004/0211199 | A1 | 10/2004 | Ozaki et al. |
| 2004/0255610 | A1* | 12/2004 | Nishijima et al. ............. 62/500 |
| 2005/0011221 | A1* | 1/2005 | Hirota ........................... 62/500 |
| 2005/0126193 | A1 | 6/2005 | Lifson et al. |
| 2005/0178150 | A1 | 8/2005 | Oshitani et al. |
| 2005/0268644 | A1 | 12/2005 | Oshitani et al. |
| 2006/0065011 | A1* | 3/2006 | Komatsu et al. ............... 62/468 |

FOREIGN PATENT DOCUMENTS

| | | | | |
|---|---|---|---|---|
| JP | 03-005674 | | 1/1991 | |
| JP | 04-316962 | | 11/1992 | |
| JP | H05-312421 | * | 5/1993 | |
| JP | 05-312421 | | 11/1993 | |
| JP | 05312421 | A * | 11/1993 | ............... F25B 5/04 |
| JP | 6-109338 | | 4/1994 | |
| JP | 9-318169 | | 12/1997 | |
| JP | 10-68553 | | 3/1998 | |
| JP | 2001-147050 | | 5/2001 | |
| JP | 2001-153473 | | 6/2001 | |
| JP | 2002-022295 | | 1/2002 | |
| JP | 2002-318018 | | 10/2002 | |
| JP | 2003-097868 | | 4/2003 | |
| JP | 2003-106687 | | 4/2003 | |
| JP | 2004-142506 | | 5/2004 | |
| JP | 2004-257694 | | 9/2004 | |
| JP | 2004-340531 | | 12/2004 | |
| JP | PCT/JP2006/307092 | | 4/2006 | |
| WO | 2006/109617 | | 10/2006 | |

OTHER PUBLICATIONS

Office Action dated Apr. 14, 2010 in corresponding U.S. Appl. No. 11/478,489.
Office Action dated Mar. 25, 2010 in corresponding Chinese Application No. 2008 10190346.7 with English translation.
Office Action dated Aug. 4, 2009 in corresponding U.S. Appl. No. 11/478,489.
Notice of Reason of Refusal dated Nov. 20, 2008 in corresponding Japanese Application No. 2008-259313.
Office Action dated Jun. 24, 2010 from corresponding U.S. Appl. No. 12/315,960.
Office Action dated Oct. 13, 2010 in corresponding U.S. Appl. No. 12/315,960.
Office action dated Mar. 15, 2011 in corresponding Japanese Application No. 2006-181315.
Notice of Allowance dated Aug. 11, 2011 in corresponding U.S. Appl. No. 12/315,960.
Office Action dated Mar. 2, 2012 mailed in the corresponding Chinese Application No. 200810131001.4 with English translation.
Office Action dated Dec. 6, 2012 mailed in the corresponding JP Application No. 2006-181315 with English translation.
Office action dated Aug. 21, 2011 in corresponding Japanese Application No. 2006-181315.
Office Action dated Aug. 8, 2012 issued in corresponding Chinese Application No. 200810131001.4 with English translation.

* cited by examiner

EJECTOR CYCLE SYSTEM

CROSS REFERENCE TO RELATED APPLICATION

This application is a divisional of U.S. patent application Ser. No. 11/478,489 filed on Jun. 29, 2006 now abandoned. This application is based on Japanese Patent Applications No. 2005-191156 filed on Jun. 30, 2005, No. 2005-233169 filed on Aug. 11, 2005, and No. 2005-237651 filed on Aug. 18, 2005, the contents of which are incorporated herein by reference in its entirety.

FIELD OF THE INVENTION

The present invention relates to an ejector cycle system having an ejector that functions as a refrigerant pressure reducing means and a refrigerant circulating means.

BACKGROUND OF THE INVENTION

Ejector cycle systems provided with multiple evaporators have been conventionally known as in JP Patent No. 3322263 (corresponding to U.S. Pat. No. 6,574,987, U.S. Pat. No. 6,477,857).

As illustrated in FIG. 26, a first evaporator 16 is connected downstream of an ejector 15 with respect to a refrigerant flow. An accumulator 32 that forms a vapor-liquid separator is located downstream of the first evaporator 16 with respect to the refrigerant flow. Further, a second evaporator 20 is located between a liquid phase refrigerant outlet of the accumulator 32 and a refrigerant suction port 15b of the ejector 15. The two evaporators 16, 20 are simultaneously operated.

In this refrigerant cycle, a pressure drop caused by a high-speed flow of refrigerant as expanded is utilized to draw refrigerant that flows out of the second evaporator 20, and further, velocity energy of refrigerant as expanded is converted into pressure energy at a diffuser portion 15d (pressure increasing portion) to raise the refrigerant pressure (i.e., the inlet pressure of a compressor 11). Thus, power for driving the compressor 11 can be reduced, and the efficiency of cycle operation can be enhanced.

In this refrigerant cycle, heat absorbing (cooling) action can be produced from separate spaces by using the first evaporator 16 and the second evaporator 20, or it can be produced from one and the same space by the two evaporators 16, 20. Also, the interior of a vehicle compartment can be cooled by using the two evaporators 16, 20.

In this refrigerant cycle, refrigerant that flows out of a radiator 12 all passes through a nozzle portion 15a of the ejector 15. Here, the flow rate of refrigerant that passes through the nozzle portion 15a of the ejector 15 is referred to as Gnoz. This Gnoz is set to such a flow rate that the dryness of refrigerant on the outlet side of the first evaporator 16 becomes a predetermined value or below. The refrigerant depressurized through the nozzle portion 15a is mixed with the refrigerant drawn through the refrigerant suction port 15b of the ejector 15, and flows into the first evaporator 16. The refrigerant that flows out of the first evaporator 16 is separated into vapor phase refrigerant and liquid phase refrigerant in the accumulator 32.

The refrigerant suction port 15b of the ejector 15 is depressurized and thus produces sucking action. As a result, the second evaporator 20 is supplied with the liquid phase refrigerant separated in the accumulator 32. Here, the flow rate of refrigerant drawn through the refrigerant suction port 15b is referred to as Ge. The liquid phase refrigerant that flows into the second evaporator 20 is evaporated at the second evaporator 20. Therefore, most or all of the refrigerant drawn through the refrigerant suction port 15b is vapor phase refrigerant. Consequently, the flow rate Gnoz of liquid phase refrigerant substantially contributes to the cooling capacity of the first evaporator 16. Therefore, the cooling capacity of the first evaporator 16 is influenced by Gnoz.

By increasing the flow rate Ge of refrigerant drawn to the refrigerant suction port 15b of the ejector 15, the flow rate of liquid phase refrigerant that flows into the second evaporator 20 is increased. Accordingly, the cooling capacity of the second evaporator 20 can be increased without reducing the cooling capacity of the first evaporator 16, and thus the cooling capacity of the entire cycle is increased as well.

The cooling capacity of an evaporator is defined, for example, as increment in the enthalpy of refrigerant observed when the refrigerant absorbs heat from air in the evaporator. The increment in enthalpy is defined by multiplying an increment in the specific enthalpy of refrigerant per unit weight by the flow rate of the refrigerant. The cooling capacity of the entire cycle is defined as the sum Qer of increments in the enthalpy of refrigerant at the first and second evaporators 16 and 20. The cooling capacity may also be defined as the coefficient of performance (COP) obtained by dividing Qer by the power consumed by the compressor 11.

In a conventional cycle, therefore, the phenomenon illustrated in FIG. 28 takes place. That is, when the flow ratio $\eta$ ($\eta$=Ge/Gnoz) is increased, the cooling capacity Qer of the entire cycle is increased as well. The flow ratio $\eta$ is the ratio of the flow rate Ge of refrigerant drawn into the refrigerant suction port 15b of the ejector 15 to the flow rate Gnoz of refrigerant that passes through the nozzle portion 15a of the ejector 15.

When the heat load of the conventional is low, the difference between the high pressure and the low pressure of refrigerant in the cycle is reduced; therefore, the input to the ejector 15 is reduced. In this case, a problem arises in the conventional cycle. Since the refrigerant flow rate Ge depends only on the refrigerant sucking capability of the ejector 15, the following takes placed: reduction in the input to the ejector 15→reduction in the refrigerant sucking capability of the ejector 15→reduction in the flow rate of liquid phase refrigerant that flows into the second evaporator 20→reduction in flow ratio $\eta$. This results in reduction in cooling capacity Qer.

The US 2005/0178150 proposes an ejector cycle (comparison cycle in FIG. 28) illustrated in FIG. 27. In this ejector cycle of FIG. 27, a branch passage 18 is provided between the discharge side of a radiator 12 and the refrigerant inflow port of an ejector 15. A throttling mechanism 42 that adjusts the pressure and flow rate of refrigerant and a second evaporator 20 are located in this branch passage 18. The outlet of the second evaporator 20 is connected to the refrigerant suction port 15b of the ejector 15.

The flow of refrigerant is separated upstream of the ejector 15, and the separated refrigerant is drawn into the refrigerant suction port 15b through the branch passage 18. Therefore, the branch passage 18 is in parallel relation with the ejector 15 with respect to connection. For this reason, when refrigerant is supplied to the branch passage 18, the refrigerant sucking and discharging capability of the compressor 11 can be utilized in addition to the refrigerant sucking capability of the ejector 15.

Therefore, even though the phenomenon of reduction in the input to the ejector 15 and reduction in the refrigerant sucking capability of the ejector 15 occurs, the degree of reduction in the flow rate Ge of refrigerant drawn into the refrigerant suction port 15b of the ejector 15 can be reduced more than in the conventional cycle.

In the ejector cycle proposed in the US 2005/0178150, the flow of refrigerant is separated upstream of the ejector 15. Therefore, the flow rate Gn of refrigerant that flows out of the radiator 12 is equal to the sum of the flow rate Gnoz of refrigerant that passes through the nozzle portion 15a of the ejector 15 and the flow rate of refrigerant that flows into the second evaporator 20. The flow rate of refrigerant that flows into the second evaporator 20 is equal to the flow rate Ge of refrigerant drawn into the refrigerant suction port 15b of the ejector 15.

Therefore, the relation expressed as Gn=Gnoz+Ge can be maintained. Thus, when Gnoz is reduced, Ge is increased; when Gnoz is conversely increased, Ge is reduced. Therefore, even when the cooling capacity of the first evaporator 16 is lowered, the cooling capacity of the second evaporator 20 is increased; even when the cooling capacity of the second evaporator 20 is conversely reduced, the cooling capacity of the first evaporator 16 is increased. Hence, the cooling capacity Qer of the comparison cycle illustrated in FIG. 28 is brought. That is, in the comparison cycle, a change in cooling capacity Qer for a change in flow ratio η is smaller than that in the conventional cycle, and the cooling capacity is peaked at the optimum flow ratio ηmax.

Furthermore, in an ejector cycle system where refrigerant is circulated in a refrigerant cycle using a suction force of an ejector, oil is easily stayed in an evaporator based on an operation state of the ejector. Generally, a predetermined oil circulating amount is necessary when the system is operated under a low load for a long time in order to protect a compressor.

SUMMARY OF THE INVENTION

In view of the foregoing problems, it is required to make the flow ratio close to the optimum flow ratio ηmax in the cycle in order to operate an ejector cycle system with high cooling capacity Qer. Furthermore, it is also required to return oil to the compressor in a refrigerant cycle system.

It is an object of the present invention to operate an ejector cycle system with high cooling capacity in the whole refrigerant cycle.

It is another object of the present invention to provide an ejector cycle system, which can effectively return oil into a compressor.

It is further another object of the present invention to provide an ejector cycle system in which oil staying in an evaporator can be effectively restricted by flowing out refrigerant from an evaporator based on an operation state of the evaporator.

According to an aspect of the present invention, an ejector cycle system with a refrigerant cycle through which refrigerant flows includes: a compressor that draws and compresses refrigerant; a radiator that radiates heat from high-pressure refrigerant discharged from the compressor; an ejector disposed downstream of the radiator, the ejector having a nozzle portion for depressurizing and expanding refrigerant, a refrigerant suction port through which refrigerant is drawn by a high-speed refrigerant flow jetted from the nozzle portion, and a pressure increasing portion for mixing refrigerant drawn through the refrigerant suction port with the high-speed refrigerant flow and for decelerating the mixed refrigerant flow to raise a pressure of the refrigerant flow; a first evaporator that evaporates refrigerant flowing out of the ejector; a branch passage that is branched from a branch portion between the radiator and the ejector and is coupled to the refrigerant suction port, for guiding refrigerant from the radiator into the refrigerant suction port; a throttling unit that is located in the branch passage and depressurizes refrigerant to adjust a flow rate of refrigerant; and a second evaporator that is located downstream of the throttling unit and evaporates refrigerant.

In this refrigerant cycle system, a flow ratio adjusting means adjusts a flow ratio between a first refrigerant flow amount depressurized and expanded in the nozzle portion of the ejector and a second refrigerant flow amount drawn into the refrigerant suction port, based on at least a physical quantity related to at least one of a state of refrigerant in the refrigerant cycle, a temperature of a space to be cooled by the first evaporator and the second evaporator, and an ambient temperature of the space to be cooled. Accordingly, the whole refrigerant cycle can be operated with a high cooling capacity. For example, the flow ratio adjusting means is constructed of the ejector itself, or the flow ratio adjusting means is constructed of the throttling unit itself, or the flow ratio adjusting ratio is constructed of a variable throttling member that is different from the ejector and the throttling unit. Furthermore, the variable throttling member can be located between the branch portion of the branch passage and a refrigerant inflow port of the nozzle portion of the ejector, or the throttling unit may be a variable throttle member located between the branch portion of the branch passage and a refrigerant inflow port of the second evaporator, or the variable throttling member is located at the branch portion of the branch passage.

According to another aspect of the present invention, in an ejector cycle system, a flow amount adjusting means is provided to adjust a flow amount in the whole refrigerant cycle, based on at least a physical quantity related to at least one of a state of refrigerant in the refrigerant cycle, a temperature of a space to be cooled by the first evaporator and the second evaporator, and an ambient temperature of the space to be cooled. In this case, a high cooling capacity can be obtained in the whole refrigerant cycle of the ejector cycle system. For example, the flow amount adjusting means may be located upstream of the branch portion of the branch passage.

According to a further another aspect of the present invention, a discharge capacity varying section can be provided to adjust a flow amount of refrigerant discharged from a compressor in a refrigerant cycle system. In this case, the discharge capacity varying means adjusts the flow amount of refrigerant discharged from the compressor, based on at least a physical quantity related to at least one of a state of refrigerant in the refrigerant cycle, a temperature of a space to be cooled by the first evaporator and the second evaporator, and an ambient temperature of the space to be cooled. Even in this case, the ejector cycle system can be operated while having a high cooling capacity in the whole refrigerant cycle. For example, the compressor may be a displacement variable compressor. In this case, the discharge capacity varying section may be an electrical capacity control valve which adjusts the flow amount of the refrigerant discharged from the compressor by changing a discharge capacity of the compressor. Alternatively, the discharge capacity varying section may be an electromagnetic clutch which adjusts the flow amount of the refrigerant discharged from the compressor by changing a ratio between an operation state and a non-operation state of the compressor.

According to a further another aspect of the present invention, in an ejector cycle system, a blower unit is disposed to blow air to at least one of the first evaporator and the second evaporator, and the blower unit includes an air blowing adjusting means for adjusting an air blowing amount of the blower unit. In this case, the air blowing adjusting means adjusts the air amount of the blower unit, based on at least a physical quantity related to at least one of a state of refrigerant in the refrigerant cycle, a temperature of a space to be cooled by the first evaporator and the second evaporator, and an ambient temperature of the space to be cooled. Alternatively, a blower unit may be disposed to blow air to the radiator, and an air blowing adjusting means for adjusting an air blowing amount of the blower unit. Further, the air blowing adjusting means adjusts the air blowing amount of the blower unit, based on at least a physical quantity related to at least one of a state of refrigerant in the refrigerant cycle, a temperature of a space to be cooled by the first evaporator and the second evaporator, and an ambient temperature of the space to be cooled. Accordingly, it is possible to adjust a refrigerant flow amount in a refrigerant cycle, and a high cooling capacity can be obtained in the entire refrigerant cycle.

In any refrigerant cycle system, the physical quantity may be related to a superheat degree of refrigerant at a refrigerant outlet side of the first evaporator, may be related to a superheat degree of refrigerant at a refrigerant outlet side of the second evaporator, or may be related to a supercool degree of refrigerant at a refrigerant outlet side of the radiator. Furthermore, the physical quantity may be related to a temperature and a pressure of refrigerant at a refrigerant outlet side of the radiator, or may be related to the flow ratio, or may be related to a flow amount of refrigerant discharged from the compressor. Furthermore, an accumulator may be located downstream of the first evaporator to separate refrigerant into gas phase refrigerant and liquid phase refrigerant.

According to a further another aspect of the present invention, an ejector cycle system is provided with a determining means for determining whether a rapid cooling is necessary for a space to be cooled by the first evaporator and the second evaporator, and an adjusting means for adjusting an evaporation temperature of at least one of the first evaporator and the second evaporator. In this case, the adjusting means reduces the evaporation temperature of at least one of the first evaporator and the second evaporator when the determining means determines that the rapid cooling is necessary. Accordingly, a rapid cooling for the space to be cooled can be easily performed.

For example, an input means capable of inputting a rapid cooling request by a user may be provided. In this case, the determining means determines that the rapid cooling is necessary when the rapid cooling request is input through the input means. Alternatively, the determining means may determine a rapid cooling, based on at least a physical quantity related to at least one of a state of refrigerant in the refrigerant cycle, a temperature of a space to be cooled by the first evaporator and the second evaporator, and an ambient temperature of the space to be cooled. Alternatively, a flow ratio adjusting means may be provided to adjust a flow ratio between a first refrigerant flow amount depressurized and expanded in the nozzle portion of the ejector and a second refrigerant flow amount drawn into the refrigerant suction port. In this case, the flow ratio adjusting means shuts a refrigerant flow depressurized and expanded in the nozzle portion of the ejector so as to reduce the evaporation temperature, when the determining means determines that the rapid cooling is necessary. Alternatively, a variable throttling member may be located between the branch portion and the nozzle portion of the ejector. In this case, the flow ratio adjusting means is constructed of the throttling unit itself. For example, the flow ratio adjusting means may be constructed of the ejector itself. Alternatively, a discharge capacity varying section may be provided to adjust a flow amount of refrigerant discharged from the compressor. In this case, the discharge capacity varying section increases the flow amount of refrigerant discharged from the compressor so as to reduce the evaporation temperature when the determining means determines that the rapid cooling is necessary.

Alternatively, the ejector cycle system may be provided with a blower unit for blowing air to at least the second evaporator and a blower adjusting unit which adjusts an air blowing amount of the blower unit. In this case, the blower adjusting unit reduces the air blowing amount so as to decrease the evaporation temperature when the determining means determines that the rapid cooling is necessary. Alternatively, an increasing means may be provided to increase a superheat degree of refrigerant at an outlet side of at least one of the first evaporator and the second evaporator. In this case, the increasing means increases the superheat degree so as to decrease the evaporation temperature when the determining means determines that the rapid cooling is necessary.

According to a further another aspect of the present invention, an ejector cycle system includes: a compressor for compressing refrigerant; a condenser for cooling and condensing refrigerant compressed by the compressor; an ejector provided downstream of the condenser, wherein the ejector has a nozzle portion having a refrigerant inlet port, for decompressing refrigerant from the condenser, a refrigerant suction port through which refrigerant is drawn by refrigerant passing through the nozzle portion of the ejector, and a refrigerant outlet port for discharging refrigerant from the ejector; an evaporator that is disposed to exchange heat between an external fluid and refrigerant branched and introduced from an upstream side of the ejector, and has a refrigerant outlet connected to the refrigerant suction port of the ejector; a detection means that detects a controllable factor for determining a staying state of oil in the evaporator; a determining means that determines whether oil is staying in the evaporator based on an information from the detection means; and an oil flow-down means that causes the oil to flow down, when the determining means determines that oil is staying in the evaporator. Accordingly, it can prevent oil from staying in the evaporator, and the compressor can be effectively protected.

For example, the oil flow-down means may increase a flow rate of refrigerant flowing in the evaporator when the controllable factor is not in a predetermined range. Furthermore, a state of superheated refrigerant gas (SH) on a refrigerant outlet side of the evaporator may be used as the controllable factor, or a refrigerant temperature difference between refrigerant outlet and inlet of the evaporator or a refrigerant pressure loss between the refrigerant outlet and inlet of the evaporator may be used as the controllable factor, or a pressure difference between the refrigerant suction port and the refrigerant outlet port of the ejector may be used as the controllable factor.

Alternatively, a flow control device may be provided downstream of the condenser and may adjust the flow rate of refrigerant flowing to the ejector and a flow rate of refrigerant flowing to the evaporator. In this case, the flow control device can be provided with a variable expansion valve placed upstream of the refrigerant inlet port of the ejector. Furthermore, the oil flow-down means can be provided with a controlling means that makes adjustment so as to reduce an opening of the variable expansion valve or the nozzle portion of the ejector when the controllable factor is not in a predetermined range.

Alternatively, the oil flow-down means temporarily may stop the compressor when the controllable factor is not in a predetermined range. Alternatively, when the controllable factor is not in a predetermined range, the oil flow-down means may hinder a refrigerant cooling in the condenser or increase a load on the fluid medium that exchanges heat with refrigerant in the condenser.

Furthermore, an another evaporator may be connected with the outlet port of the ejector. In addition, freon refrigerant, hydrocarbon refrigerant, or carbon dioxide may be used as the refrigerant.

According to a further another aspect of the present invention, an operation method for an ejector cycle system includes: passing refrigerant through an ejector and passing refrigerant through an evaporator by a suction force of the ejector; detecting a controllable factor for determining a staying of oil in the evaporator during the passing step; and causing oil to flow down from the evaporator when the controllable factor is not in a predetermined range. Accordingly, it can restrict oil from staying in the evaporator.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PREFERRED EMBODIMENTS

First Embodiment

Figure 1:
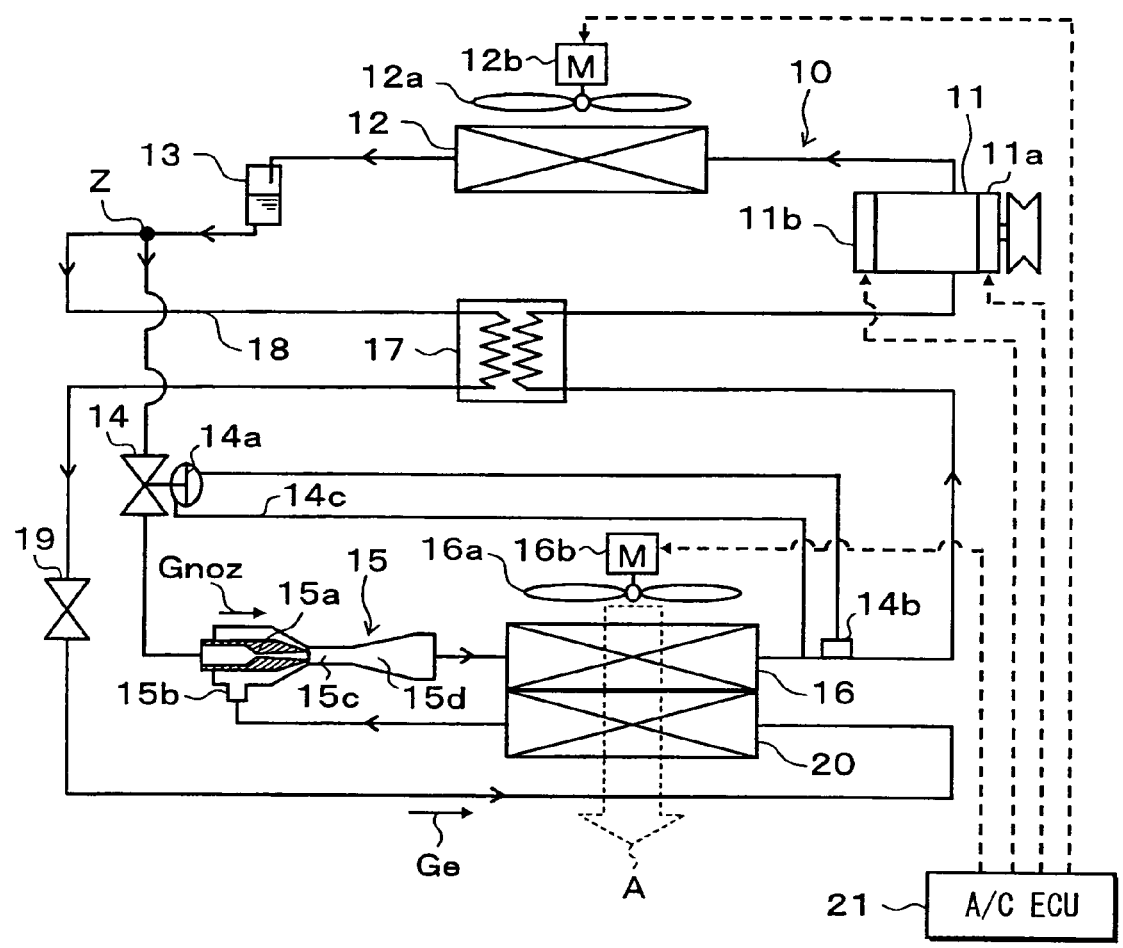
FIG. 1 is a schematic diagram showing an ejector cycle system according to a first embodiment of the present invention.

FIG. 1 illustrates an example in which an ejector cycle system 10 of the first embodiment is applied to a refrigerator device for vehicles. The refrigerator device for vehicles in this embodiment is so constructed as to lower the temperature inside a compartment to a very low temperature close to −20° C., for example.

In the ejector cycle system 10, a compressor 11 sucks in, compresses, and discharges refrigerant. The compressor 11 is rotationally driven by an engine for vehicle running (not shown) through an electromagnetic clutch 11a and a belt. This embodiment uses a swash plate-type variable displacement compressor whose discharge capacity can be continuously and variably controlled by external control signals.

More specific description will be given. The pressure in a swash plate chamber (not shown) is controlled utilizing the discharge pressure and the inlet pressure of the compressor 11. Thus, the angle of inclination of the swash plate is varied to change the piston stroke, and the discharge capacity is thereby continuously changed within the range from substantially 0% to 100%. Refrigerant discharge capability can be adjusted through this change in discharge capacity.

The discharge capacity is the geometric volume of an operating space in which refrigerant is drawn and compressed, and is equivalent to the cylinder capacity between the top dead center and the bottom dead center of a piston stroke.

Description will be given to the control of the pressure in the swash plate chamber. The compressor 11 is provided with an electromagnetic capacity control valve 11b. This electromagnetic capacity control valve 11b incorporates: a pressure response mechanism (not shown) that produces force F1 arising from the low refrigerant pressure on the suction side of the compressor 11; and an electromagnetic mechanism (not shown) that produces electromagnetic force F2 that counters this force F1 arising from the low refrigerant pressure Ps.

The electromagnetic force F2 of the electromagnetic mechanism is determined by control current In outputted from an air conditioning controller 21 described later. The pressure in the swash plate chamber is varied by changing the ratio of high-pressure refrigerant to low-pressure refrigerant introduced into the swash plate chamber by a valve body (not shown) that is displaced in correspondence with the force F1 corresponding to the low refrigerant pressure Ps and the electromagnetic force F2.

The discharge capacity of the compressor 11 can be continuously varied over the range from 100% to substantially 0% by the adjustment of the pressure in the swash plate chamber. Therefore, the compressor 11 can be brought substantially into operation stop state by reducing the discharge capacity to substantially 0%. Consequently, the compressor 11 may be constructed as a clutch-less compressor in which its rotating shaft is constantly coupled with a vehicle engine through a pulley and a belt V.

A radiator 12 is connected to the refrigerant discharge side of the compressor 11. The radiator 12 is a heat exchanger that exchanges heat between the high-pressure refrigerant discharged from the compressor 11 and the outside air (i.e., air outside the vehicle compartment) sent by a blower 12a for radiator to cool the high-pressure refrigerant.

The blower 12a for radiator is driven by an electric motor 12b for driving. The electric motor 12b for driving is so constructed that it is rotationally driven when applied voltage V1 is outputted from the air conditioning controller 21. Therefore, since the number of revolutions of the electric motor 12b for driving can be varied by the air conditioning controller 21 (A/C ECU) by varying the applied voltage V1, the quantity of air sent by the blower 12a for radiator 12 can be varied.

This embodiment uses ordinary fluorocarbon refrigerant as the refrigerant circulating in the cycle. Therefore, the ejector cycle system 10 constructs a subcritical cycle in which a high pressure does not exceed a critical pressure. Therefore, the radiator 12 functions as a condenser that cools and condenses refrigerant.

A liquid receiver 13 as a vapor-liquid separator that separates refrigerant into vapor and liquid and stores the liquid phase refrigerant is located downstream of the radiator 12 with respect to a refrigerant flow. Liquid phase refrigerant is guided out of this liquid receiver 13 to the downstream side. A variable throttling mechanism 14 is connected downstream of the liquid receiver 13 with respect to refrigerant flow.

Specifically, this variable throttling mechanism 14 is a generally known thermal expansion valve. The variable throttling mechanism 14 functions to depressurize the high-pressure liquid phase refrigerant from the liquid receiver 13 into intermediate-pressure refrigerant with the vapor and liquid two phases.

This thermal expansion valve adjusts the opening of a valve body portion (not shown) according to the degree of superheat of the refrigerant on the outlet side of a first evaporator 16 described later. Accordingly, the flow rate of refrigerant that passes through the variable throttling mechanism 14 can be adjusted, so that the degree of superheat of refrigerant on the outlet side of the first evaporator 16 approaches a predetermined value. That is, in this embodiment, the valve body portion of the thermal expansion valve makes a means for adjusting the flow ratio ($\eta$).

The valve body of the thermal expansion valve is coupled with a diaphragm mechanism 14a that forms a pressure responding means. The diaphragm mechanism 14a adjusts the opening of the valve body by displacing the valve body according to the following: the pressure of a filler gas medium in a temperature sensitive cylinder 14b (the pressure corresponding to the temperature of refrigerant on the outlet side of the first evaporator 16); and the pressure of refrigerant on the outlet side of the first evaporator 16, introduced through an equalizing pipe 14c. That is, in this embodiment, the temperature sensitive cylinder 14b and the equalizing pipe 14c make a means for detecting the physical quantities related to the state of refrigerant in the cycle.

An ejector 15 is connected with the outlet of the variable throttling mechanism 14. This ejector 15 is a pressure reducing unit for depressurizing refrigerant and is also a refrigerant circulating means for circulating refrigerant by the sucking action (engulfing action) of a refrigerant flow jetting out at high speed.

The ejector 15 is provided with: a nozzle portion 15a that narrows down the area of the passage and isoentropically decompresses intermediate-pressure refrigerant that passes through the variable throttling mechanism 14; and a refrigerant suction port 15b that is positioned in the same space as the refrigerant spout of the nozzle portion 15a and sucks in vapor phase refrigerant from a second evaporator 20 described later.

In addition, a mixing portion 15c is provided downstream of the nozzle portion 15a and the refrigerant suction port 15b. The mixing portion 15c mixes a high-speed refrigerant flow from the nozzle portion 15a with the refrigerant drawn through the refrigerant suction port 15b. A diffuser portion 15d that makes a pressure increasing portion is positioned downstream of the mixing portion 15c.

This diffuser portion 15d is formed in such a shape that the area of the refrigerant passage is gradually increased toward its outlet. The diffuser portion 15d functions to decelerate a refrigerant flow to increase the refrigerant pressure. That is, the diffuser portion 15d has a function of converting the velocity energy of refrigerant into pressure energy.

The first evaporator 16 is connected downstream of the diffuser portion 15d of the ejector 15. The first evaporator 16 is a heat exchanger that exchanges heat between air sent by a blower 16a for evaporator and refrigerant to evaporate the refrigerant, and thus produces heat absorbing action.

The blower 16a for evaporator is driven by an electric motor 16b for driving. The electric motor 16b for driving is so constructed that it is rotationally driven when applied voltage V2 is outputted from the air conditioning controller 21. Since the number of revolutions of the electric motor 16b for driving can be varied by the air conditioning controller 21 varying the applied voltage V2, the quantity of air sent by the blower 16a for evaporator can be varied.

The downstream portion of the first evaporator 16 with respect to a refrigerant flow is connected to an internal heat exchanger 17, and the refrigerant outlet of the internal heat exchanger 17 is connected to the suction side of the compressor 11.

A branch passage 18 is a refrigerant passage that connects the sections between the above-mentioned liquid receiver 13 and variable throttling mechanism 14 and the refrigerant suction port 15b of the ejector 15. Reference character Z denotes the branch portion of the branch passage 18. The above-mentioned internal heat exchanger 17 is located in this branch passage 18, and a fixed throttle 19 is located downstream of the internal heat exchanger 17. In addition, the second evaporator 20 is located downstream of the fixed throttle 19.

The internal heat exchanger 17 exchanges heat between the high-temperature, high-pressure refrigerant that passes through the branch passage 18 and the low-temperature, low-pressure refrigerant on the downstream side of the first evaporator 16. As the result of heat exchange between the refrigerants in the internal heat exchanger 17, the refrigerant that passes through the branch passage 18 is cooled. Therefore, the enthalpy difference between the refrigerants at the refrigerant inlet and outlet of the first evaporator 16 and the second evaporator 20 can be increased. That is, their cooling capacity of the first evaporator 16 and the second evaporator 20 can be increased.

The fixed throttle 19 adjusts the flow rate of and reduces the pressure of the refrigerant that flows into the second evaporator 20. Specifically, the fixed throttle 19 can be constructed of such a fixed throttle as a capillary tube or an orifice.

Figure 28:
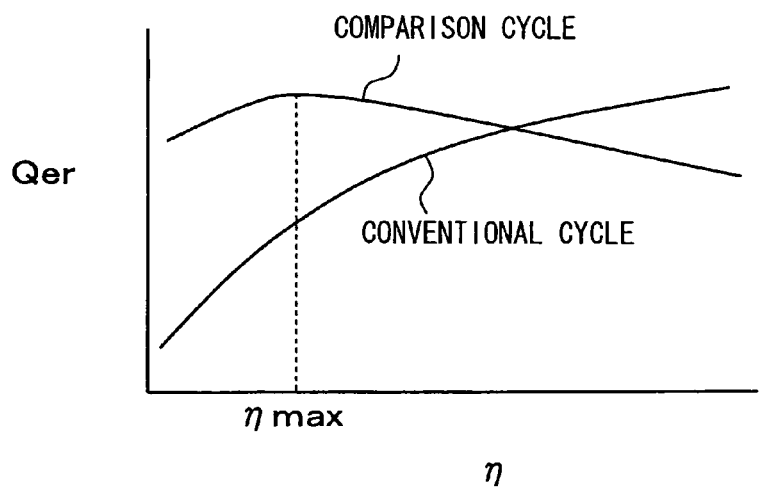
FIG. 28 is a graph showing a relationship between a cooling capacity and a flow ratio in the cycles of FIGS. 26 and 27.

The throttling opening of the fixed throttle 19 in this embodiment is set beforehand to a predetermined amount such that the flow ratio η becomes equal to the optimum flow ratio ηmax illustrated in FIG. 28. Here, η=Ge/Gnoz, where Ge is the flow rate of refrigerant drawn through the refrigerant suction port 15b of the ejector 15; and Gnoz is the flow rate of refrigerant that passes through the variable throttling mechanism 14 when the degree of superheat of refrigerant on the outlet side of the first evaporator 16 becomes equal to a predetermined value and further passes through the nozzle portion 15a of the ejector 15. The optimum flow ratio ηmax is a flow ratio at which the cooling capacity Qer of the entire system approaches the maximum value.

This design can be implemented to appropriate values for the throttling opening of the variable throttling mechanism 14 observed when the degree of superheat of refrigerant on the outlet side of the first evaporator 16 becomes equal to a predetermined value. For example, the area of the refrigerant passage in the nozzle portion 15a of the ejector 15, the dimensions of the mixing portion 15c and the diffuser portion 15d, and the throttling opening of the fixed throttle 19 are made at suitable values. Also, this design is made with the following taken into account: pressure loss in the passage through which the refrigerant that passes through the variable throttling mechanism 14 flows; and the passage (branch passage 18) through which the refrigerant that passes through the fixed throttle 19 flows.

The second evaporator 20 is a heat exchanger that evaporates refrigerant and produces heat absorbing action. In this embodiment, the first evaporator 16 and the second evaporator 20 are assembled together so that an integral construction can be formed. More specifically, the components of the first evaporator 16 and the second evaporator 20 are formed of aluminum, and they are joined together by brazing so that they are of integral construction.

For this reason, the air sent by the above-mentioned blower 16a for evaporator flows as indicated by arrow A. Air is cooled at the first evaporator 16, and then cooled at the second evaporator 20. That is, one and the same space to be cooled is cooled by using the first evaporator 16 and the second evaporator 20.

The air conditioning controller 21 is constructed of a generally known microcomputer including CPU, ROM, RAM, and the like and its peripheral circuits. The air conditioning controller 21 carries out varied computation and processing based on control programs stored in its ROM to control the operation of the various devices 11a, 11b, 12b, 16b, and so on.

The air conditioning controller 21 is inputted with detection signals from a group of various sensors and various operation signals from an operation panel (not shown). Specifically, the provided group of sensors includes an ambient temperature sensor (outside air temperature sensor) that detects outside air temperature (temperature outside the vehicle compartment) and the like. The operation panel is provided with a temperature setting switch for setting the cooling temperature of the space to be cooled and the like.

Description will be given to the operation of this embodiment constructed as mentioned above. When the electromagnetic clutch 11a is energized by the control output of the air conditioning controller 21 to bring the electromagnetic clutch 11a into engagement, rotational driving force is transmitted from the engine for vehicle, running to the compressor 11. When a control current In is outputted from the air conditioning controller 21 to the electromagnetic capacity control valve 11b based on a control program, the compressor 11 sucks in, compresses, and discharges vapor phase refrigerant.

The high-temperature, high-pressure vapor phase refrigerant compressed in and discharged from the compressor 11 flows into the radiator 12. At the radiator 12, the high-temperature, high-pressure refrigerant is cooled by the outside air and condensed. The high-pressure refrigerant with heat radiated that flows out of the radiator 12 is separated into vapor phase refrigerant and liquid phase refrigerant in the liquid receiver 13. The liquid phase refrigerant that flows out of the liquid receiver 13 is separated at the branch portion Z into a refrigerant flow toward the variable throttling mechanism 14 and a refrigerant flow toward the branch passage 18.

The refrigerant flow heading for the variable throttling mechanism 14 has its pressure reduced and its flow rate adjusted at the variable throttling mechanism 14, and then flows into the ejector 15. At this time, the variable throttling mechanism 14 adjusts the flow rate of the refrigerant passing through the variable throttling mechanism 14 so that the degree of superheat of refrigerant on the outlet side of the first evaporator 16 approaches a predetermined value. That is, it adjusts the refrigerant flow rate Gnoz.

The refrigerant flow that enters the ejector 15 is further depressurized through the nozzle portion 15a and expanded. Therefore, the pressure energy of refrigerant is converted into velocity energy at the nozzle portion 15a, and the refrigerant is jetted from the jet port of this nozzle portion 15a at enhanced speed. The refrigerant (vapor phase refrigerant) that has passed through the second evaporator 20 in the branch passage 18 is drawn through the refrigerant suction port 15b by the refrigerant sucking action produced at this time.

The refrigerant jetted out of the nozzle portion 15a and the refrigerant drawn into the refrigerant suction port 15b are mixed together at the mixing portion 15c located downstream of the nozzle portion 15a, and flow into the diffuser portion 15d. At this diffuser portion 15d, the velocity (expansion) energy of refrigerant is converted into pressure energy by increase in the area of the passage. Therefore, the pressure of the refrigerant is raised.

The refrigerant that flows out of the diffuser portion 15d of the ejector 15 flows into the first evaporator 16. In the first evaporator 16, the low-temperature, low-pressure refrigerant absorbs heat from air sent by the blower 16a for evaporator, and is evaporated. The vapor phase refrigerant that has passed through the first evaporator 16 flows into the internal heat exchanger 17, and exchanges heat between it and the high-temperature, high-pressure refrigerant that flows through the branch passage 18 at the branch portion Z. The vapor phase refrigerant that flows out of the internal heat exchanger 17 is drawn into the compressor 11 and is compressed again.

The refrigerant flow that entered the branch passage 18 goes into the internal heat exchanger 17, and exchanges heat between it and the low-temperature, low-pressure vapor phase refrigerant that has flowed out of the first evaporator 16, as mentioned above. The refrigerant cooled through the internal heat exchanger 17 is depressurized through the fixed throttle 19 and is changed into low-pressure refrigerant. This low-pressure refrigerant flows into the second evaporator 20.

At the second evaporator 20, the low-pressure inflow refrigerant absorbs heat from the air sent in and cooled at the first evaporator 16, and is evaporated. The vapor phase refrigerant that has passed through the second evaporator 20 is drawn into the ejector 15 through the refrigerant suction port 15b. As mentioned above, the throttling opening of the fixed throttle 19 is set beforehand to a predetermined amount. Therefore, the flow rate Ge of refrigerant drawn into the refrigerant suction port 15b of the ejector 15 is such a flow rate that the flow ratio η of it to Gnoz approaches the optimum flow ratio ηmax.

The vapor phase refrigerant evaporated at the second evaporator 20 is drawn through the refrigerant suction port 15b of the ejector 15. It is mixed at the mixing portion 15c with the liquid phase refrigerant that has passed through the nozzle portion 15a, and flows into the first evaporator 16.

In this embodiment, as mentioned above, the refrigerant on the downstream side of the diffuser portion 15d of the ejector 15 can be supplied to the first evaporator 16; at the same time, the refrigerant on the branch passage 18 side can be supplied to the second evaporator 20 through the fixed throttle 19. Therefore, the cooling action can be simultaneously produced with the first evaporator 16 and with the second evaporator 20.

The refrigerant evaporating pressure of the first evaporator 16 is a pressure obtained after pressurization through the diffuser portion 15d. Meanwhile, the outlet of the second evaporator 20 is connected to the refrigerant suction port 15b of the ejector 15. Therefore, the lowest pressure obtained immediately after depressurization through the nozzle portion 15a can be applied to the second evaporator 20. Thus, the refrigerant evaporating pressure (refrigerant evaporating temperature) of the second evaporator 20 can be made lower than the refrigerant evaporating pressure (refrigerant evaporating temperature) of the first evaporator 16.

The compression workload of the compressor 11 can be reduced by an amount by which the inlet pressure of the compressor 11 can be raised by the pressure raising action at the diffuser portion 15d of the ejector 15. Thus, the power saving effect can be achieved.

The variable throttling mechanism 14 in this embodiment adjusts the refrigerant flow rate Gnoz so that the degree of superheat of refrigerant on the outlet side of the first evaporator 16 approaches a predetermined value. As a result, the flow ratio η is so adjusted that it approaches the optimum flow ratio ηmax at which the cooling capacity of the entire system is enhanced. Therefore, the entire cycle can be operated while high cooling capacity is delivered.

The degree of superheat of refrigerant on the outlet side of the first evaporator 16 is controlled; therefore, the liquid phase refrigerant can be prevented from returning to the compressor 11, and the stability of the cycle can be ensured.

Second Embodiment

Figure 2:
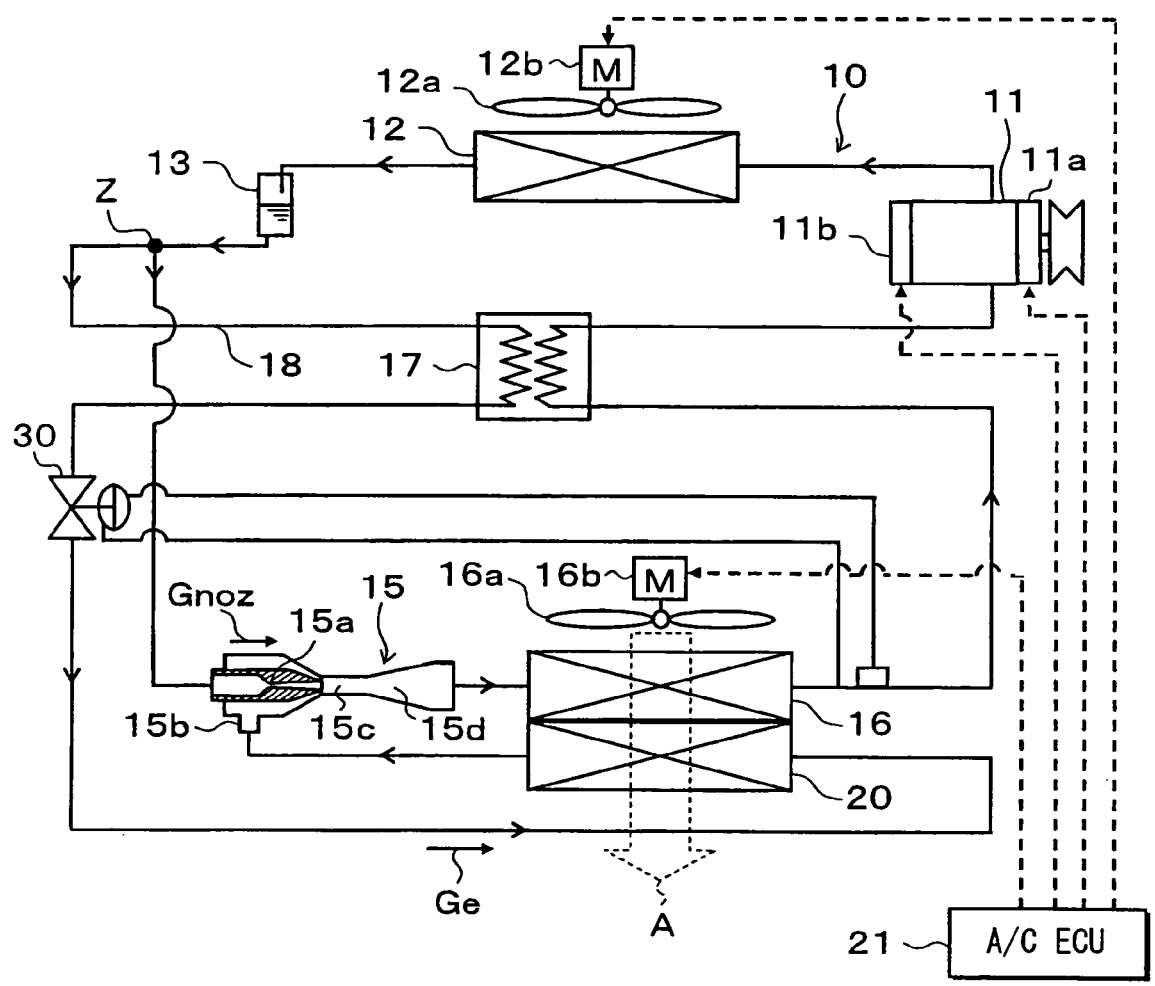
FIG. 2 is a schematic diagram showing an ejector cycle system according to a second embodiment of the present invention.

In the first embodiment, the variable throttling mechanism 14 is located between the branch portion Z and the ejector 15, and the fixed throttle 19 is located in the branch passage 18. In the second embodiment, as illustrated in FIG. 2, the variable throttling mechanism 14 and the fixed throttle 19 are disused, and a variable throttling mechanism 30 is provided in the branch passage 18.

The variable throttling mechanism 30 is a thermal expansion valve that adjusts the refrigerant flow rate so that the degree of superheat of refrigerant on the outlet side of the first evaporator 16 approaches a predetermined value. The construction of the thermal expansion valve can be the same as in the first embodiment. That is, the valve body of the variable throttling mechanism 30 makes a means for adjusting the flow ratio (η), and the temperature sensitive cylinder and equalizing pipe of the variable throttling mechanism 30 make a means for detecting the physical quantities related to the state of refrigerant in the cycle.

The area and the like of the refrigerant passage in the nozzle portion 15a of the ejector 15 in this embodiment are set such that the flow ratio η of the flow rate Ge of refrigerant drawn into the refrigerant suction port 15b of the ejector 15 to the flow rate Gnoz of refrigerant observed when the degree of superheat of refrigerant on the outlet side of the first evaporator 16 becomes equal to a predetermined value becomes equal to the optimum flow ratio ηmax. The other parts of the cycle configuration of the second embodiment can be made to be the same as in the first embodiment.

Therefore, when the cycle in this embodiment is operated, the variable throttling mechanism 30 adjusts the refrigerant flow rate Ge so that the degree of superheat of refrigerant on the outlet side of the first evaporator 16 approaches a predetermined value. As a result, the flow ratio η is adjusted so that it approaches the optimum flow ratio ηmax, and the same effect as with the first embodiment can be obtained.

Third Embodiment

Figure 3:
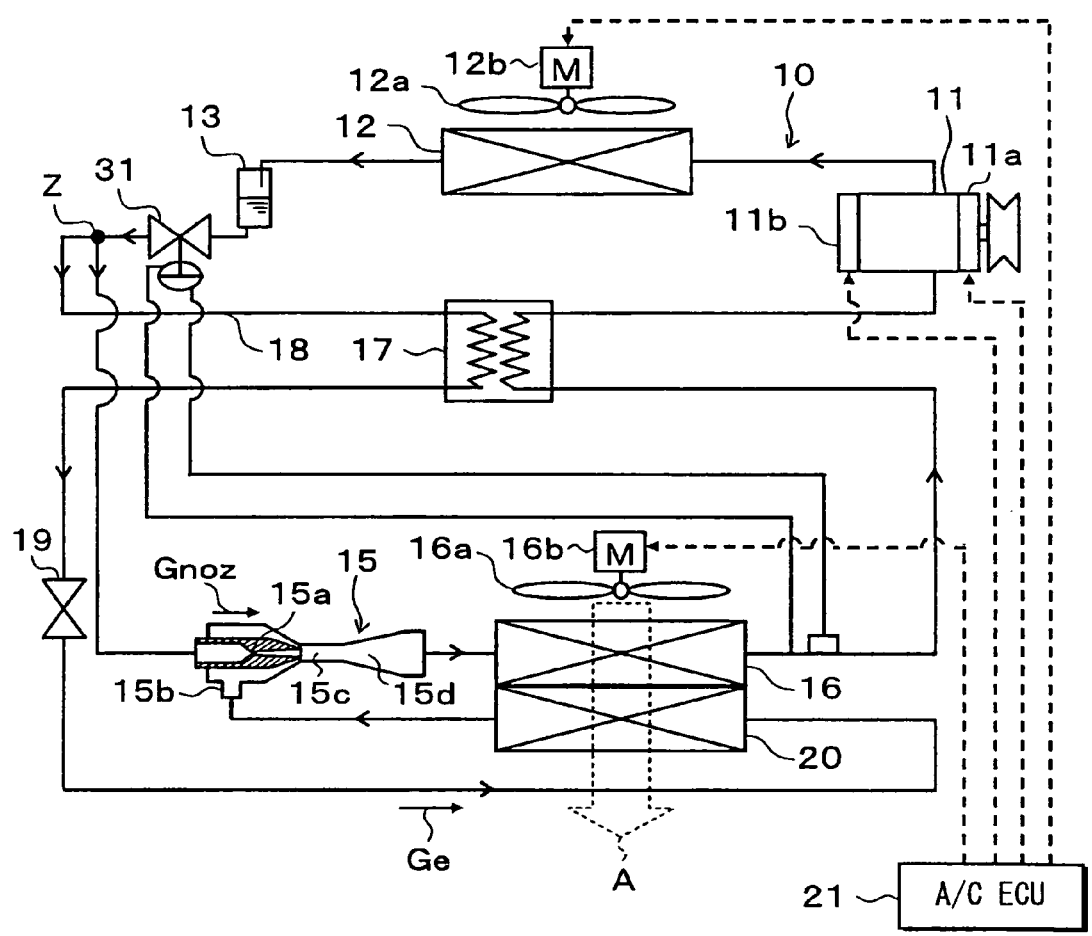
FIG. 3 is a schematic diagram showing an ejector cycle system according to a third embodiment of the present invention.

In the first embodiment, the variable throttling mechanism 14 is located between the branch portion Z and the ejector 15. In this third embodiment, as illustrated in FIG. 3, the variable throttling mechanism 14 shown in FIG. 1 is disused, and a variable throttling mechanism 31 is provided between the liquid receiver 13 and the branch portion Z.

The variable throttling mechanism 31 is a thermal expansion valve that adjusts the refrigerant flow rate so that the degree of superheat of refrigerant on the outlet side of the first evaporator 16 approaches a predetermined value. The construction of the thermal expansion valve is the same as in the first embodiment. That is, the valve body of the variable throttling mechanism 31 is a means for adjusting the refrigerant flow rate of the entire cycle; and the temperature sensitive cylinder and equalizing pipe of the variable throttling mechanism 31 are a means for detecting the physical quantities related to the state of refrigerant in the cycle.

In this third embodiment, the area and the like of the refrigerant passage in the nozzle portion 15a of the ejector 15 and the throttling opening of the fixed throttle 19 are set beforehand to predetermined amounts, so that the flow ratio η becomes equal to the optimum flow ratio ηmax with respect to the flow rate of refrigerant that passes through the variable throttling mechanism 31 when the degree of superheat of refrigerant on the outlet side of the first evaporator 16 becomes equal to a predetermined value. The other aspects of the cycle configuration of the third embodiment are the same as in the first embodiment.

Therefore, when the cycle in this embodiment is operated, the variable throttling mechanism 31 adjusts the flow rate of refrigerant that passes through the variable throttling mechanism 31 so that the degree of superheat of refrigerant on the outlet side of the first evaporator 16 approaches a predetermined value. As a result, the flow ratio η is adjusted so that it approaches the optimum flow ratio ηmax, and the same effect as with the first embodiment can be obtained.

Fourth Embodiment

Figure 4:
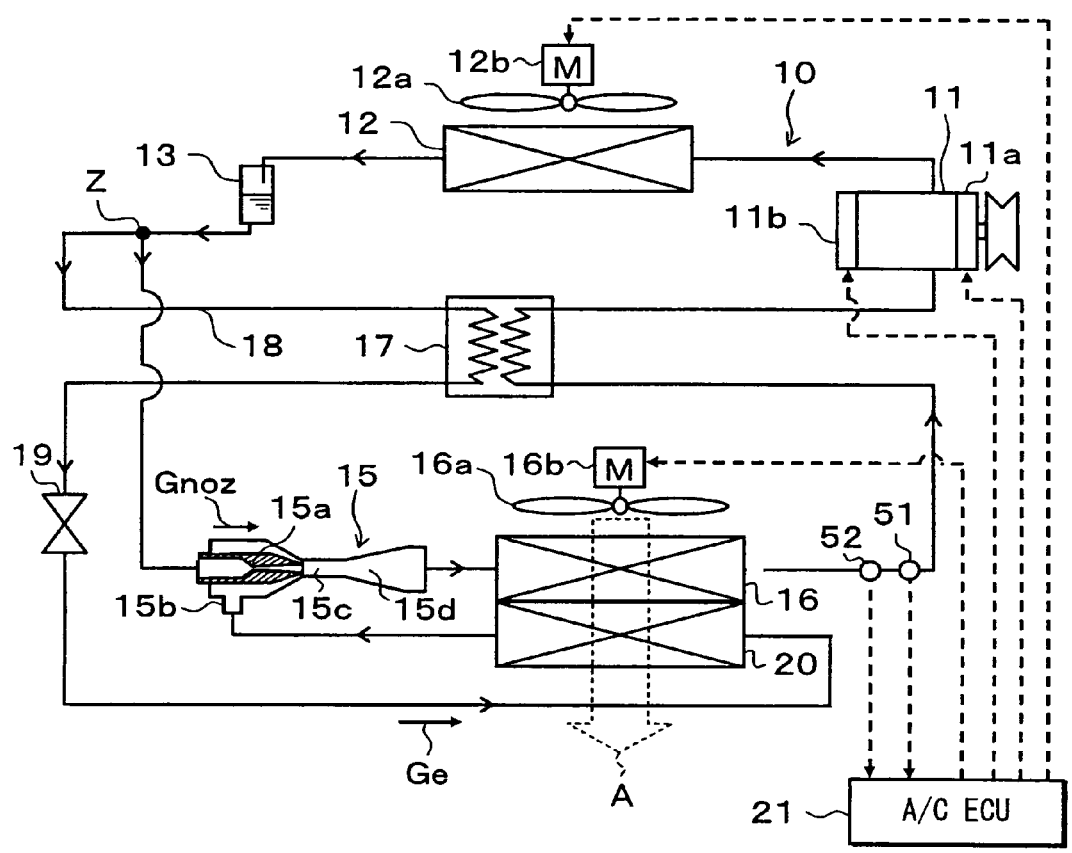
FIG. 4 is a schematic diagram showing an ejector cycle system according to a first embodiment of the present invention.

In the first embodiment, the variable throttling mechanism 14 is located between the branch portion Z and the ejector 15. In this embodiment, as illustrated in FIG. 4, the variable throttling mechanism 14 of FIG. 1 is disused, and a temperature sensor 51 and a pressure sensor 52 are provided. The temperature sensor 51 detects the temperature Ts1 of refrigerant on the outlet side of the first evaporator 16, and the pressure sensor 52 detects its pressure Ps1.

The detection values of the temperature sensor 51 and the pressure sensor 52 are inputted to the air conditioning controller 21. Based on the detection values, the air conditioning controller 21 computes the degree of superheat of refrigerant on the outlet side of the first evaporator 16. That is, in this embodiment, the temperature sensor 51 and the pressure sensor 52 are a means for detecting the physical quantities related to the state of refrigerant in the cycle.

The air conditioning controller 21 controls the control current In so that the computed degree of superheat approaches a predetermined value, and the electromagnetic capacity control valve 11b controls the discharge capacity of the compressor 11. That is, in this embodiment, the electromagnetic capacity control valve 11b is a discharge flow rate varying means.

In this embodiment, the area and the like of the refrigerant passage in the nozzle portion 15a of the ejector 15 and the throttling opening of the fixed throttle 19 are set beforehand to predetermined amounts so that the flow ratio η becomes equal to the optimum flow ratio ηmax with respect to the refrigerant discharge flow rate of the compressor 11 observed when the degree of superheat of refrigerant on the outlet side of the first evaporator 16 becomes equal to a predetermined value. The other aspects of the cycle configuration of the fourth embodiment are the same as in the first embodiment.

Description will be given to the operation of this embodiment. As an example, it will be assumed that the cooling load of the first evaporator 16 is increased. When the degree of superheat of refrigerant on the outlet side of the first evaporator 16 increases and exceeds a predetermined value, the air conditioning controller 21 increases the compressor discharge capacity. Consequently, the flow rate of refrigerant that passes through the first evaporator 16 is increased; therefore, the degree of superheat of refrigerant on the outlet side of the first evaporator 16 can be reduced.

When the cooling load of the first evaporator 16 is lowered, the degree of superheat of refrigerant on the outlet side of the first evaporator 16 is lowered. When this degree of superheat becomes lower than a predetermined value, the air conditioning controller 21 reduces the compressor discharge capacity. Consequently, the flow rate of refrigerant that passes through the first evaporator 16 is lowered. Therefore, the degree of superheat of refrigerant on the outlet side of the first evaporator 16 can be increased.

As mentioned above, the air conditioning controller 21 controls the discharge capacity of the compressor 11 so that the degree of superheat of refrigerant on the outlet side of the first evaporator 16 approaches a predetermined value. As a result, the flow ratio η is also adjusted so that it approaches the optimum flow ratio ηmax, and thus the same effect as with the first embodiment can be obtained.

In addition, the air conditioning controller 21 varies the discharge flow rate of the compressor 11 so that the entire cycle operates with high cooling capacity. Therefore, the discharge flow rate of the compressor 11 can be prevented from being unnecessarily increased. As a result, the power saving effect can be further achieved.

Fifth Embodiment

Figure 5:
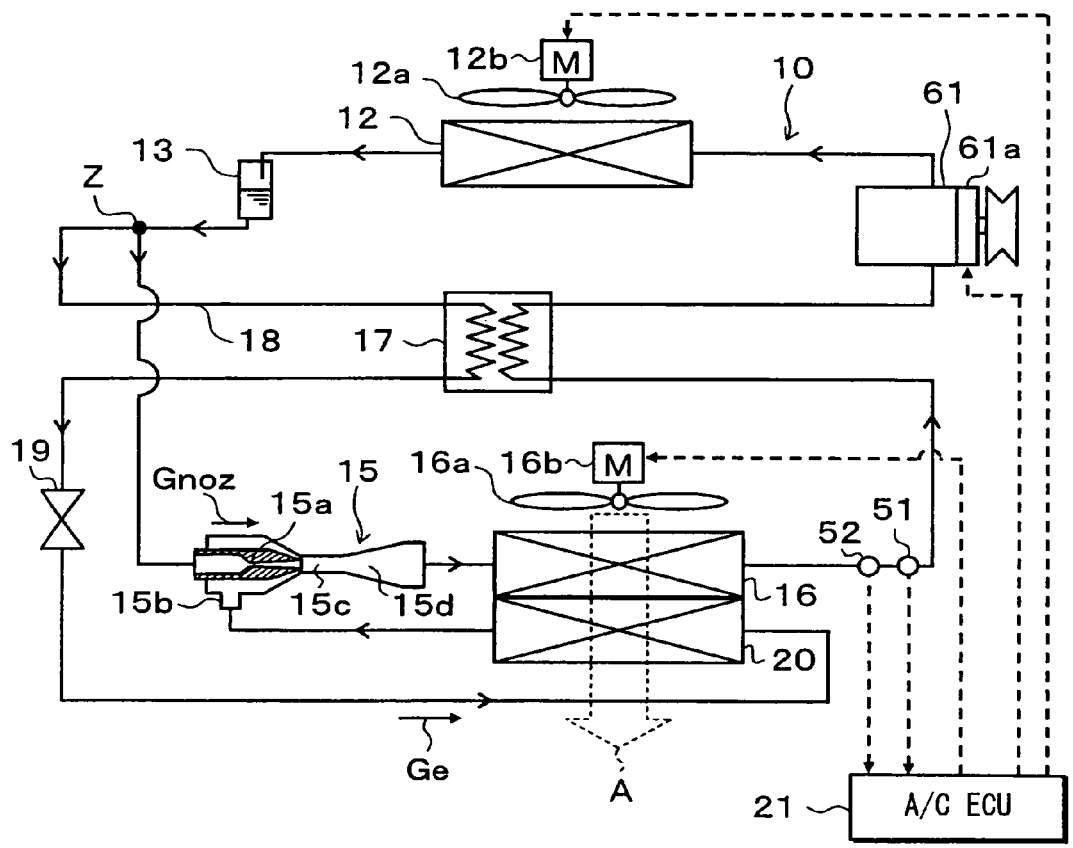
FIG. 5 is a schematic diagram showing an ejector cycle system according to a fifth embodiment of the present invention.

The fourth embodiment uses a variable displacement compressor 11. In this embodiment, as illustrated in FIG. 5, the variable compressor 11 described above is disused, and a fixed displacement compressor 61 is provided. The compressor 61 is provided with an electromagnetic clutch 61a of the same construction as the electromagnetic clutch 11a. The compressor 61 is rotationally driven by an engine for vehicle running through the electromagnetic clutch 61a and a belt.

The air conditioning controller 21 varies applied voltage V2 so that a computed degree of superheat approaches a predetermined value. That is, in this embodiment, the temperature sensor 51 and the pressure sensor 52 are a means for detecting the physical quantities related to the state of refrigerant in the cycle; the electric motor 16b for driving the blower 16a for evaporator makes an air quantity adjusting means.

The structure for determining a flow ratio η with respect to the area and the like of the refrigerant passage in the nozzle portion 15a of the ejector 15 and the throttling opening of the fixed throttle 19 and the other aspects of the cycle configuration can be made to be the same as in the fourth embodiment.

Description will be given to the operation of this fifth embodiment. As an example, it will be assumed that the cooling load of the first evaporator 16 is increased. When the degree of superheat of refrigerant on the outlet side of the first evaporator 16 increases and exceeds a predetermined value, the air conditioning controller 21 increases the applied voltage V2 applied to the electric motor 16b for driving.

When the applied voltage V2 is increased, the quantity of air sent by the blower 16a for evaporator is increased. For this reason, the refrigerant evaporating temperature and pressure in the first evaporator 16 are increased. Thus, the inlet refrigerant pressure Ps of the compressor 11 can be raised to increase the density of refrigerant drawn into the compressor 61; therefore, the refrigerant discharge flow rate of the compressor 61 is virtually increased. As a result, the degree of superheat of refrigerant on the outlet side of the first evaporator 16 can be controlled so that it approaches a predetermined value.

When the quantity of air sent by the blower 16a for evaporator is increased, there is a possibility that the degree of superheat of refrigerant on the outlet side of the first evaporator 16 is further increased. To prevent reduction in the cooling capacity of the entire cycle due to increase in degree of superheat, this embodiment is applied to a cycle in which increase in the cooling capacity of the entire cycle owing to increase in the refrigerant discharge flow rate of the compressor 61 is greater than the above reduction.

In this fifth embodiment, as mentioned above, the air conditioning controller 21 controls the quantity of air sent by the blower 16a for evaporator so that the degree of superheat of refrigerant on the outlet side of the first evaporator 16 approaches a predetermined value. Even in this case, completely the same effect as with the fourth embodiment can be obtained.

Sixth Embodiment

Figure 6:
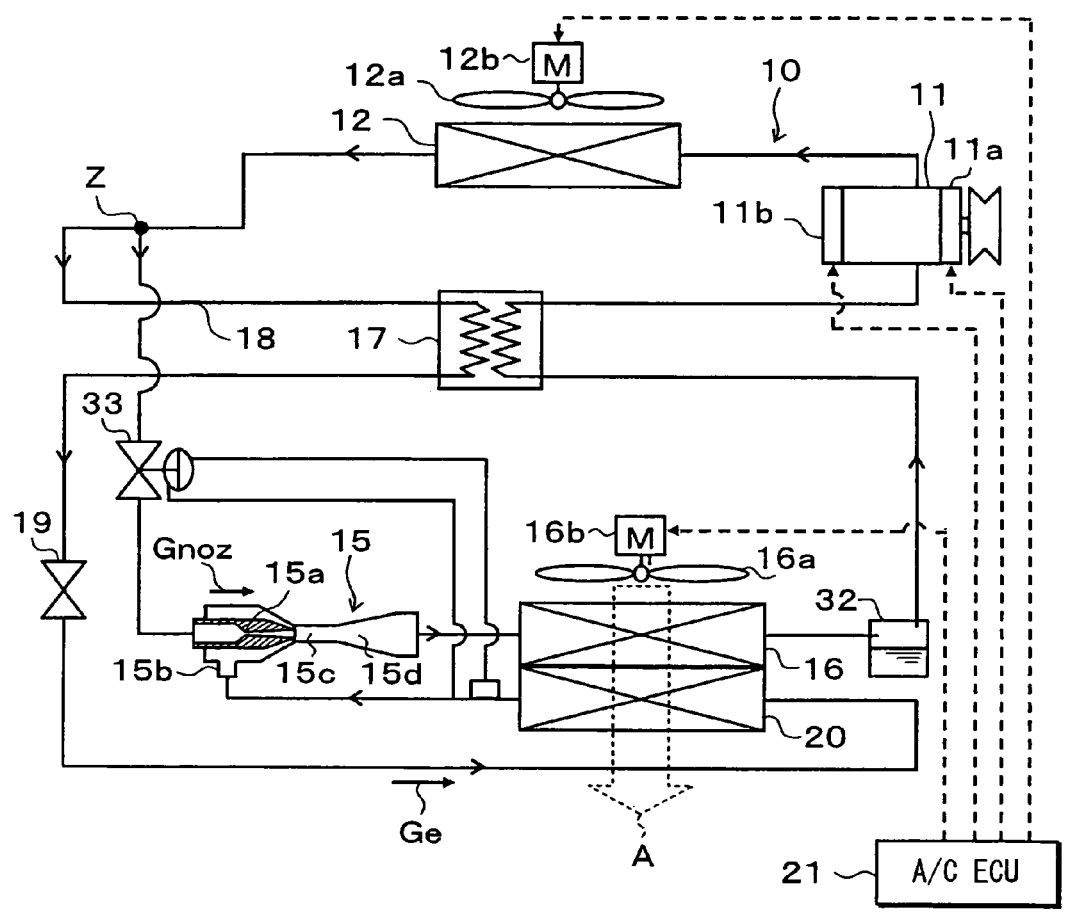
FIG. 6 is a schematic diagram showing an ejector cycle system according to a sixth embodiment of the present invention.

In the first embodiment, the liquid receiver 13 is located between the radiator 12 and the branch portion Z, and the variable throttling mechanism 14 is located between the branch portion Z and the ejector 15. In the sixth embodiment, as illustrated in FIG. 6, the liquid receiver 13 and the variable throttling mechanism 14 are disused; an accumulator 32 for separating liquid phase refrigerant and vapor phase refrigerant from each other is provided downstream of the first evaporator 16; and a variable throttling mechanism 33 is provided between the branch portion Z and the ejector 15.

The variable throttling mechanism 33 is a thermal expansion valve that adjusts the refrigerant flow rate so that the degree of superheat of refrigerant on the outlet side of the second evaporator 20 approaches a predetermined value. The construction of the thermal expansion valve is the same as in the first embodiment. In this embodiment, the temperature sensitive cylinder and equalizing pipe of the variable throttling mechanism 33 displace the valve body of the variable throttling mechanism 33 according to the temperature and pressure of refrigerant on the outlet side of the second evaporator 20.

That is, the valve body of the variable throttling mechanism 33 makes a means for adjusting the flow ratio ($\eta$), the temperature sensitive cylinder and equalizing pipe of the variable throttling mechanism 33 make a means for detecting the physical quantities related to the state of refrigerant in the cycle.

The throttling opening of the fixed throttle 19 in this embodiment is set beforehand to a predetermined amount so that the flow ratio $\eta$ becomes equal to the optimum flow ratio $\eta$max. The flow ratio $\eta$ is a ratio of Ge to Gnoz, where Ge is the flow rate of refrigerant drawn into the refrigerant suction port 15b of the ejector 15; and Gnoz is the flow rate of refrigerant that passes through the variable throttling mechanism 33 when the degree of superheat of refrigerant on the outlet side of the second evaporator 20 becomes equal to a predetermined value, and further passes through the nozzle portion 15a of the ejector 15. The other aspects of the cycle configuration are the same as in the first embodiment.

Therefore, when the cycle in this embodiment is operated, the variable throttling mechanism 33 adjusts the refrigerant flow rate Gnoz so that the degree of superheat of refrigerant on the outlet side of the second evaporator 20 approaches a predetermined value. As a result, the flow ratio $\eta$ is so adjusted that it approaches the optimum flow ratio $\eta$max; therefore, operation can be performed with the entire cycle delivering high cooling capacity.

Since the accumulator 32 is provided on the outlet side of the first evaporator 16, liquid phase refrigerant can be prevented from returning to the compressor 11, and the stability of the cycle can be ensured.

Seventh Embodiment

Figure 7:
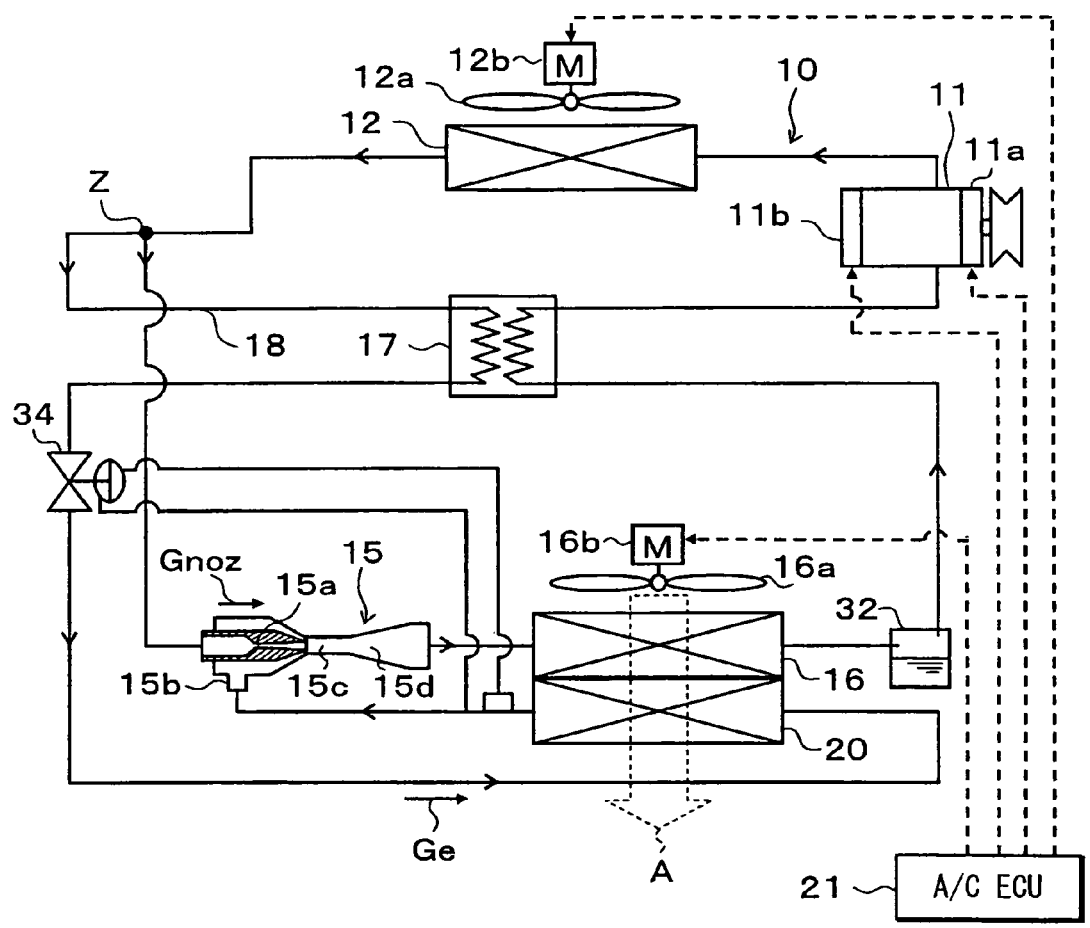
FIG. 7 is a schematic diagram showing an ejector cycle system according to a seventh embodiment of the present invention.

In the sixth embodiment, the variable throttling mechanism 33 is located between the branch portion Z and the ejector 15, and the fixed throttle 19 is located in the branch passage 18. In this embodiment, as illustrated in FIG. 7, the variable throttling mechanism 33 and the fixed throttle 19 are disused, and a variable throttling mechanism 34 is provided in the branch passage 18.

The variable throttling mechanism 34 is a thermal expansion valve that adjusts the refrigerant flow rate so that the degree of superheat of refrigerant on the outlet side of the second evaporator 20 approaches a predetermined value. The construction of the thermal expansion valve is the same as in the sixth embodiment. That is, the valve body of the variable throttling mechanism 34 makes a means for adjusting the flow ratio ($\eta$); and the temperature sensitive cylinder and equalizing pipe of the variable throttling mechanism 34 make a means for detecting the physical quantities related to the state of refrigerant in the cycle.

The area and the like of the refrigerant passage in the nozzle portion 15a of the ejector 15 in this embodiment are set beforehand to predetermined amounts so that the flow ratio $\eta$ becomes equal to the optimum flow ratio $\eta$max. The flow ratio $\eta$ is a ratio of Ge to Gnoz, where Ge is the flow rate of refrigerant drawn into the refrigerant suction port 15b of the ejector 15; and Gnoz is the flow rate of refrigerant observed when the degree of superheat of refrigerant on the outlet side of the second evaporator 20 becomes equal to a predetermined value. The other aspects of the cycle configuration are the same as in the sixth embodiment.

Therefore, when the cycle in this embodiment is operated, the variable throttling mechanism 34 adjusts the refrigerant flow rate Ge so that the degree of superheat of refrigerant on the outlet side of the second evaporator 20 approaches a predetermined value. As a result, the flow ratio $\eta$ is so adjusted that it approaches the optimum flow ratio $\eta$max, and thus the same effect as with the sixth embodiment can be obtained.

Eighth Embodiment

Figure 8:
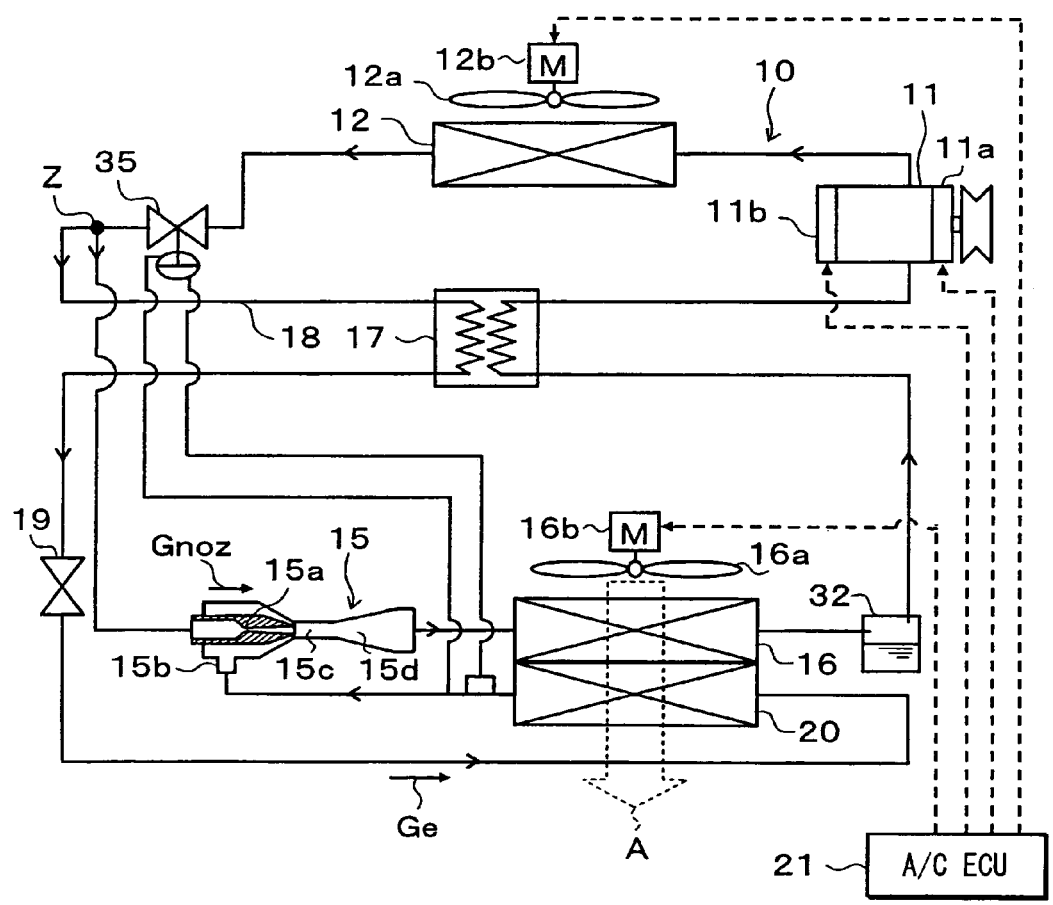
FIG. 8 is a schematic diagram showing an ejector cycle system according to an eighth embodiment of the present invention.

In the sixth embodiment, the variable throttling mechanism 33 is located between the branch portion Z and the ejector 15. In this embodiment, as illustrated in FIG. 8, the variable throttling mechanism 33 is disused, and a variable throttling mechanism 35 is provided between the radiator 12 and the branch portion Z.

The variable throttling mechanism 35 is a thermal expansion valve that adjusts the refrigerant flow rate so that the degree of superheat of refrigerant on the outlet side of the second evaporator 20 approaches a predetermined value. The construction of the thermal expansion valve is the same as in the sixth embodiment. That is, the valve body of the variable throttling mechanism 35 is a means for adjusting the refrigerant flow rate of the entire cycle; and the temperature sensitive cylinder and equalizing pipe of the variable throttling mechanism 35 are a means for detecting the physical quantities related to the state of refrigerant in the cycle.

In this embodiment, the area and the like of the refrigerant passage in the nozzle portion 15a of the ejector 15 and the throttling opening of the fixed throttle 19 are set beforehand to predetermined amounts so that the following is implemented: the flow ratio $\eta$ becomes equal to the optimum flow ratio $\eta$max with respect to the flow rate of refrigerant that passes through the variable throttling mechanism 35 when the degree of superheat of refrigerant on the outlet side of the second evaporator 20 becomes equal to a predetermined value. The other aspects of the cycle configuration are the same as in the sixth embodiment.

Therefore, when the cycle in this embodiment is operated, the variable throttling mechanism 35 adjusts the flow rate of refrigerant passing through the variable throttling mechanism 35 so that the degree of superheat of refrigerant on the outlet side of the second evaporator 20 approaches a predetermined value. As a result, the flow ratio η is so adjusted that it approaches the optimum flow ratio ηmax, and thus completely the same effect as with the sixth embodiment can be obtained.

Ninth Embodiment

Figure 9:
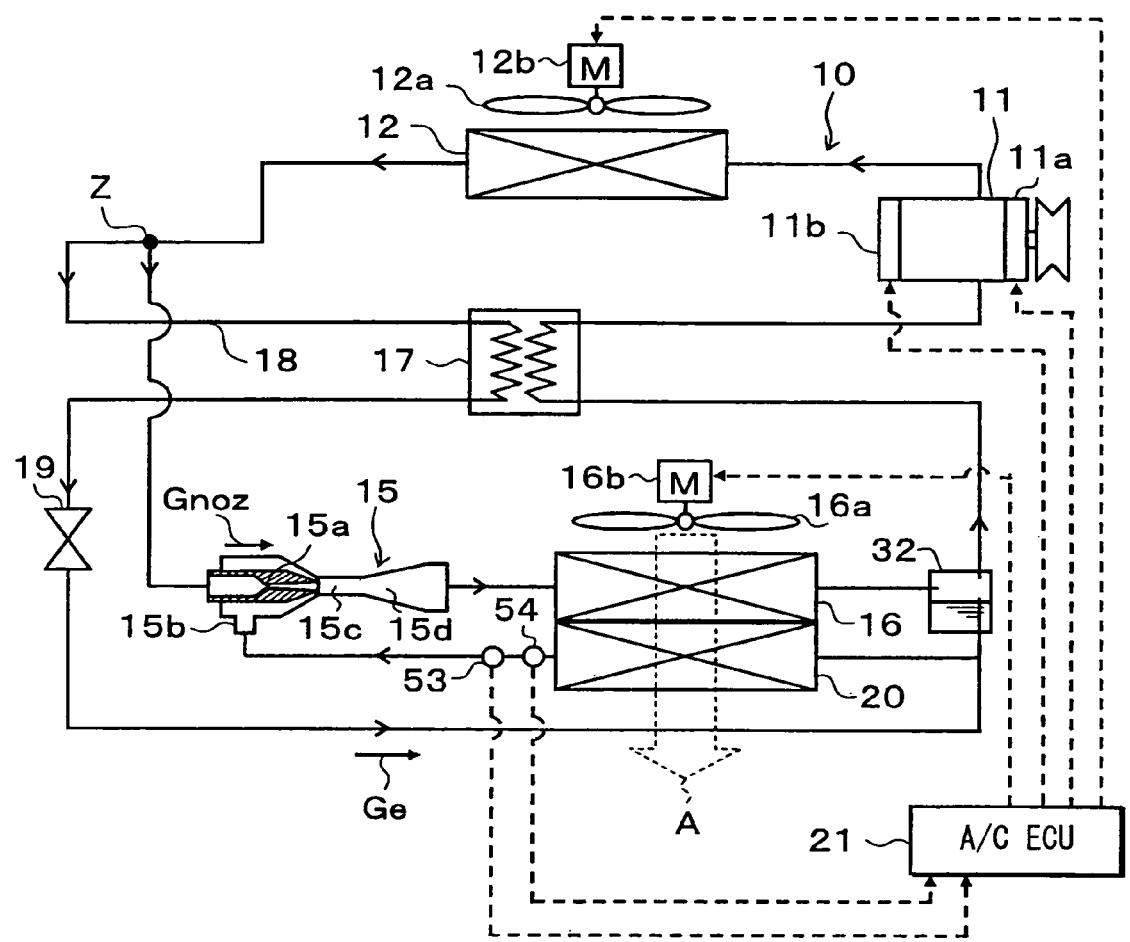
FIG. 9 is a schematic diagram showing an ejector cycle system according to a ninth embodiment of the present invention.

In the sixth embodiment, the variable throttling mechanism 33 is located between the branch portion Z and the ejector 15. In this ninth embodiment, as illustrated in FIG. 9, the variable throttling mechanism 33 is disused; and a temperature sensor 53 and a pressure sensor 54 are provided. The temperature sensor 53 detects the temperature Ts2 of refrigerant on the outlet side of the second evaporator 20, and the pressure sensor 54 detects its pressure Ps2.

The detection values of the temperature sensor 53 and the pressure sensor 54 are inputted to the air conditioning controller 21. Based on the detection values, the air conditioning controller 21 computes the degree of superheat of refrigerant on the outlet side of the second evaporator 20. That is, in this embodiment, the temperature sensor 53 and the pressure sensor 54 make a means for detecting the physical quantities related to the state of refrigerant in the cycle.

The air conditioning controller 21 controls the control current In so that the computed degree of superheat approaches a predetermined value, and the electromagnetic capacity control valve 11b adjusts the discharge capacity of the compressor 11. That is, in this embodiment, the electromagnetic capacity control valve 11b is a discharge flow rate varying means.

In this ninth embodiment, the area and the like of the refrigerant passage in the nozzle portion 15a of the ejector 15 and the throttling opening of the fixed throttle 19 are set beforehand to predetermined amounts, so that the flow ratio η becomes equal to the optimum flow ratio ηmax with respect to the refrigerant discharge flow rate of the compressor 11 observed when the degree of superheat of refrigerant on the outlet side of the second evaporator 20 becomes equal to a predetermined value. The other aspects of the cycle configuration are the same as in the sixth embodiment.

Therefore, when the cycle in this ninth embodiment is operated, the air conditioning controller 21 carries out control as in the fourth embodiment. That is, it controls the refrigerant discharge flow rate of the compressor 11 so that the degree of superheat of refrigerant on the outlet side of the second evaporator 20 approaches a predetermined value. Therefore, the flow ratio η is also adjusted so that it approaches the optimum flow ratio ηmax. As a result, the same effect as with the sixth embodiment can be obtained.

Further, as in the fourth embodiment, the discharge flow rate of the compressor 11 can be prevented from being unnecessarily increased, and the power saving effect can be further achieved.

10th Embodiment

Figure 10:
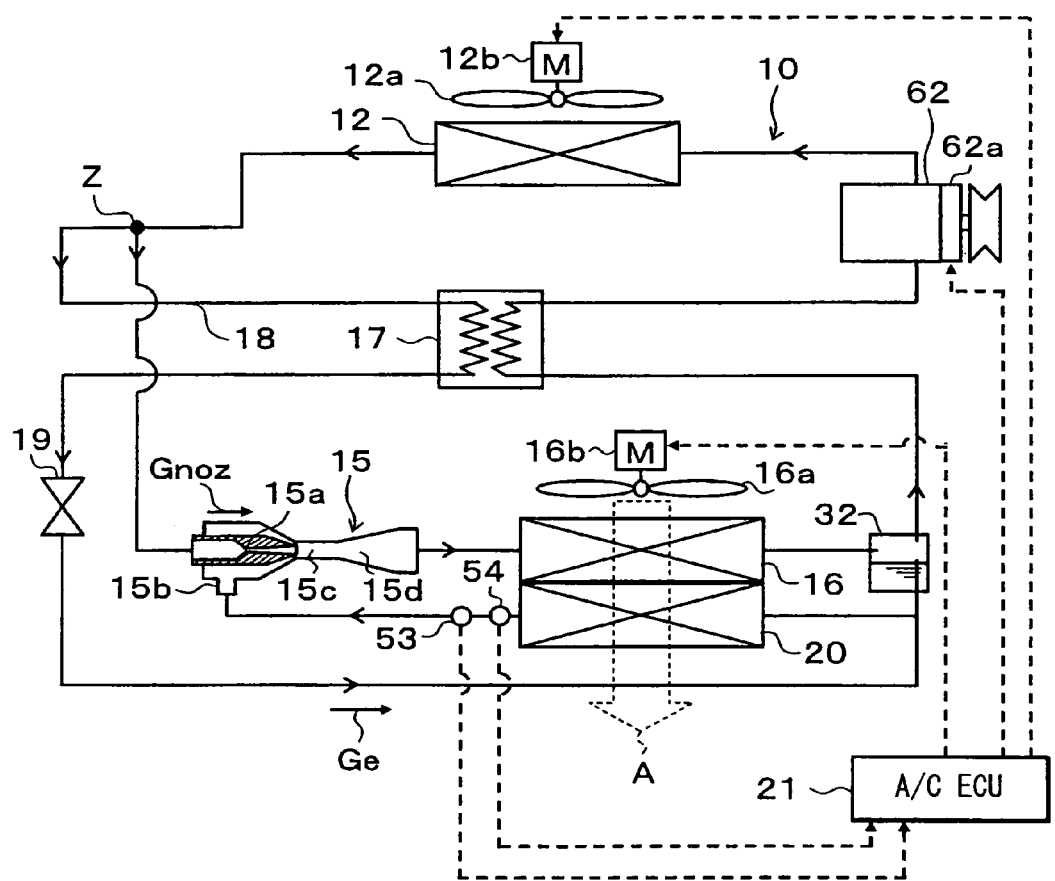
FIG. 10 is a schematic diagram showing an ejector cycle system according to a 10th embodiment of the present invention.

The ninth embodiment uses a variable displacement compressor 11. In this embodiment, as illustrated in FIG. 10, the compressor 11 is disused, and a fixed displacement compressor 62 is provided. The compressor 62 is provided with an electromagnetic clutch 62a of the same construction as the electromagnetic clutch 11a. The compressor 62 is rotationally driven by an engine for vehicle running through the electromagnetic clutch 62a and a belt.

The air conditioning controller 21 varies applied voltage V2 so that a computed degree of superheat approaches a predetermined value. That is, in this embodiment, the temperature sensor 53 and the pressure sensor 54 are a means for detecting the physical quantities related to the state of refrigerant in the cycle; the electric motor 16b for driving the blower 16a for evaporator makes an air quantity adjusting means.

The design for determining a flow ratio η with respect to the area and the like of the refrigerant passage in the nozzle portion 15a of the ejector 15 and the throttling opening of the fixed throttle 19 and the other aspects of the cycle configuration are the same as in the ninth embodiment.

When the cycle in this embodiment is operated, the refrigerant discharge flow rate of the compressor 62 can be virtually varied as in the fifth embodiment. The degree of superheat of refrigerant on the outlet side of the second evaporator 20 can be controlled so that it approaches a predetermined value. Therefore, completely the same effect as with the ninth embodiment can be obtained.

11th Embodiment

Figure 11:
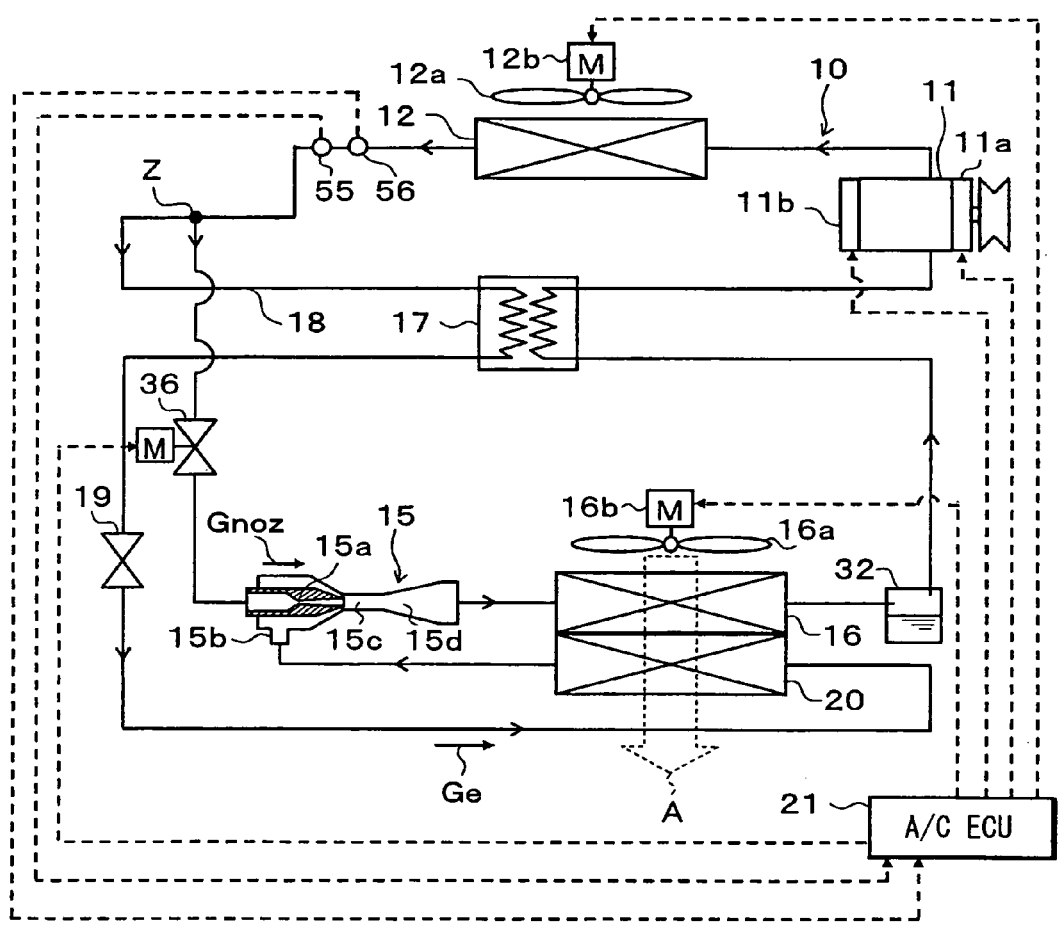
FIG. 11 is a schematic diagram showing an ejector cycle system according to an 11th embodiment of the present invention.

In the sixth embodiment, the variable throttling mechanism 33 is located between the branch portion Z and the ejector 15. In this 11th embodiment, as illustrated in FIG. 11, the following measure is taken: the variable throttling mechanism 33 is disused; an electric variable throttling mechanism 36 is located between the branch portion Z and the ejector 15; and a temperature sensor 55 and a pressure sensor 56 are provided. The temperature sensor 55 detects the temperature Tc of refrigerant on the outlet side of the radiator 12 and the pressure sensor 56 detects its pressure Pc.

The electric variable throttling mechanism 36 includes: a valve mechanism that adjusts the area of the refrigerant passage; and a stepping motor that is rotationally driven by a control signal (pulse signal) outputted from the air conditioning controller 21. The variable throttling mechanism 36 is a flow control valve so constructed that, when the stepping motor is rotated, the valve body of the valve mechanism is displaced and the area of the refrigerant passage can be continuously adjusted.

The detection values of the temperature sensor 55 and the pressure sensor 56 are inputted to the air conditioning controller 21. Based on the detection values, the air conditioning controller 21 computes the degree of subcooling of refrigerant on the outlet side of the radiator 12. It outputs a control signal (pulse signal) so that the degree of subcooling of refrigerant on the outlet side of the radiator 12 approaches a predetermined value. Thus, it adjusts the area of the refrigerant passage in the electric variable throttling mechanism 36.

That is, the electric variable throttling mechanism 36 in this embodiment is a means for adjusting the flow ratio (η); and the temperature sensor 55 and the pressure sensor 56 make a means for detecting the physical quantities related to the state of refrigerant in the cycle.

The throttling opening of the fixed throttle 19 in this embodiment is set beforehand to a predetermined amount so that the following is implemented: the flow ratio η becomes equal to the optimum flow ratio ηmax. The flow ratio η is a ratio of Ge to Gnoz, where Ge is the flow rate of refrigerant drawn into the refrigerant suction port 15b of the ejector 15; and Gnoz is the flow rate of refrigerant that passes through the electric variable throttling mechanism 36 when the degree of subcooling of refrigerant on the outlet side of the radiator 12 becomes equal to a predetermined value and further passes through the nozzle portion 15a of the ejector 15. The other aspects of the cycle configuration of this embodiment are the same as in the sixth embodiment.

Therefore, when the cycle in this embodiment is operated, the air conditioning controller 21 controls the electric variable throttling mechanism 36. It thereby controls the refrigerant flow rate Gnoz so that the degree of subcooling of refrigerant on the outlet side of the radiator 12 approaches a predetermined value. As a result, the flow ratio η is so adjusted that it approaches the optimum flow ratio ηmax, and thus the same effect as with the sixth embodiment can be obtained.

In cases where this embodiment is so constructed that the compressor 11 pressurizes refrigerant to supercritical pressure, the air conditioning controller 21 cannot compute the degree of subcooling. In these cases, the air conditioning controller 21 controls the electric variable throttling mechanism 36 so that the pressure of refrigerant on the outlet side of the radiator 12 becomes equal to a predetermined value.

The throttling opening of the fixed throttle 19 is set beforehand to a predetermined amount so that the flow ratio η becomes equal to the optimum flow ratio ηmax. The flow ratio η is a ratio of Ge to Gnoz, where Ge is the flow rate of refrigerant drawn into the refrigerant suction port 15b of the ejector 15; and Gnoz is the flow rate of refrigerant that passes through the electric variable throttling mechanism 36 when the pressure of refrigerant on the outlet side of the radiator 12 becomes equal to a predetermined value, and further passes through the nozzle portion 15a of the ejector 15. Thus, even in a cycle in which refrigerant is brought into supercritical state, completely the same effect as with the sixth embodiment can be obtained.

As a modification, this embodiment may be so constructed that the following is implemented: it is made possible for the air conditioning controller 21 to store the output (number of pulse counts) of a control signal (pulse signal) it outputs to the electric variable throttling mechanism 36; and it stores beforehand the area of the refrigerant passage in the electric variable throttling mechanism 36 corresponding to the output (number of pulse counts) of a control signal (pulse signal) and the throttling opening of the fixed throttle 19.

Thus, the air conditioning controller 21 can estimate the actual flow ratio η by: grasping the area of the refrigerant passage in the electric variable throttling mechanism 36 based on the output (number of pulse counts) of a control signal (pulse signal); and comparing it with the stored throttling opening of the fixed throttle 19.

The air conditioning controller 21 displaces the valve body of the electric variable throttling mechanism 36 so that the actual flow ratio η approaches the optimum flow ratio ηmax. As a result, operation can be performed with the entire cycle delivering high cooling capacity.

12th Embodiment

Figure 12:
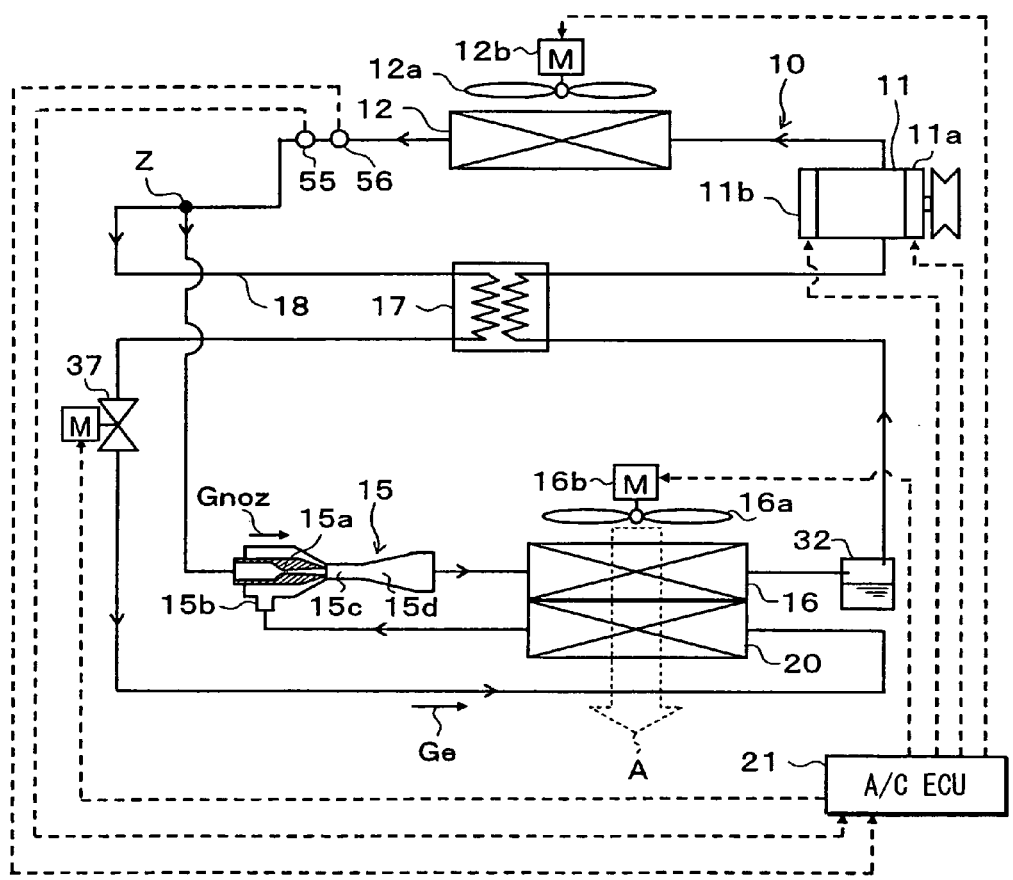
FIG. 12 is a schematic diagram showing an ejector cycle system according to a 12th embodiment of the present invention.

In the 11th embodiment, the electric variable throttling mechanism 36 is located between the branch portion Z and the ejector 15, and the fixed throttle 19 is located in the branch passage 18. In this 12th embodiment, as illustrated in FIG. 12, the electric variable throttling mechanism 36 and the fixed throttle 19 are disused, and an electric variable throttling mechanism 37 is provided in the branch passage 18.

The construction of the electric variable throttling mechanism 37 is the same as in the 11th embodiment. The air conditioning controller 21 adjusts the area of the refrigerant passage in the electric variable throttling mechanism 37 by: computing the degree of subcooling of refrigerant on the outlet side of the radiator 12 based on detection values; and outputting a control signal (pulse signal) so that the degree of subcooling of refrigerant on the outlet side of the radiator 12 approaches a predetermined value.

That is, the electric variable throttling mechanism 37 in this embodiment makes a means for adjusting the flow ratio (η); and the temperature sensor 55 and the pressure sensor 56 make a means for detecting the physical quantities related to the state of refrigerant in the cycle.

The area and the like of the refrigerant passage in the nozzle portion 15a of the ejector 15 in this embodiment are set beforehand to predetermined amounts so that the flow ratio η becomes equal to the optimum flow ratio ηmax. The flow ratio η is a ratio of Ge to Gnoz, where Ge is the flow rate of refrigerant drawn into the refrigerant suction port 15b of the ejector 15; and Gnoz is the flow rate of refrigerant observed when the degree of subcooling of refrigerant on the outlet side of the radiator 12 becomes equal to a predetermined value. The other aspects of the cycle configuration of the 12th embodiment are the same as in the 11th Embodiment.

Therefore, when the cycle in this embodiment is operated, the air conditioning controller 21 controls the electric variable throttling mechanism 37. It thereby controls the refrigerant flow rate Ge so that the degree of subcooling of refrigerant on the outlet side of the radiator 12 approaches a predetermined value. As a result, the flow ratio η is so adjusted that it approaches the optimum flow ratio ηmax, and thus the same effect as with the 11th embodiment can be obtained.

This 12th embodiment may be constructed as the 11th embodiment is. That is, it is made possible for the air conditioning controller 21 to store the output (number of pulse counts) of a control signal (pulse signal) it outputs to the electric variable throttling mechanism 37; and it stores beforehand the area of the refrigerant passage in the electric variable throttling mechanism 37 corresponding to the output (number of pulse counts) of a control signal (pulse signal) and the throttling opening of the nozzle portion 15a of the ejector 15.

Thus, the air conditioning controller 21 can estimate the actual flow ratio η, and control the flow ratio η so that it approaches the optimum flow ratio ηmax. Therefore, as in the 11th embodiment, operation can be performed with high cooling capacity delivered.

13th Embodiment

Figure 13:
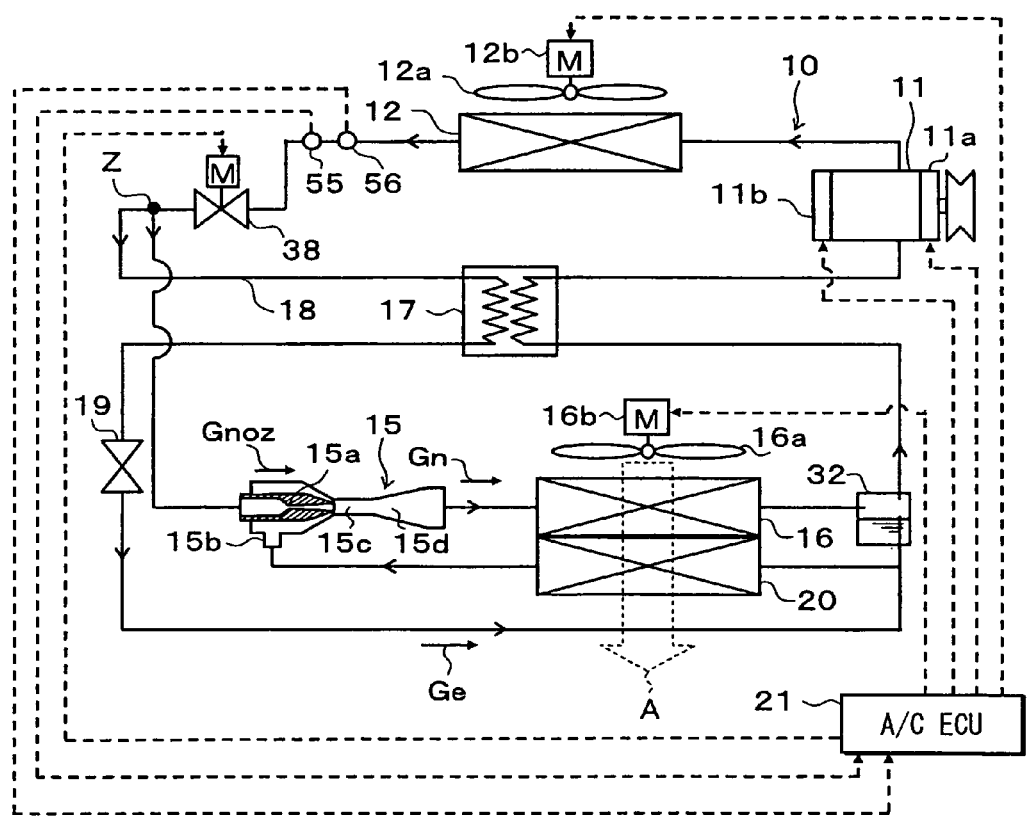
FIG. 13 is a schematic diagram showing an ejector cycle system according to a 13th embodiment of the present invention.

In the 11th embodiment, the electric variable throttling mechanism 36 is located between the branch portion Z and the ejector 15. In this embodiment, as illustrated in FIG. 13, the electric variable throttling mechanism 36 is disused, and an electric variable throttling mechanism 38 is provided downstream of the temperature sensor 55 and the pressure sensor 56 between the radiator 12 and the branch portion Z.

The construction of the electric variable throttling mechanism 38 is the same as in the 11th embodiment. The air conditioning controller 21 adjusts the area of the refrigerant passage in the electric variable throttling mechanism 38 by: computing the degree of subcooling of refrigerant on the outlet side of the radiator 12 based on detection values; and outputting a control signal (pulse signal) so that the degree of subcooling of refrigerant on the outlet side of the radiator 12 approaches a predetermined value.

That is, the electric variable throttling mechanism 38 in this embodiment is a means for adjusting the refrigerant flow rate of the entire cycle; and the temperature sensor 55 and the pressure sensor 56 are a means for detecting the physical quantities related to the state of refrigerant in the cycle.

In this embodiment, the area and the like of the refrigerant passage in the nozzle portion 15a of the ejector 15 and the throttling opening of the fixed throttle 19 are set beforehand to predetermined amounts, so that the flow ratio η becomes equal to the optimum flow ratio ηmax with respect to the flow rate of refrigerant that passes through the electric variable throttling mechanism 38 when the degree of subcooling of refrigerant on the outlet side of the radiator 12 becomes equal to a predetermined value. The other aspects of the cycle configuration of the 13th embodiment are the same as in the 11th embodiment.

Therefore, when the cycle in this embodiment is operated, the electric variable throttling mechanism 38 operates to control the flow rate of refrigerant passing through the electric variable throttling mechanism 38 so that the degree of subcooling of refrigerant on the outlet side of the radiator 12 approaches a predetermined value. As a result, the flow ratio η is so adjusted that it approaches the optimum flow ratio ηmax, and thus the same effect as with the 11th embodiment can be obtained.

14th Embodiment

Figure 14:
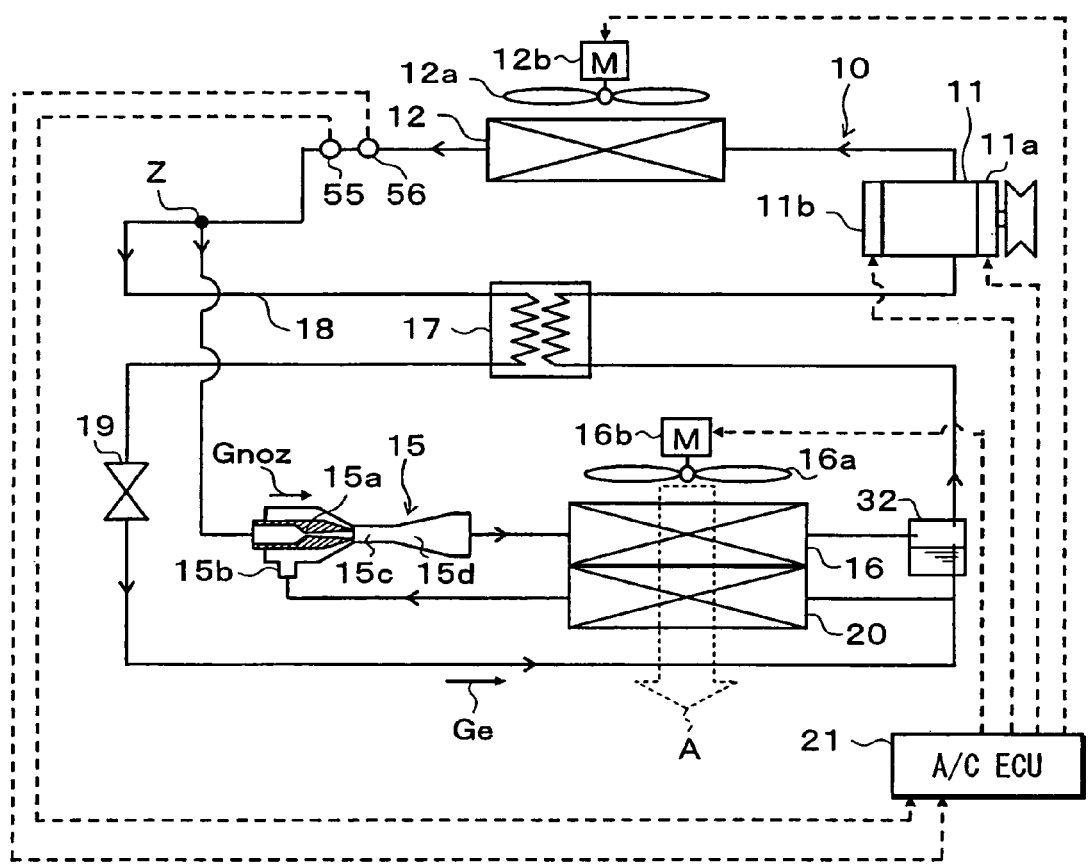
FIG. 14 is a schematic diagram showing an ejector cycle system according to a 14th embodiment of the present invention.

In the 11th embodiment, the electric variable throttling mechanism 36 is located between the branch portion Z and the ejector 15. In this embodiment, as illustrated in FIG. 14, the electric variable throttling mechanism 36 is disused.

The air conditioning controller 21 controls the control current In so that the degree of subcooling of refrigerant on the outlet side of the radiator 12 approaches a predetermined value. The electromagnetic capacity control valve 11b adjusts the discharge capacity of the compressor 11. That is, in this embodiment, the electromagnetic capacity control valve 11b is a discharge flow rate varying means; and the temperature sensor 55 and the pressure sensor 56 make a means for detecting the physical quantities related to the state of refrigerant in the cycle.

In this 14th embodiment, the area and the like of the refrigerant passage in the nozzle portion 15a of the ejector 15 and the throttling opening of the fixed throttle 19 are set beforehand to predetermined amounts so that the following is implemented: the flow ratio η becomes equal to the optimum flow ratio ηmax with respect to the refrigerant discharge flow rate of the compressor 11 observed when the degree of subcooling of refrigerant on the outlet side of the radiator 12 becomes equal to a predetermined value. The other aspects of the cycle configuration are the same as in the 11th embodiment.

Therefore, when the cycle in this embodiment is operated, the following takes place as in the fourth embodiment: the air conditioning controller 21 controls the control current In so that the degree of subcooling of refrigerant on the outlet side of the radiator 12 approaches a predetermined value; and the electromagnetic capacity control valve 11b that makes a discharge flow rate varying means adjusts the discharge capacity of the compressor 11. Therefore, the flow ratio η is also adjusted so that it approaches the optimum flow ratio ηmax. As a result, completely the same effect as with the 11th embodiment can be obtained.

Further, as in the fourth embodiment, the discharge flow rate of the compressor 11 can be prevented from being unnecessarily increased, and the power saving effect can be further achieved.

15th Embodiment

Figure 15:
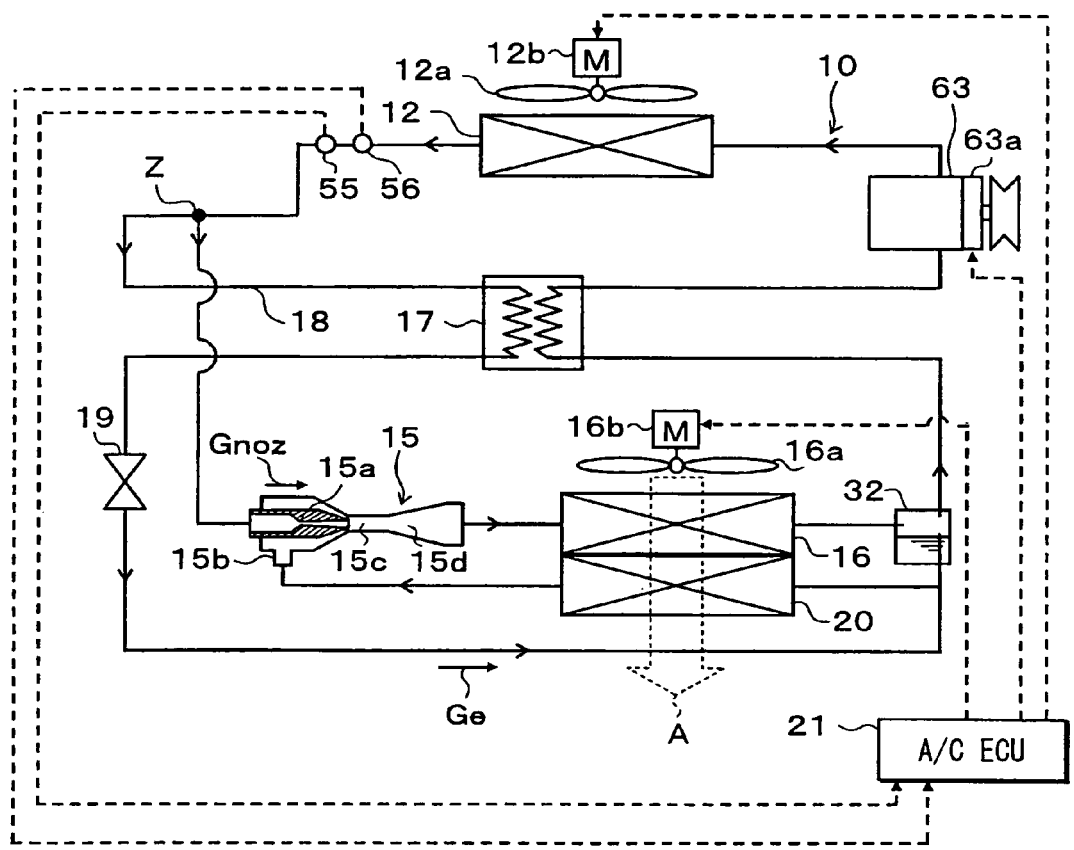
FIG. 15 is a schematic diagram showing an ejector cycle system according to a 15th embodiment of the present invention.

The 14th embodiment uses a variable displacement compressor 11. In this embodiment, as illustrated in FIG. 15, the compressor 11 is disused, and a fixed displacement compressor 63 is provided. The compressor 63 is provided with an electromagnetic clutch 63a of the same construction as the electromagnetic clutch 11a. The compressor 63 is rotationally driven by an engine for vehicle running through the electromagnetic clutch 63a and a belt.

The air conditioning controller 21 varies the applied voltage V2 so that a computed degree of subcooling approaches a predetermined value. That is, in this embodiment, the temperature sensor 55 and the pressure sensor 56 are a means for detecting the physical quantities related to the state of refrigerant in the cycle; and the electric motor 16b for driving the blower 16a for evaporator makes an air quantity adjusting means.

The design for determining a flow ratio η with respect to the area and the like of the refrigerant passage in the nozzle portion 15a of the ejector 15 and the throttling opening of the fixed throttle 19 and the other aspects of the cycle configuration are the same as in the 14th embodiment.

When the cycle in this embodiment is operated, the following can be implemented as in the fifth embodiment: the refrigerant discharge flow rate of the compressor 63 can be virtually varied, and the degree of subcooling of refrigerant on the outlet side of the radiator 12 can be controlled so that it approaches a predetermined value. Therefore, completely the same effect as with the 14th embodiment can be obtained.

16th Embodiment

Figure 16:
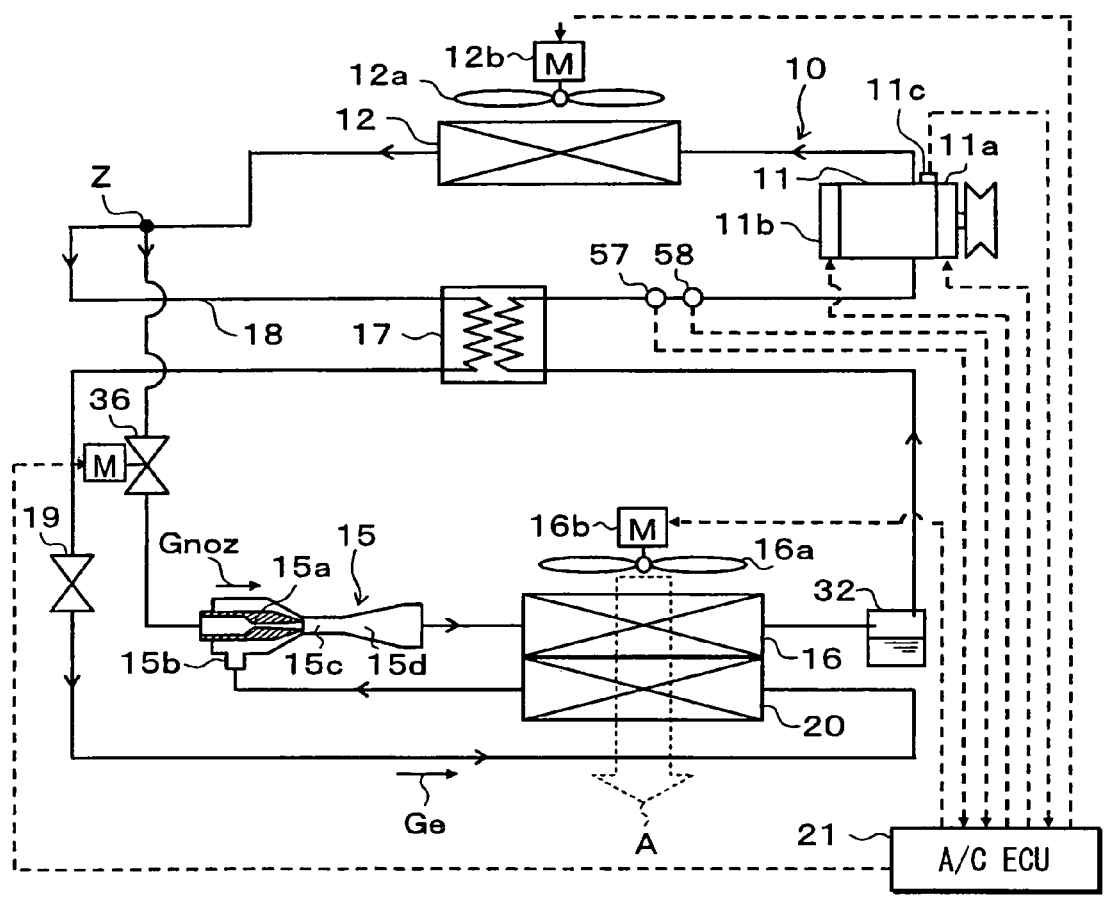
FIG. 16 is a schematic diagram showing an ejector cycle system according to a 16th embodiment of the present invention.

In the 11th embodiment, the temperature sensor 55 and the pressure sensor 56 are placed on the outlet side of the radiator 12. In this embodiment, as illustrated in FIG. 16, the temperature sensor 55 and the pressure sensor 56 are disused; a temperature sensor 57 and a pressure sensor 58 are provided; and a tachometer 11c is provided on the compressor 11. The temperature sensor 57 detects the temperature Tsi of refrigerant on the inlet side of the compressor 11 between the internal heat exchanger 17 connected to the outlet of the first evaporator 16 and the compressor 11. The pressure sensor 58 detects its pressure Psi.

The tachometer 11c detects the number of revolutions Nc of the compressor 11, and is a magnetic revolution sensor that detects change in magnetic flux due to the rotation of the compressor 11 with a Hall element or an MRE element. Or, a number of revolutions Nc may be computed by detecting a number of engine revolutions Ne from an engine ECU.

The detection values of the temperature sensor 57, pressure sensor 58, and tachometer 11c are inputted to the air conditioning controller 21. The air conditioning controller 21 computes the inlet refrigerant density of the compressor 11 based on Tsi and Psi. Then, it computes the refrigerant discharge flow rate of the compressor 11 from this inlet refrigerant density, the number of revolutions Nc, and the control current In.

In the air conditioning controller 21, there are beforehand stored the area of the refrigerant passage corresponding to the output (number of pulse counts) of a control signal (pulse signal) outputted to the electric variable throttling mechanism 36 and the throttling opening of the fixed throttle 19. The area of the refrigerant passage in the electric variable throttling mechanism 36 is varied so that the flow ratio η becomes equal to the optimum flow ratio ηmax with respect the computed refrigerant discharge flow rate. The other aspects of the cycle configuration of the 16th embodiment are the same as in the 11th embodiment.

That is, in this 16th embodiment, the electric variable throttling mechanism 36 is a means for adjusting the flow ratio (η); and the temperature sensor 57, pressure sensor 58, and tachometer 11c are a means for detecting the physical quantities related to the state of refrigerant in the cycle.

Therefore, when the cycle in this embodiment is operated, the air conditioning controller 21 computes the refrigerant discharge flow rate of the compressor 11. It adjusts the area of the refrigerant passage in the electric variable throttling mechanism 36 so that the flow ratio $\eta$ becomes equal to the optimum flow ratio $\eta$max based on the following: the computed refrigerant discharge flow rate; and the area of the refrigerant passage corresponding to the output (number of pulse counts) of a control signal (pulse signal) to the electric variable throttling mechanism 36 and the throttling opening of the fixed throttle 19, stored beforehand. As a result, the same effect as in the 11th embodiment can be obtained.

17th Embodiment

Figure 17:
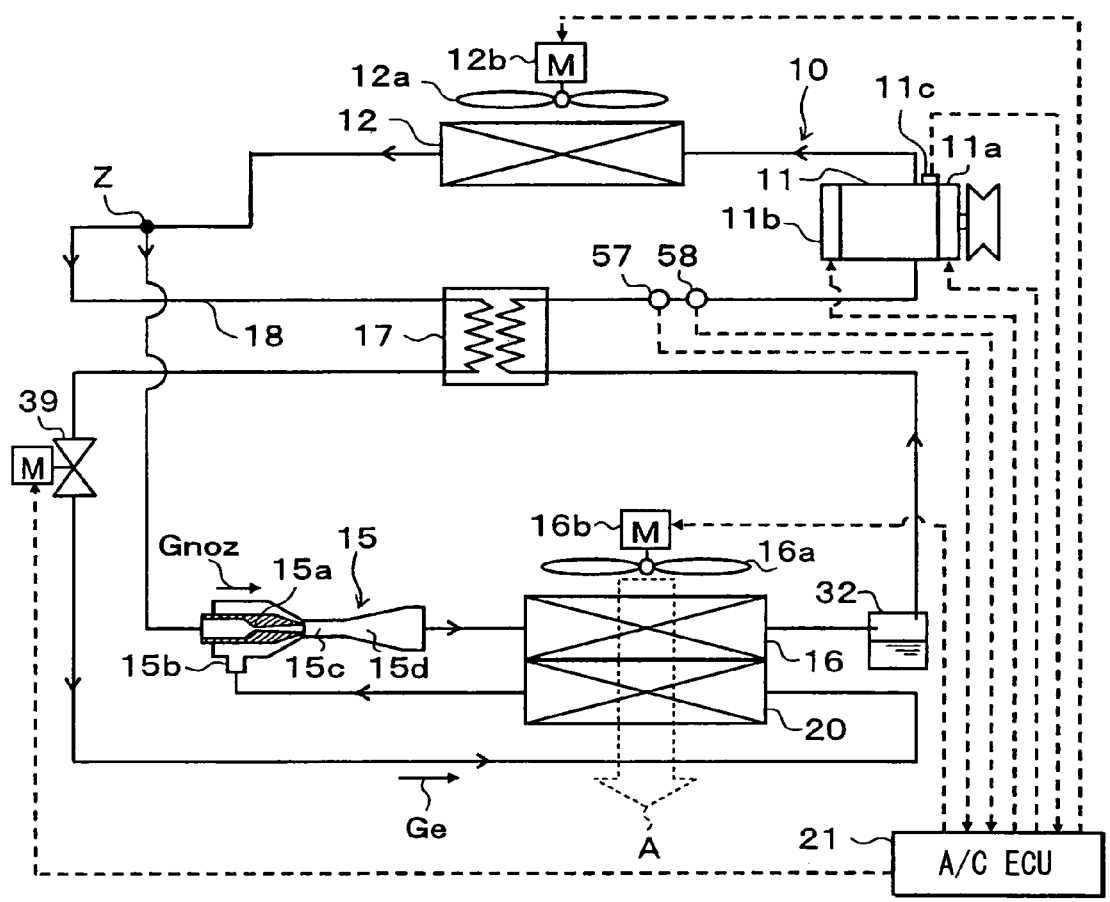
FIG. 17 is a schematic diagram showing an ejector cycle system according to a 17th embodiment of the present invention.

In the 16th embodiment, the electric variable throttling mechanism 36 is located between the branch portion Z and the ejector 15, and the fixed throttle 19 is located in the branch passage 18. In this embodiment, as illustrated in FIG. 17, the electric variable throttling mechanism 36 and the fixed throttle 19 are disused, and an electric variable throttling mechanism 39 is provided in the branch passage 18.

As in the 16th embodiment, the air conditioning controller 21 computes the refrigerant discharge flow rate of the compressor 11 from Tsi, Psi, the number of revolutions Nc, and the control current In. In the air conditioning controller 21, there are beforehand stored the area of the refrigerant passage corresponding to the output (number of pulse counts) of a control signal (pulse signal) outputted to the electric variable throttling mechanism 39 and the throttling opening of the nozzle portion 15a of the ejector 15.

The air conditioning controller 21 controls the area of the refrigerant passage in the electric variable throttling mechanism 39 so that the flow ratio $\eta$ becomes equal to the optimum flow ratio $\eta$max with respect to the computed refrigerant discharge flow rate. The other aspects of the cycle configuration are the same as in the 16th embodiment.

That is, in this embodiment, the electric variable throttling mechanism 39 is a means for adjusting the flow ratio ($\eta$); and the temperature sensor 57, pressure sensor 58, and tachometer 11c are a means for detecting the physical quantities related to the state of refrigerant in the cycle.

Therefore, when the cycle in this embodiment is operated, the air conditioning controller 21 computes the refrigerant discharge flow rate of the compressor 11. Then, it adjusts the area of the refrigerant passage in the variable throttling mechanism 39 so that the flow ratio $\eta$ becomes equal to the optimum flow ratio $\eta$max based on the following: the computed refrigerant discharge flow rate; and the area of the refrigerant passage corresponding to the output (number of pulse counts) of a control signal (pulse signal) to the electric variable throttling mechanism 39 and the throttling opening of the nozzle portion 15a of the ejector 15, stored beforehand. As a result, in the 17th embodiment, the same effect as with the 16th embodiment can be obtained.

18th Embodiment

Figure 18:
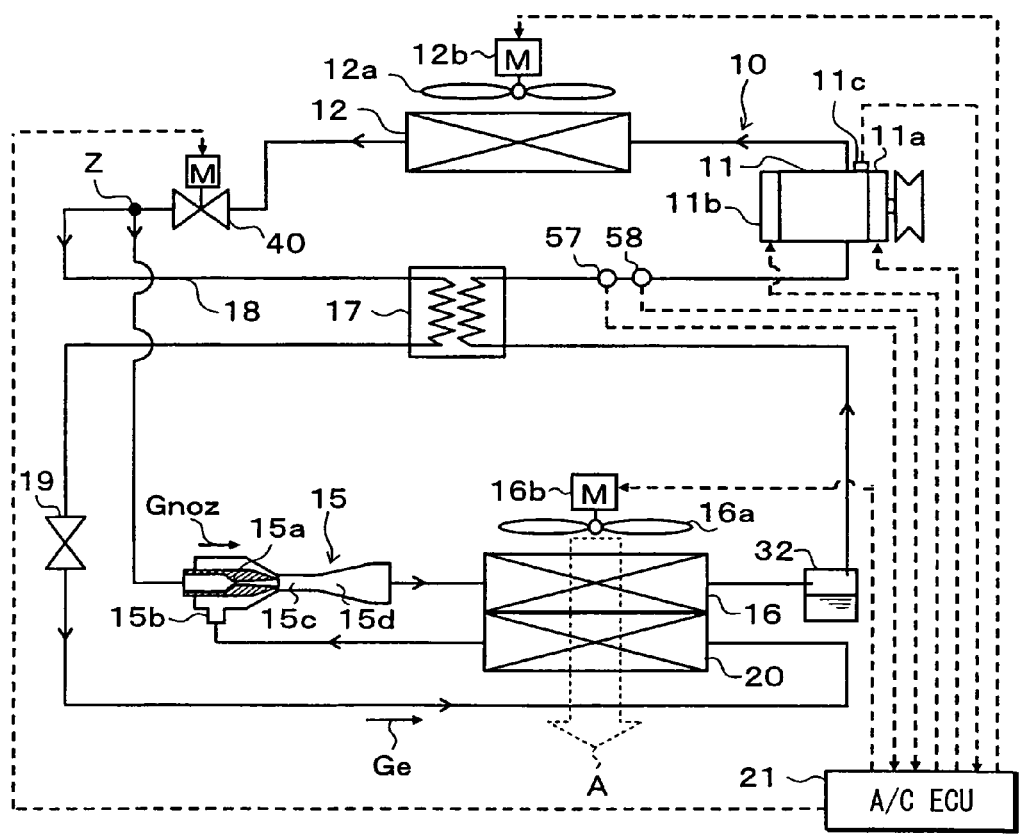
FIG. 18 is a schematic diagram showing an ejector cycle system according to a 18th embodiment of the present invention.

In the 16th embodiment, the electric variable throttling mechanism 36 is located between the branch portion Z and the ejector 15. In this embodiment, as illustrated in FIG. 18, the electric variable throttling mechanism 36 is disused, and an electric variable throttling mechanism 40 is provided between the radiator 12 and the branch portion Z.

As in the 16th embodiment, the air conditioning controller 21 computes the refrigerant discharge flow rate of the compressor 11 from Tsi, Psi, the number of revolutions Nc, and the control current In. In the air conditioning controller 21, there is beforehand stored the area of the refrigerant passage corresponding to the output (number of pulse counts) of a control signal (pulse signal) outputted to the electric variable throttling mechanism 40.

In this embodiment, the area and the like of the refrigerant passage in the nozzle portion 15a of the ejector 15 and the throttling opening of the fixed throttle 19 are set beforehand to predetermined amounts so that the following is implemented: the flow ratio $\eta$ becomes equal to the optimum flow ratio $\eta$max when the flow rate of refrigerant passing through the electric variable throttling mechanism 40 becomes equal to a predetermined value. The other aspects of the cycle configuration are the same as in the 16th embodiment.

That is, in this embodiment, the electric variable throttling mechanism 40 is a means for adjusting the refrigerant flow rate of the entire cycle; and the temperature sensor 57, pressure sensor 58, tachometer 11c are a means for detecting the physical quantities related to the state of refrigerant in the cycle.

Therefore, when the cycle in this embodiment is operated, the air conditioning controller 21 computes the refrigerant discharge flow rate of the compressor 11. Therefore, the area of the refrigerant passage in the electric variable throttling mechanism 40 is adjusted so that the flow rate of refrigerant passing through the electric variable throttling mechanism 40 becomes equal to a predetermined value, based on the following: the computed refrigerant discharge flow rate; and the area of the refrigerant passage corresponding to the output (number of pulse counts) of a control signal (pulse signal) to the electric variable throttling mechanism 40, stored beforehand. As a result, in the 18th embodiment, the flow ratio $\eta$ approaches the optimum flow ratio $\eta$max, and thus the same effect as with the 16th embodiment can be obtained.

19th Embodiment

Figure 19:
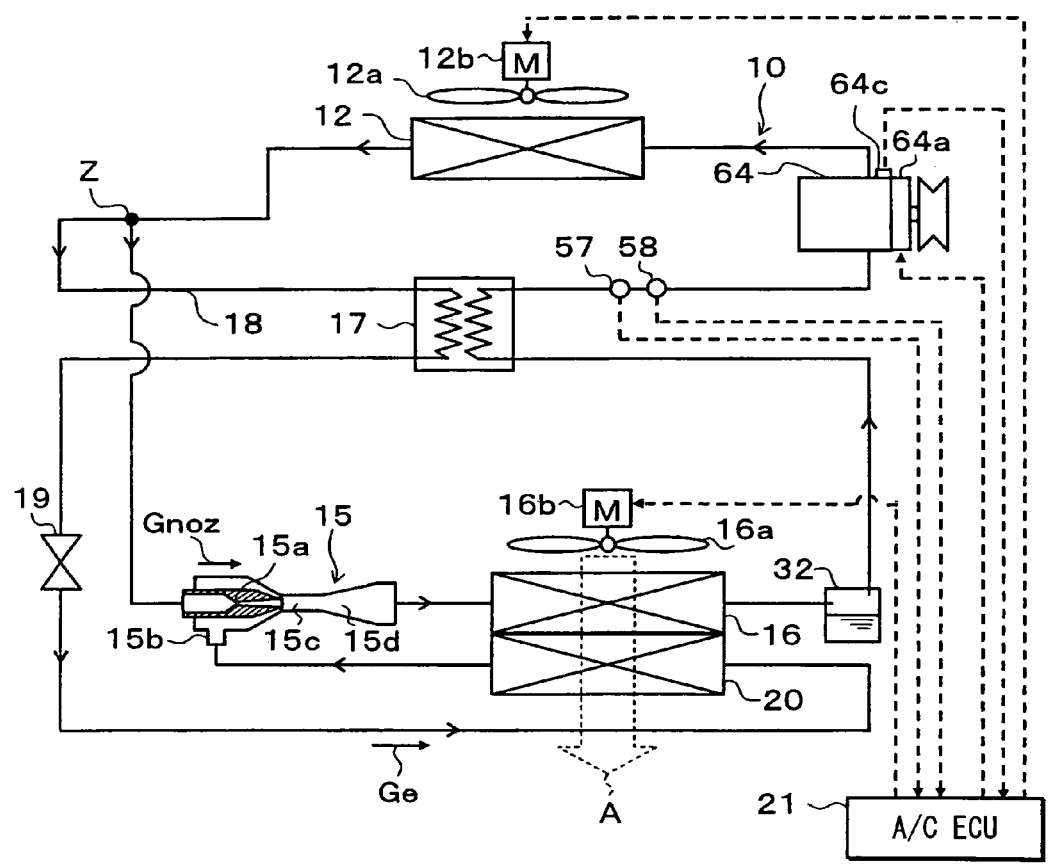
FIG. 19 is a schematic diagram showing an ejector cycle system according to a 19th embodiment of the present invention.

In the 16th embodiment, the electric variable throttling mechanism 36 is located between the branch portion Z and the ejector 15, and a variable displacement compressor 11 is used. In this embodiment, as illustrated in FIG. 19, the electric variable throttling mechanism 36 and the compressor 11 are disused, and a fixed displacement compressor 64 is provided.

The compressor 64 is provided with an electromagnetic clutch 64a of the same construction as the electromagnetic clutch 11a. The compressor 64 is rotationally driven by an engine for vehicle running through the electromagnetic clutch 64a and a belt. In addition, the compressor 64 is provided with a tachometer 64c that is of the same construction as the tachometer 11c and detects the number of revolutions Nc of the compressor 64.

As in the 16th embodiment, the air conditioning controller 21 computes the refrigerant discharge flow rate of the compressor 11 from Tsi, Psi, the number of revolutions Nc, and the control current In. It adjusts the applied voltage V2 so that the computed refrigerant discharge flow rate approaches a predetermined value, and thereby adjusts the air quantity of the blower 16a for evaporator.

In this embodiment, the area of the refrigerant passage in the nozzle portion 15a of the ejector 15 and the throttling opening of the fixed throttle 19 are set beforehand to predetermined amounts so that the following is implemented: the flow ratio $\eta$ becomes equal to the optimum flow ratio $\eta$max when the refrigerant discharge flow rate of the compressor 64 becomes equal to a predetermined value. The other aspects of the cycle configuration are the same as in the 16th embodiment.

That is, in this embodiment, the electric motor 16b for driving the blower 16a for evaporator is an air quantity adjusting means; and the temperature sensor 57, pressure sensor 58, and tachometer 64c are a means for detecting the physical quantities related to the state of refrigerant in the cycle.

When the cycle in this embodiment is operated, the following can be implemented as in the fifth embodiment: the refrigerant discharge flow rate of the compressor 64 can be virtually varied, and the refrigerant discharge flow rate can be so adjusted that it approaches a predetermined value. Therefore, in the 19$^{th}$ embodiment, completely the same effect as with the 16th embodiment can be obtained.

20th Embodiment

Figure 20:
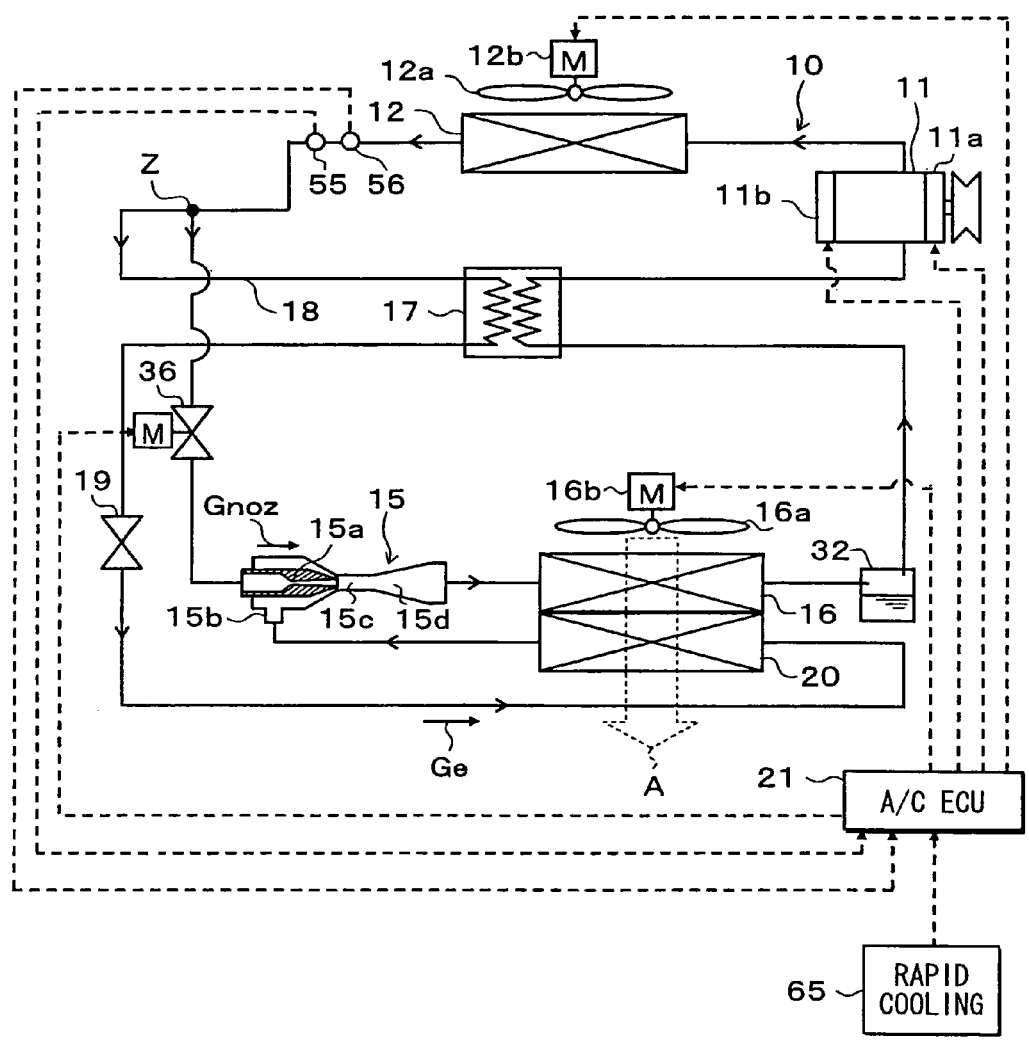
FIG. 20 is a schematic diagram showing an ejector cycle system according to 20th-22nd embodiments of the present invention.

In the above-described 11th embodiment, the air conditioning controller 21 controls the electric variable throttling mechanism 36 to make the flow ratio η approach the optimum flow ratio ηmax. Thus, operation is performed with the entire cycle delivering high cooling capacity. In this embodiment, as illustrated in FIG. 20, when a request to rapidly cool the space to be cooled is received from a user, the air conditioning controller 21 closes the electric variable throttling mechanism 36, and thereby rapidly cools the space to be cooled. (This is hereafter referred to as rapid cooling operation.)

The rapid cooling switch 65 provided in the operation panel is an operating member operated by the user, and the actuating signal of the rapid cooling switch 65 is inputted to the air conditioning controller 21. The rapid cooling switch 65 corresponds to the inputting means in the invention.

When the rapid cooling switch 65 is turned on and an actuating signal from the rapid cooling switch 65 is inputted to the air conditioning controller 21, the air conditioning controller 21 determines that it is required to rapidly cool the space to be cooled. Therefore, the air conditioning controller 21 corresponds to the determining means in the invention.

When the air conditioning controller 21 determines that it is required to rapidly cool the space to be cooled, the air conditioning controller 21 carries out control so as to close the refrigerant passage in the electric variable throttling mechanism 36. Thus, the refrigerant flow to the nozzle portion 15a of the ejector 15 is interrupted.

When the refrigerant flow to the nozzle portion 15a of the ejector 15 is interrupted, the divided refrigerant all flows along the branch passage 18; therefore, the refrigerant flow rate of the branch passage 18 is increased. When the refrigerant flow rate of the branch passage 18 is increased, the flow rate of the refrigerant flowing into the fixed throttle 19 is increased, and the flow velocity of refrigerant is increased. Since the amount of depressurization in the fixed throttle 19 is increased for this reason, the pressure of refrigerant lowered through the fixed throttle 19 becomes lower as compared with when the refrigerant flow is separated.

Thus, the refrigerant evaporating pressure of the second evaporator 20 can be lowered, and its refrigerant evaporating temperature can be lowered. As a result, the air temperature from the second evaporator 20 is lowered, and thus rapid cooling can be carried out.

In this embodiment, the rapid cooling operation is added to the ejector cycle system in the 11th embodiment. Similarly with this embodiment, the rapid cooling operation can also be added to other embodiments in which the electric variable throttling mechanism 36 is located between the branch portion Z and the ejector 15. Specifically, similarly with this embodiment, the rapid cooling operation can be added to the 16th embodiment.

21st Embodiment

In the 20th embodiment, the rapid cooling operation is performed by closing the electric variable throttling mechanism 36. In this embodiment, the rapid cooling operation is performed by increasing the discharge capacity of the compressor 11.

The cycle configuration in this embodiment is the same as in the 20th embodiment shown in FIG. 20.

When the rapid cooling switch 65 is turned on and an actuating signal from the rapid cooling switch 65 is inputted to the air conditioning controller 21, the following takes place: the air conditioning controller 21 controls the control current In it outputs to the electromagnetic capacity control valve 11b, and thereby increases the discharge capacity of the compressor 11.

When the discharge capacity of the compressor 11 is increased, the following are both increased: the flow rate Gnoz of refrigerant that passes through the nozzle portion 15a of the ejector 15; and the flow rate Ge of refrigerant drawn into the refrigerant suction port 15b of the ejector 15. For this reason, the cooling capability of refrigerant becomes excessive relative to the cooling capability of air in the first evaporator 16 and the second evaporator 20. Consequently, the cycle is balanced so that the low pressure is lowered and the refrigerant flow rate is reduced.

Thus, the refrigerant evaporating pressures of the first evaporator 16 and the second evaporator 20 can be lowered, and their refrigerant evaporating temperatures can be lowered. As a result, the air temperatures from the first evaporator 16 and the second evaporator 20 are lowered, and thus rapid cooling can be carried out.

Further, the air conditioning controller 21 controls the electric variable throttling mechanism 36. It thereby controls the refrigerant flow rate Gnoz so that the degree of subcooling of refrigerant on the outlet side of the radiator 12 approaches a predetermined value. As a result, the flow ratio η is so adjusted that it approaches the optimum flow ratio ηmax, and thus the rapid cooling operation can be performed with the entire cycle delivering high cooling capacity.

This embodiment may be so constructed as described below. When the discharge capacity of the compressor 11 is increased, the electric variable throttling mechanism 36 is controlled so that the flow rate Gnoz of refrigerant passing through the nozzle portion 15a of the ejector 15 is not increased. In this case, only the flow rate Ge of refrigerant drawn into the refrigerant suction port 15b of the ejector 15 is increased. Thus, rapid cooling may be carried out by lowering only the air temperature from the second evaporator 20.

In this embodiment, the rapid cooling operation is added to the ejector cycle system in the 11th embodiment. Similarly with this embodiment, the rapid cooling operation can also be added to other embodiments in which the variable displacement compressor 11 is used. Specifically, similarly with this embodiment, the rapid cooling operation can be added to the first to fourth, sixth to ninth, 12th to 14th, and 16th to 18th embodiments.

22nd Embodiment

In the 20th embodiment, the rapid cooling operation is performed by closing the electric variable throttling mechanism 36. In this embodiment, the rapid cooling operation is performed by reducing the quantity of air sent by the blower 16a for evaporator.

The cycle configuration in this embodiment is the same as in the 20th embodiment shown in FIG. 20.

When the rapid cooling switch 65 is turned on and an actuating signal from the rapid cooling switch 65 is inputted to the air conditioning controller 21, the following takes place: the air conditioning controller 21 lowers the applied voltage V2 applied to the electric motor 16b for driving. When the applied voltage V2 is lowered, the quantity of air sent by the blower 16a for evaporator is reduced.

When the quantity of air sent by the blower 16a for evaporator is reduced, the cooling capability of refrigerant becomes excessive relative to the cooling capability of air in the first evaporator 16 and the second evaporator 20. Consequently, the cycle is balanced so that the low pressure is lowered and the refrigerant flow rate is reduced.

Thus, the refrigerant evaporating pressures of the first evaporator 16 and the second evaporator 20 can be lowered, and their refrigerant evaporating temperatures can be lowered. As a result, the air temperatures from the first evaporator 16 and the second evaporator 20 are lowered, and thus rapid cooling can be carried out.

Further, the air conditioning controller 21 controls the electric variable throttling mechanism 36. It thereby controls the refrigerant flow rate Gnoz so that the degree of subcooling of refrigerant on the outlet side of the radiator 12 approaches a predetermined value. As a result, the flow ratio η is so adjusted that it approaches the optimum flow ratio ηmax, and thus the rapid cooling operation can be performed with the entire cycle delivering high cooling capacity.

In this embodiment, the rapid cooling operation is added to the ejector cycle system in the 11th embodiment. Similarly with this embodiment, the rapid cooling operation can also be added to other embodiments in which the quantity of air sent by the blower 16a for evaporator is adjusted with the electric motor 16b for driving. Specifically, similarly with this embodiment, the rapid cooling operation can be added to the first to 10th and 12th to 19th embodiments.

23rd Embodiment

In the 20th embodiment, the rapid cooling operation is performed by closing the electric variable throttling mechanism 36. In this embodiment, as illustrated in FIG. 21, the rapid cooling operation is performed by increasing the degree of superheat of refrigerant on the outlet side of the first evaporator 16.

Figure 21:
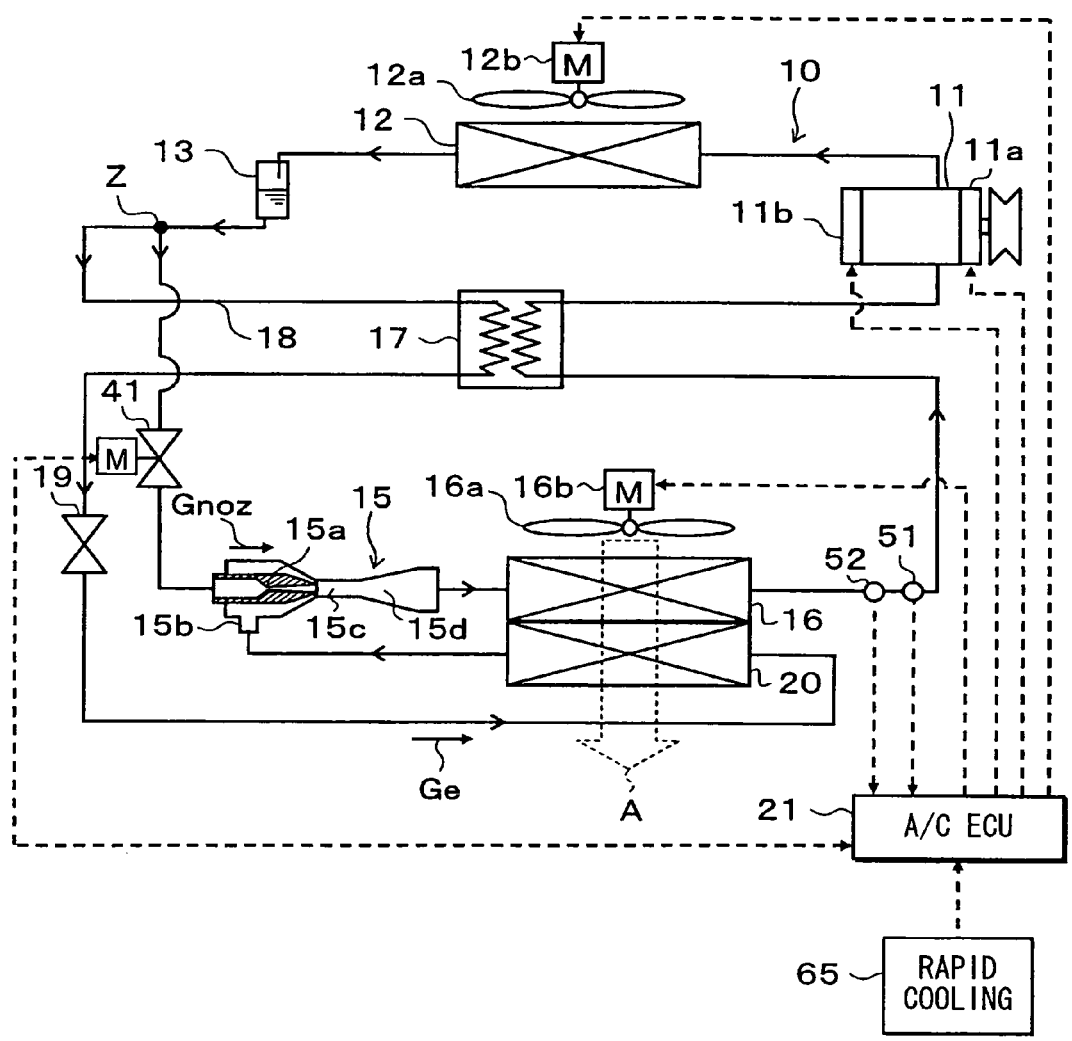
FIG. 21 is a schematic diagram showing an ejector cycle system according to a 23rd embodiment of the present invention.

FIG. 21 illustrates a system in which an electric variable throttling mechanism 41 and the rapid cooling switch 65 are added to the cycle in the fourth embodiment. The construction of the electric variable throttling mechanism 41 is the same as in the 11th embodiment, and it is located between the branch portion Z and the ejector 15. Similarly with the 20th to 22nd embodiments, the rapid cooling switch 65 is an operating member that is provided in the operation panel and is operated by a user.

In this embodiment, the detection values of the temperature sensor 51 and the pressure sensor 52 are inputted to the air conditioning controller 21; and based on the detection values, the air conditioning controller 21 computes a degree of superheat of refrigerant on the outlet side of the first evaporator 16. Further, the air conditioning controller 21 controls the control current In so that the computed degree of superheat approaches a predetermined value. The electromagnetic capacity control valve 11b adjusts the discharge capacity of the compressor 11.

When the rapid cooling switch 65 is turned on and an actuating signal from the rapid cooling switch 65 is inputted to the air conditioning controller 21, the following takes place: the air conditioning controller 21 increases a predetermined value of degree of superheat by a predetermined amount. Further, the air conditioning controller 21 controls the electric variable throttling mechanism 41. It thereby controls the refrigerant flow rate Gnoz so that the computed degree of superheat approaches to a predetermined value obtained by increasing it by the predetermined amount.

When the degree of superheat of refrigerant on the outlet side of the first evaporator 16 is increased by a predetermined amount, as mentioned above, the following takes place: the cooling capability of refrigerant becomes excessive relative to the cooling capability of air in the first evaporator 16. Consequently, the cycle is balanced so that the low pressure is lowered and the refrigerant flow rate is reduced.

As a result, the refrigerant evaporating pressure of the first evaporator 16 can be lowered, and the air temperature from the first evaporator 16 is lowered. Therefore, rapid cooling can be carried out.

In this embodiment, the air temperature flowing out of the first evaporator 16 is lowered by increasing the degree of superheat of refrigerant on the outlet side of the first evaporator 16. The air temperature from the second evaporator 20 may be lowered by increasing the degree of superheat of refrigerant on the outlet side of the second evaporator 20.

24th Embodiment

The ejector cycle system in this 24th embodiment is applied to an air conditioner for vehicle. Fluorocarbon refrigerant, hydrocarbon refrigerant, carbon dioxide, or the like can be used for the refrigerant.

Figure 22:
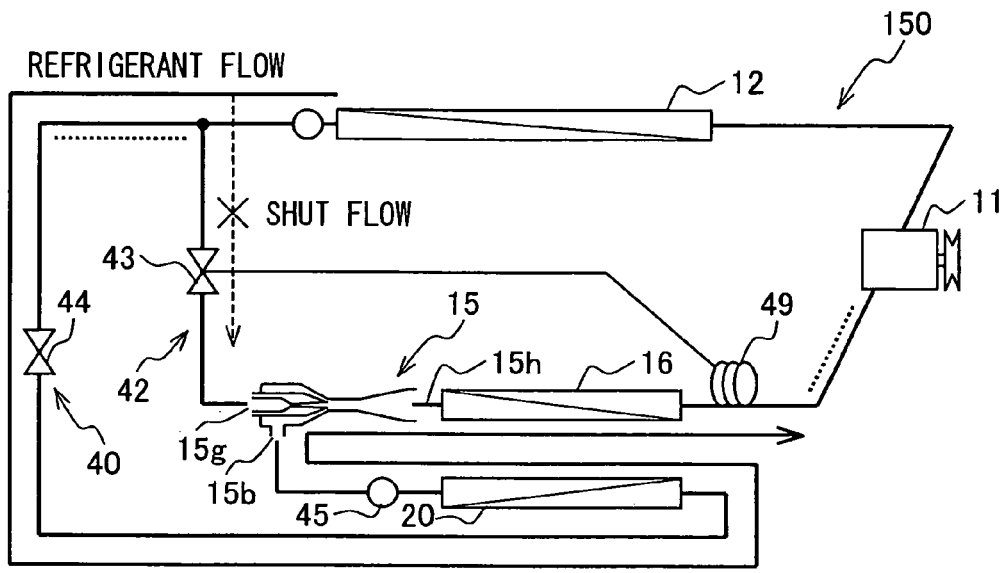
FIG. 22 is a schematic diagram showing an ejector cycle system according to a 24th embodiment of the present invention.

The ejector cycle 150 in the 24th embodiment illustrated in FIG. 22 includes: a compressor 11 that compresses refrigerant; a condenser 12 that cools and condenses high-temperature, high-pressure gas refrigerant; a variable expansion valve 43 and a fixed expansion valve 44 (flow control devices) that depressurize the high-temperature, high-pressure refrigerant at the outlet of the condenser 12; an ejector 15 that delivers suction force by the refrigerant, depressurized at the variable expansion valve 43, passing through it and being jetted from its nozzle at high speed; a first evaporator 16 that evaporates the refrigerant in two phases, vapor and liquid, discharged from the ejector 15 and thereby causes the evaporated refrigerant to exchange heat between it and air-conditioning air (external fluid); and a second evaporator 20 whose refrigerant outlet is connected to the suction port 15b of the ejector 15 and which evaporates the refrigerant in two phases, vapor and liquid, depressurized at the fixed expansion valve 44 and causes the evaporated refrigerant to exchange heat between it and air-conditioning air (external fluid). As illustrated in FIG. 22, these components are connected with one another through pipes. The variable expansion valve 43 and the fixed expansion valve 44 form flow control devices.

The pipe on the refrigerant outlet side of the condenser 12 is branched into two lines at an upstream side of the ejector 15. One refrigerant pipe line 42 is connected to a refrigerant inlet (nozzle inlet) 15g of the ejector 15 through the variable expansion valve 43. The other refrigerant pipe line 40 (bypass path) is connected to the refrigerant inlet (nozzle inlet) of the second evaporator 20 through the fixed expansion valve 44. A refrigerant outlet 15h of the ejector 15 is connected to the refrigerant inlet of the first evaporator 16, and refrigerant that flows out of the first evaporator 16 returns to the compressor 11. The refrigerant outlet of the second evaporator 20 is connected to the suction port 15b of the ejector 15, and refrigerant in two phases, vapor and liquid, is caused to flow in the second evaporator 20 by suction force produced by the refrigerant being jetted from the nozzle of the ejector 15 at high speed. The ejector 15 in this embodiment is of opening variable type, but it may have no opening adjusting function.

Hereafter, description will be given to the operation of this embodiment with respect to cases where the ejector cycle system applied to an air conditioner for vehicle is used for air conditioning.

The high-temperature, high-pressure refrigerant compressed by the compressor 11 is cooled by the outside air and is condensed in the condenser 12. As illustrated in FIG. 22, the refrigerant flow is thereafter divided. The refrigerant flow in one line passes through the variable expansion valve 43, and is depressurized and expanded into refrigerant in two phases, vapor and liquid. This refrigerant from the variable expansion valve 43 flows into the ejector 15, and is jetted from the nozzle of the ejector 15 at high speed and thereby delivers suction force. Further, the refrigerant flowing out of the ejector 15 flows into the first evaporator 16. The refrigerant flowing into the first evaporator 16 is evaporated by exchanging heat with air-conditioning air (external fluid) to cool the air-conditioning air (external fluid). The refrigerant in the other line is depressurized and expanded into refrigerant in two phases, vapor and liquid at the fixed expansion value 44, and flows into the second evaporator 20. The refrigerant flowing into the second evaporator 20 is evaporated there and thereby exchanges heat between it and the air-conditioning air (external fluid) to cool the air-conditioning air.

In the ejector cycle system 150 in this embodiment, the state of superheated gas (SH) on the refrigerant outlet side of the first evaporator 16 is measured with a measuring means 49 (a measuring unit) provided there. Then, the opening of the variable expansion valve 43 is adjusted according to the thermal (refrigeration) load. It is preferable that the state of superheated gas (SH) should be expressed by the temperature difference between saturated vapor temperature and superheated gas (vapor) temperature.

Description will be given to the operation control in this embodiment with reference to the flowchart in FIG. 23. The control of the ejector cycle system 150, including the control shown in this flowchart, is carried out by a controller not shown in FIG. 24. This controller provides a controlling means.

When control is started at Step S1, the operation proceeds to Step S2, and a controllable factor A is sensed. The controllable factor A in this embodiment is the state of superheated gas (SH) at the refrigerant outlet of the second evaporator 20, and is sensed by a first sensing means 45 in FIG. 22. In general, the state of superheated gas (SH) is the temperature difference between the saturated vapor temperature of refrigerant and superheated gas (vapor) temperature. The controllable factor A is detected during normal operation in which refrigerant is let through the second evaporator 20 by the sucking action of the ejector 15. The controllable factor A may be continuously sensed during the normal operation. The controllable factor A may be continuously sensed while the controller is in operation. After the controllable factor A is sensed at Step S2, the operation proceeds to Step S3. At Step S3, determination is made with respect to determination condition B. The determination condition B in this embodiment is whether SH is within a specified range or not (i.e., whether the above-mentioned temperature difference is equal to or smaller than a predetermined value in general cases). When SH is within the specified range of the determination condition B, the cycle is normally operating and the oil retained in the evaporator does not exceed its limit. Therefore, the operation proceeds to Step S5, and it is continued. That is, the operation returns to Step S1, and the control is continued.

When negative determination is made at Step S3, that is, when SH is out of the specified range of the determination condition B, the following operation is performed: it is determined that the operating state is not normal (the oil retained in the evaporator is beyond its limit), and the operation proceeds to Step S4. At Step S4, a means C is taken. The means C in this embodiment is an operation in which the line 42 of the variable expansion valve 43 (the path indicated by a broken line arrow in FIG. 22) is virtually blocked by adjusting the opening of the variable expansion valve 43 or the ejector 15 to narrow or close it. Thus, the flow rate of refrigerant flowing along the bypass path 40 including the fixed expansion valve 44 is increased. The refrigerant from the fixed expansion valve 44 passes through the second evaporator 20, and flows through the suction port 15b of the ejector 15 to the first evaporator 16 and returns to the compressor 11 (the path indicated by a solid line arrow). Since the control process returns from Step S4 to Step S2, the controllable factor A is continuously detected. Therefore, the variable expansion valve 43 or the ejector 15 is kept in opening adjusting state until the controllable factor A, that is, SH falls within the specified range. Thus, the oil retained at some point in the cycle is effectively returned to the compressor 11. The flow-down means for causing the oil retained in the second evaporator 20 to flow down in this embodiment is provided by: the controlling means provided by the controller; and the flow control device that increases the quantity of refrigerant flowing into the second evaporator 20. To increase the quantity of refrigerant forcibly and directly flowing from upstream into the second evaporator 20, the flow control device is provided between the high pressure side of the cycle and the upstream side of the second evaporator 20. The flow control device can be provided by a valve mechanism that increases the flow rate of refrigerant flowing into the second evaporator 20 and reduces the flow rate of refrigerant flowing into the nozzle of the ejector 15. The valve mechanism can be provided by the valve 43 placed in the refrigerant path to the ejector 15.

In cases where the cycle is operated for a long time with a small quantity of refrigerant circulating in the cycle at time of low load when the load on the evaporators is small (when the flow rate is very low) or other like cases, oil is not taken out of the evaporators by the refrigerant and is retained especially in the second evaporator 20. The oil staying in the evaporators causes degradation in the capability of each single evaporator. The concentration of oil is an index different from the state of superheated refrigerant gas (SH) and the state of superheated refrigerant liquid (SC). Therefore, this phenomenon cannot be prevented by techniques in the past. To cope with this, the following measure is taken: the state of superheated refrigerant gas (SH) at the refrigerant outlet of the second evaporator is adopted as the controllable factor; when a state in which oil is accumulated, as mentioned above, is sensed, adjustment is made so that the opening of the variable expansion valve or the ejector is reduced; the state of superheated refrigerant gas (SH) at the outlet of the second evaporator is thereby kept within a predetermined range. Thus, the retention of oil in the second evaporator 20 can be prevented, and the intended capability of the evaporator 20 can be delivered.

When oil is retained in the second evaporator 20 or the low-pressure side, the quantity (concentration) of oil circulating in the cycle is reduced. This can cause such trouble as seizure of the compressor. Generally, when the cycle is operated at low load for a long time, it is required to ensure a certain quantity of circulating oil. When the oil in the evaporators is returned to the compressor side, the oil lubricity of the compressor can be ensured, and breakage of the compressor, including seizure, can be prevented.

25th Embodiment

Description will be given to the 25th embodiment of the invention with reference to FIG. 23 and FIG. 24. The construction of the ejector cycle system in this embodiment is substantially the same as the construction of the 24th embodiment. A difference from the 24th embodiment is as follows: the refrigerant inlet of the second evaporator 20 is additionally included in the sensing point for controllable factor A, and a second sensing means 46 is added in connection therewith.

Figure 23:
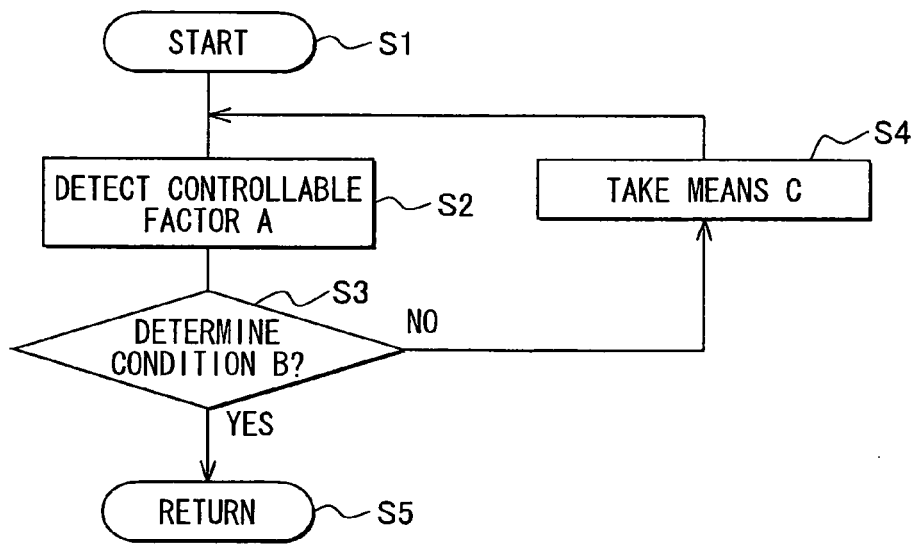
FIG. 23 is a flow diagram showing control operation of the ejector cycle system according to 24th-26th embodiments of the present invention.
Figure 24:
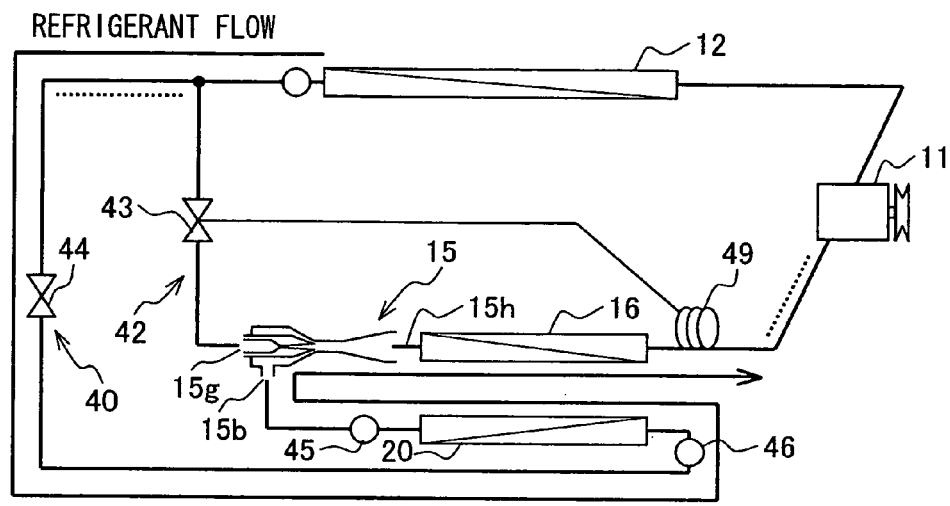
FIG. 24 is a schematic diagram showing an ejector cycle system according to the 25th embodiment of the present invention.

In this embodiment, the controllable factor A sensed at Step S2 in FIG. 23 is either the refrigerant temperature difference or pressure loss (pressure drop) between the refrigerant inlet and outlet of the second evaporator 20. When the quantity of circulating refrigerant is small, the heat load (external load) of air-conditioning air (external fluid) that heats refrigerant in the second evaporator 20 is relatively increased. Therefore, the temperature of superheated vapor (gas) of refrigerant is raised. When the refrigerant flow rate is reduced, the pressure drop between the outlet and inlet of the second evaporator 20 is reduced. With respect to the determination condition B, the following operation is performed at Step S3: when the refrigerant temperature difference is out of a specified range, that is, the temperature of superheated vapor (gas) of refrigerant is higher than a predetermined value, it is determined that the operation is not normal. Or, when the pressure drop is out of a specified range, it is determined that the operation is not normal. Then, the operation proceeds to Step S4, and the means C is taken. The means C in this embodiment may be different from that in the 24th embodiment. As the means C, the following operation is performed: the compressor 11 is temporarily turned off, that is, stopped, and the liquid refrigerant is settled. As the result of this operation, the refrigerant in the first and second evaporators 16 and 20 flows to the inlet of the compressor 11 without increase in the liquid refrigerant containing oil. Therefore, the oil in proximity to the first evaporator 16 and that in proximity to the second evaporator 20 are simultaneously recovered. The flow-down means for causing the oil retained in the second evaporator 20 to flow down in this embodiment is provided by: the controlling means provided by the controller; and a stopping mechanism that temporarily stops the compressor 11. The stopping mechanism can be provided by: a clutch means provided in a power transmission path for stopping power supply to the compressor 11; a means for stopping a motor as a power source; or a means for stopping a power plant as a power source.

For example, in this embodiment, refrigerant temperature difference and/or pressure loss (pressure drop) between the refrigerant inlet and outlet of the second evaporator 20 can be adopted as the controllable factor A. In this case, an abnormal state in which oil is accumulated is sensed, the compressor is temporarily turned off and the liquid refrigerant is settled. Thus, the quantity of gas refrigerant circulating in the cycle is increased. As the result of this operation, it is possible to recover oil and prevent oil from being retained in the second evaporator 20, and to deliver the intended capability of the evaporator 20.

Therefore, the oil lubricity of the compressor 11 can be ensured, and breakage of the compressor 11, including seizure, can be prevented.

26th Embodiment

Figure 25:
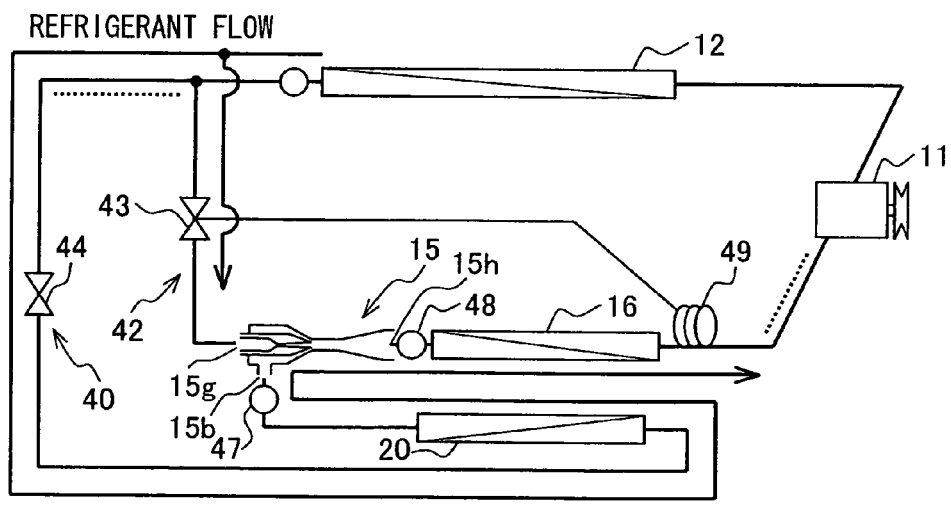
FIG. 25 is a schematic diagram showing an ejector cycle system according to the 26th embodiment of the present invention.
Figure 26:
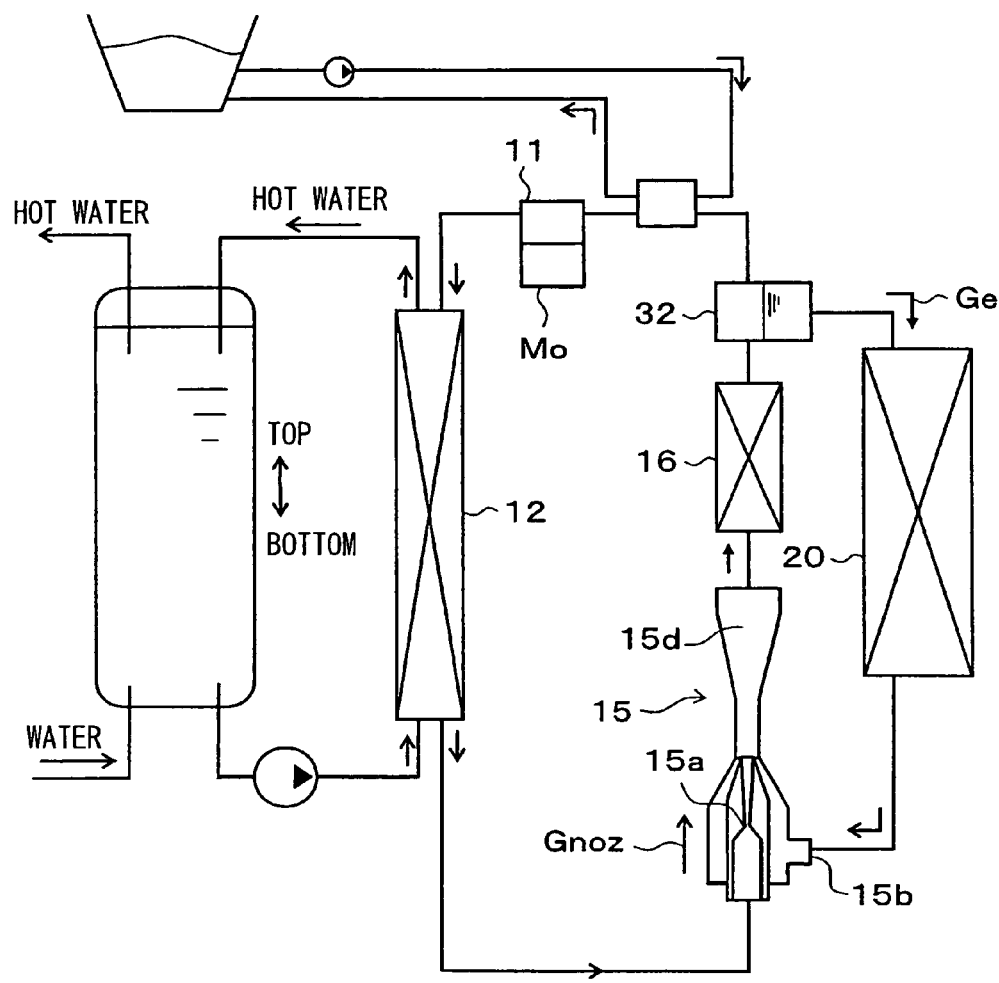
FIG. 26 is a schematic diagram showing an ejector cycle system according to a conventional example.
Figure 27:
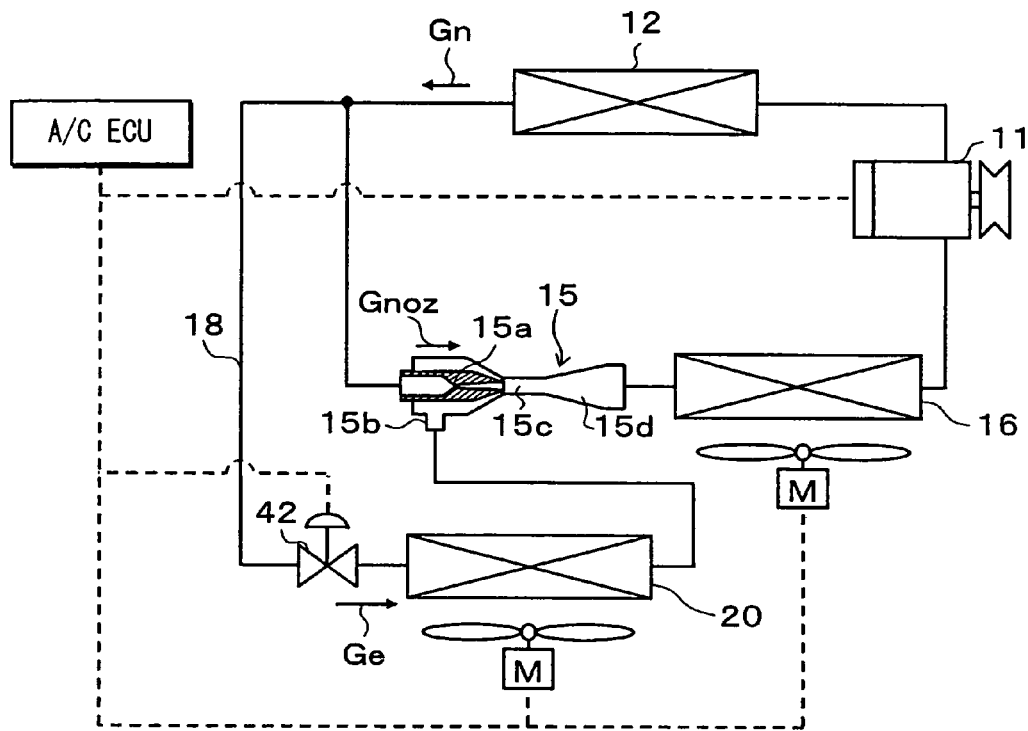
FIG. 27 is a schematic diagram showing an ejector cycle system according to a comparison example of the present invention.

Description will be given to the 26th embodiment of the invention with reference to FIG. 23 and FIG. 25. The construction of the ejector cycle system in this embodiment is substantially the same as the construction of the 24th embodiment. A difference from the 24th embodiment is as follows: the suction port 15b and the refrigerant outlet 15h of the ejector 15 are used as sensing points for controllable factor A; and a third sensing means 47 and a fourth sensing means 48 are provided in connection therewith. The first sensing means 45 is not provided. Therefore, the controllable factor A is the amount of pressure rising (buildup pressure difference) between the suction port 15b (inlet) and refrigerant outlet 15h of the ejector 15.

In this embodiment, the controllable factor A sensed at Step S2 is the amount of pressure rising between the suction port 15b and refrigerant outlet 15h of the ejector 15. With respect to the determination condition B, the following operation is performed at Step S3: when this amount of pressure rising (buildup pressure difference) is out of a specified range, that is, smaller than a predetermined value, it is determined that the suction force of the ejector 15 is small and the operation is not normal. The operation proceeds to Step S4, and the means C is taken. The means C in this embodiment is also different from that in the 24th embodiment. As the means C, operation is performed so as to suppress cooling by the outside air (increase the outside air load) in the condenser 12. Possible concrete methods for this operation include: the operation of reducing the opening of a damper for the outside air or the number of revolutions of a fan for outside air supply to reduce the outside air quantity (or wind velocity); and the operation of raising the outside air temperature. Thus, the amount of refrigerant condensed at the condenser 12 is reduced. Therefore, the flow rate of gas refrigerant flowing along the ejector cycle system 150 is increased, and the oil in the evaporators and the like is recovered. The amount of pressure rising at the ejector 15 is increased, and as a result, SH is varied so that it changed within the specified range of the determination condition B. The flow-down means for causing the oil retained in the second evaporator 20 to flow down in this embodiment is provided by: the controlling means provided by the controller; and a condensing control device that prevents refrigerant from being condensed in the condenser 12 to increase the quantity of circulating refrigerant, and accordingly increases the quantity of refrigerant flowing into the second evaporator 20. The condensing control device can be provided by a means for hindering refrigerant cooling at the condenser 12 or a means for increasing the load of the outside air that is a medium for heat exchange with the condenser 12.

The following measure is taken: pressure rising between the suction port 15b and refrigerant outlet 15h of the ejector 15 is adopted as the controllable factor; when an abnormal state in which oil is accumulated is sensed, the outside air load of the condenser is increased. Thus, the quantity of gas refrigerant circulating in the cycle is increased. As the result of this operation, it is possible to recover oil and prevent oil from being retained in the second evaporator, and to deliver the intended capability of the evaporator.

Therefore, the oil lubricity of the compressor can be ensured, and breakage of the compressor, including seizure, can be prevented.

With respect to the above-described 24th to 26th embodiments, different controllable factors A are respectively described. With respect to the 24th and 25th (or 26th) embodiments, different means C are respectively described. Instead, the ejector cycle system may be controlled by combining one or more specific controllable factors A and another means C. More specific description will be given. For example, the refrigerant temperature difference and/or pressure loss (pressure drop) between the refrigerant inlet and outlet of the second evaporator in the 25th embodiment is adopted as the controllable factor A. With respect to the determination condition B, the following operation is performed at Step S3: when the refrigerant temperature difference and/or pressure drop is out of the specified range, it is determined that the operation is not normal, and the operation proceeds to Step S4. Then, the means C is taken. The means C may be the operation in which adjustment is made to reduce the opening of the variable expansion valve 43 or the ejector 15 in the 24th embodiment.

Other Embodiments

The invention is not limited to the above-mentioned embodiments, and various modifications can be made as described later.

The above 1-23rd embodiments are examples in which the invention is applied to refrigerator device for vehicles and the space to be cooled with the first evaporator 16 and that with the second evaporator 20 are identical. The space to be cooled with the first evaporator 16 and that with the second evaporator 20 may be separated from each other.

For example, the following construction may be adopted: the space to be cooled with the first evaporator 16 is the front seat area in a vehicle compartment and the space to be cooled with the second evaporator 20 is the rear seat area in the vehicle compartment. In cases where the spaces to be cooled are different from each other, the following construction may be adopted: a dedicated blower for evaporator is provided for each evaporator, and the quantities of air sent by the blowers for evaporator are individually controlled. Thus, the flow ratio η may be adjusted by adjusting the flow rate Gnoz of refrigerant that virtually passes through the nozzle portion 15a of the ejector 15 and the flow rate Ge of refrigerant drawn into the refrigerant suction port 15b of the ejector 15.

In the first to fourth, sixth to ninth, 11th to 14th, 16th to 18th, and 20th to 23rd embodiments, a variable displacement compressor is used for the compressor 11. Then, its electric capacity control valve 11b is controlled by the air conditioning controller 21, and the refrigerant discharge capability of the compressor 11 is thereby controlled. Instead, the following construction may be adopted: such a fixed displacement compressor as the compressors 61 to 64 is used, and the ratio of the operating state to the non-operation state (operating ratio) of the fixed displacement compressor is controlled by the electromagnetic clutch 12a and 61a to 64a. The refrigerant discharge capability of the compressor 11 and 61 to 64 is thereby controlled.

An electric compressor may be used for the compressor. In this case, the refrigerant discharge capability can be controlled by controlling the number of revolutions of the electric compressor 11.

The first, sixth, 11th, 16th, 20th, and 23rd embodiments use the variable throttling mechanism 14 and 33, electric variable throttling mechanism 36, and ejector with the area of the refrigerant passage in its nozzle portion fixed. Instead, a variable ejector whose nozzle opening is variable may be used to adjust the refrigerant flow rate Gnoz. Specifically, the variable ejector is an ejector provided with a passage area varying mechanism that is capable of variably controlling the area of the refrigerant passage in its nozzle portion according to external signals. Use of a variable ejector also makes it possible to save the space for the ejector cycle system.

In the fifth, 10th, 15th, 19th, and 22nd embodiments, the number of revolutions of the electric motor 16b for driving is controlled to adjust the quantity of air sent by the blower 16a for evaporator. Instead, a passage opening adjusting mechanism that adjusts the area of the passage through which air sent passes may be used as the air quantity adjusting means to vary the quantity of air. Specifically, a passage opening/closing door or the like driven by a servo motor can be used for this purpose.

In the first to third embodiments, the degree of superheat of refrigerant on the outlet side of the first evaporator 16 is detected with the temperature sensitive cylinder and equalizing pipe of the thermal expansion valve. In the fourth and fifth embodiments, it is detected with the temperature sensor 51 and the pressure sensor 52. The detecting means for the degree of superheat of refrigerant on the outlet side of the first evaporator 16 is not limited to them.

Some examples will be taken. It can be estimated from the refrigerant evaporating temperature or pressure of the first evaporator 16 and the temperature of refrigerant on the outlet side of the first evaporator 16.

It can also be estimated from the refrigerant evaporating temperature or pressure of the first evaporator 16 and the blown air temperature of the first evaporator 16. This is because, when the degree of superheat is increased, the cooling capacity of the first evaporator 16 is lowered and the blown air temperature of the first evaporator 16 is raised.

In addition, the degree of superheat can also be estimated from the inlet air temperature of the first evaporator 16 and the temperature of refrigerant on the outlet side of the first evaporator 16. The degree of superheat can also be estimated from the inlet air temperature of the first evaporator 16 and the blown air temperature of the first evaporator 16.

The degree of superheat can also be estimated from only the inlet air temperature of the first evaporator 16. The reason for this is as follows: in cases where the air in a space to be cooled (freezing chamber) is circulated and cooled in an evaporator as in a refrigerator, the air temperature from the first evaporator 16 rises when the degree of superheat becomes too high. As a result, the temperature in the freezing chamber rises, and thus the inlet air temperature of the first evaporator 16 also rises.

Therefore, the degree of superheat of refrigerant on the outlet side of the first evaporator 16 can also be detected using a means for detecting the above-mentioned physical quantities.

In the sixth to eighth embodiments, the degree of superheat of refrigerant on the outlet side of the second evaporator 20 is detected with the temperature sensitive cylinder and equalizing pipe of the thermal expansion valve. In the ninth and 10th embodiments, it is detected with the temperature sensor 53 and the pressure sensor 54. The detecting means for the degree of superheat of refrigerant on the outlet side of the second evaporator 20 is not limited to them.

Some examples will be taken. In the above description, the degree of superheat of refrigerant on the outlet side of the first evaporator 16 is detected. Similarly, it can be estimated from the refrigerant evaporating temperature or pressure of the second evaporator 20 and the temperature of refrigerant on the outlet side of the second evaporator 20. In addition, it may be estimated from the refrigerant evaporating temperature or pressure of the second evaporator 20 and the blown air temperature of the second evaporator 20.

The degree of superheat can also be estimated by other methods. Such methods include estimation by: a combination of the inlet air temperature of the second evaporator 20 and the temperature of refrigerant on the outlet side of the second evaporator 20; a combination of the inlet air temperature of the second evaporator 20 and the blown air temperature of the second evaporator 20; and only the inlet air temperature of the second evaporator 20.

Therefore, the degree of superheat of refrigerant on the outlet side of the second evaporator 20 can also be detected using a means for detecting the above-mentioned physical quantities.

In the 11th to 15th and 20th to 22nd embodiments, the degree of subcooling of refrigerant on the outlet side of the radiator 12 is detected with the temperature sensors 55 and 56. The detecting means for the degree of subcooling of refrigerant on the outlet side of the radiator 12 is not limited to them.

For example, it can be estimated from: a combination of the refrigerant condensation temperature (refrigerant pressure) of the radiator 12 and the temperature of refrigerant on the outlet side of the radiator 12; a combination of the inlet air temperature of the radiator 12 and the outlet refrigerant temperature of the radiator 12; or the dryness of refrigerant on the outlet side of the radiator 12.

Therefore, the degree of subcooling of refrigerant on the outlet side of the radiator 12 can also be detected using a means for detecting above-mentioned physical quantities.

In the first, second, sixth, seventh, 11th, 12th, 16th, 17th, and 20th to 23rd embodiments, the variable throttling mechanism 14, 30, 31, 33, 34, and 35 and the electric variable throttling mechanism 36, 37, 38, 39, and 40 are disposed as follows to adjust the flow ratio η: they are placed between the branch portion Z and the ejector 15 and between the branch portion Z and the second evaporator 20. A flow rate-variable three-way valve may be used at the branch portion Z.

Specifically, a rotary valve-type variable flow rate three-way valve driven by a stepping motor can be used. Thus, the opening area on the ejector 15 side at the branch portion Z and the opening area on the branch passage 18 side (second evaporator 20 side) can be simultaneously and continuously varied. This makes the adjustment of flow ratio η easier.

In the above embodiments, a thermal expansion valve is used for the variable throttling mechanism 14, 30, 31, 33, 34, and 35, and a flow control valve driven by a stepping motor is used for the electric variable throttling mechanism 36, 37, 38, 39, 40, and 41. Instead, a variable throttling mechanism in which multiple fixed throttles different in characteristics are changed and used may be used.

Or, the above-mentioned variable throttling mechanism, electric variable throttling mechanism, and fixed throttle in the above embodiments may be combined and used.

In the fifth, 10th, 15th, and 19th embodiments, the quantity of air sent by the blower 16a for evaporator is adjusted by controlling the number of revolutions of the electric motor 16b for driving. The quantity of air sent by the blower 12a for radiator may be adjusted by controlling the number of revolutions of the electric motor 12b for driving with the air conditioning controller 21. Thus, the refrigerant discharge flow rate of the compressor and the pressure of refrigerant on the downstream side of the radiator 12 can be virtually varied.

For example, when the quantity of air sent to the radiator 12 is reduced, the degree of subcooling is lowered. (In case of supercritical cycle, a high pressure is raised.) Thus, the pressure is raised upstream of the ejector 15. Therefore, the flow rate Gnoz of refrigerant passing through the nozzle portion 15a of the ejector 15 and the suction pressure of the refrigerant suction port 15b of the ejector 15 fluctuate. As a result, the flow rate Ge of refrigerant drawn into the refrigerant suction port 15b of the ejector 15 also fluctuates. That is, the flow ratio η fluctuates.

Consequently, the following measure may be taken: fluctuation in flow ratio η corresponding to the degree of subcooling (high pressure) is stored beforehand in the air conditioning controller 21; based on the degree of subcooling (high pressure), the air conditioning controller 21 varies the applied voltage V1 to control the flow ratio η so that it approaches the optimum flow rate ηmax.

The above embodiments use two evaporators, the first evaporator 16 and the second evaporator 20. The number of evaporators may be further increased, and three or more evaporators may be used.

For example, the following construction may be adopted with respect to the first embodiment: a second branch passage is provided which connects the section between the internal heat exchanger 17 and the fixed throttle 19 in the branch passage 18 and the outlet of the first evaporator 16; and a fixed throttle and a third evaporator are provided in the second branch passage.

In this case, the throttling opening of the fixed throttle 19 and that of the fixed throttle placed in the second branch passage only have to be so set that the following is implemented: the flow rate of refrigerant that passes through the variable throttling mechanism 14 when the degree of superheat of refrigerant on the outlet side of the first evaporator 16 becomes equal to a predetermined value, the flow rate of refrigerant passing through the fixed throttle 19, and the flow rate of refrigerant passing through the fixed throttle placed in the second branch passage enhance the cooling capacity Qer of the entire system.

The cycles in the above embodiments are examples of subcritical cycles in which a high pressure does not exceed the critical pressure of refrigerant. As described in connection with the 11th embodiment, the invention may be applied to a supercritical cycle in which a high pressure exceeds the critical pressure of refrigerant.

In the invention, the flow ratio (η), the refrigerant flow rate of the entire cycle, the refrigerant discharge flow rate, and the air quantity are adjusted based on the detection values of detecting means. Instead, a number of these adjusting means may be combined. For example, the following construction may be adopted: a first variable throttling mechanism is provided between the branch portion Z and the ejector 15; a second variable throttling mechanism is provided in the branch passage 18 upstream of the second evaporator 20; and the flow ratio is directly controlled by controlling Gnoz and Ge.

In the above embodiments, an ejector cycle system of the invention is applied to refrigerator device for vehicles. Instead, it may be applied to a stationary refrigerator, stationary freezing chamber, refrigeration system, or vapor compression cycle, such as heat pump cycle for water heater.

In the above-described any embodiments, $CO_2$ refrigerant or HC refrigerant may be used as the refrigerant. Chlorofluorocarbon is a generic name of organic compounds comprising carbon, fluorine, chlorine, and hydrogen, and is widely used as refrigerant.

Fluorocarbon refrigerant includes HCFC (hydrochlorofluorocarbon) refrigerant, HFC (hydrofluorocarbon) refrigerant, and the like. These refrigerants are designated as alternatives for chlorofluorocarbon because they do not destroy the ozone layer.

HC (hydrocarbon) refrigerant is refrigerant substances that contain hydrogen and carbon and occur in nature. The HC refrigerant includes R600a (isobutane), R290 (propane), and the like.

The 20th to 23rd embodiments are so constructed that rapid cooling operation is performed when the user turns on the rapid cooling switch 65. Instead, the same rapid cooling operation as in the 20th to 22nd embodiments may be performed on the following occasion: when the air conditioning controller 21 determines that rapid cooling is required based on physical quantities related to at least one of the state of refrigerant in the cycle and the space to be cooled with the first evaporator 16 and the second evaporator 20.

Specifically, when the temperature of a space to be cooled meets a predetermined condition, it is determined that rapid cooling is necessary. Or, the necessity for rapid cooling may be determined by estimating the temperature of a space to be cooled from the state of refrigerant in the cycle.

Figure 29:
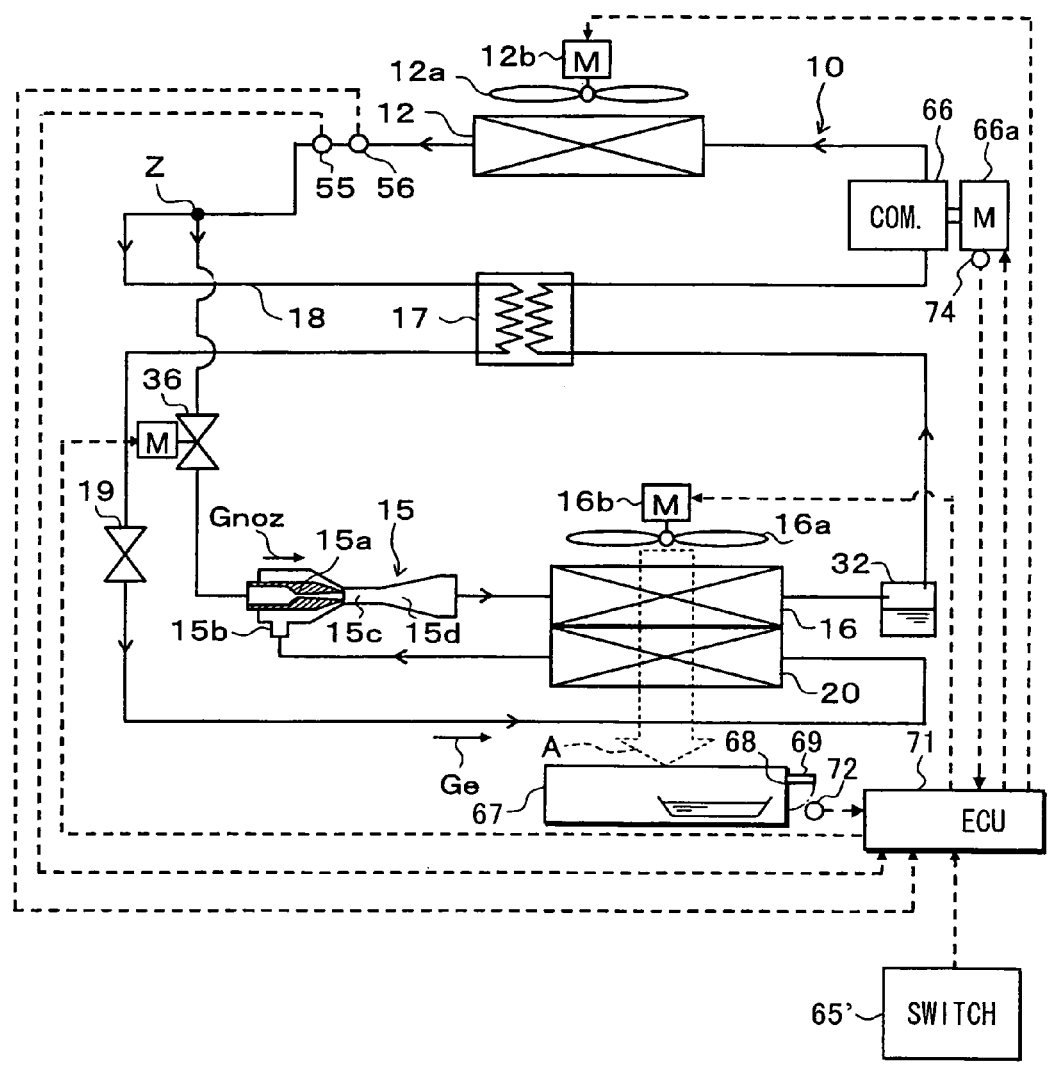
FIG. 29 is a system diagram showing a refrigeration cycle and a controller (ECU) of an another embodiment.
Figure 30:
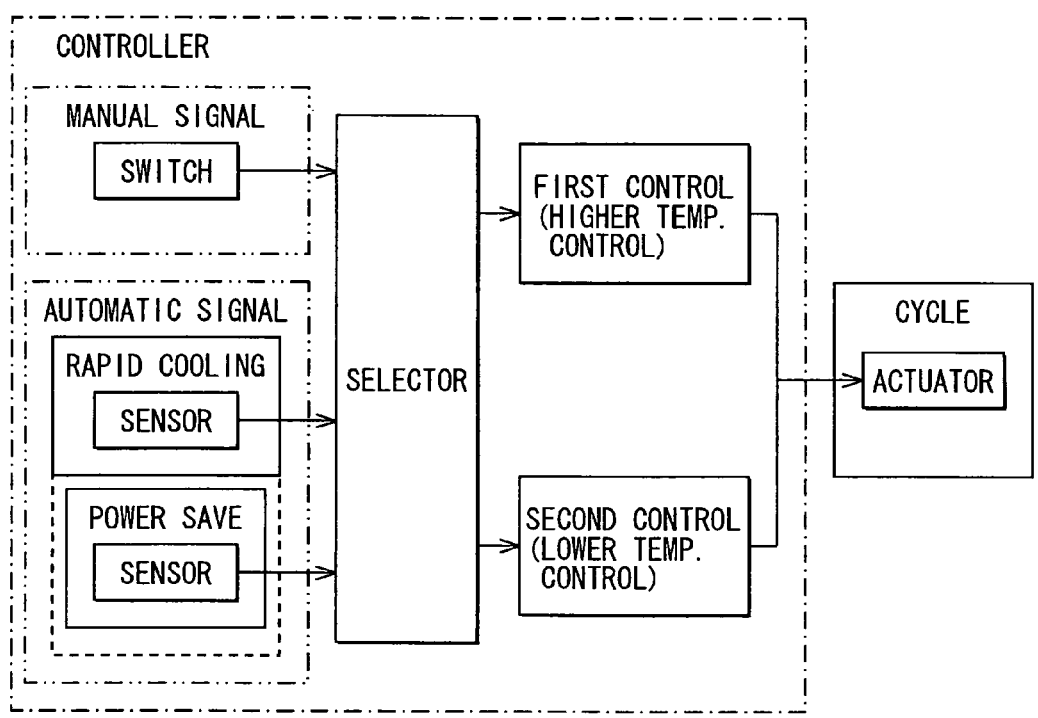
FIG. 30 is a block diagram showing functional blocks and signal flows provided by the controller.

FIGS. 29 and 30 show an embodiment that provides a low evaporating temperature control in response to both a manual signal and an automatic signal. FIG. 29 shows a system diagram indicating a refrigeration cycle and an electronic control device. FIG. 30 shows a block diagram indicating several operational functions provided by the electronic control device.

The manual signal module generates a manual signal that can be obtained via a switch 65' (e.g., rapid cooling switch 65) as described in the previous embodiments. The automatic signal module includes at least one sensor and evaluating circuit or program to generate an automatic signal if certain criterion is met. The automatic signal can be obtained via a sensor or sensors. The automatic signal may be obtained by a predetermined operational calculation responsive to one or plurality of sensor signals.

The automatic signal includes two request signals indicative of different requirements for the system. The first one is a rapid cooling request. The rapid cooling request indicates that the refrigerating system primarily needs lower temperature for cooling air or goods such as air supplied to a compartment or foods to be cooled. The rapid cooling request may be generated in response to an abrupt increase of heat load.

In this embodiment, the system has a refrigerator box 67 cooled by the evaporators 16 and 20. The refrigerator box 67 has an opening 68 and a door 69. The refrigerator box 67 is structured to be loaded with a tray for making ice cubes. The evaporators 16 and 20 may be located separately in distanced or partitioned compartment of the refrigerator box 67. For example, the evaporator 16 may be located in a cold compartment, and the evaporator 20 may be located in a freezer compartment where the tray is loaded. The system further includes a sensor 72 to detect an existence of the tray and generate a signal if the tray is detected. For example, the sensor 72 may be a weight sensor responsive to the tray filled with water. If the sensor 72 detects the tray with water, it generates a signal indicative of the rapid cooling request. Alternatively, the sensor 72 may be or include a door position sensor that generates the rapid cooling request when a period of time for open door reaches a certain long time.

The other one of the automatic signal is a power save request that can be obtained via a sensor or a predetermined operational calculation. The power save request indicates that the refrigerating system can be run with a power saving operation. The power saving request may be generated in response to a decrease of heat load. For example, the power saving request may be generated in response to a stable condition of the refrigerating system. In the case that the sensor 72 is the door position sensor, the power saving request can be generated when a door open frequency is less than a certain threshold level supposed to be night. Alternatively, in a case that the sensor 72 is a temperature sensor responsive to an interior temperature of the refrigerator box 67, the power saving request is obtained when it is determined that the interior temperature is stable in a predetermined low temperature range. Further, the sensor 72 may be responsive to an exterior temperature of the refrigerator box 67, and generates the power saving request when the exterior temperature is stable within a predetermined low temperature range.

The system further includes a sensor 74 attached on a motor 66a for driving a compressor 66. The sensor 74 detects a power supplied to the motor 66a and a speed of rotation. The power save request can be generated when the power supplied to the motor 66a drops below a certain lower level supposed to be night or winter. The power save request can be also generated when the speed drops below a certain lower level for a predetermined time continuously. Since the motor 66a is controlled to keep the refrigerator box 67 cold by a controller 71 (ECU), such a stable speed operation of the motor 66a surely indicates that the refrigerating system can keep cool condition even in a power saving operation.

In this specification, since the same low temperature control is obtained, the power save request may be included in the rapid cooling request, and the power save request may be called as the rapid cooling request.

The controller 71 provides at least two controls (first and second control modules). One of the first and second control modules can be selected by a selector as shown in FIG. 30. A first control module provides a higher temperature control in which an evaporating temperature in one of the evaporators 16 and 20 is kept relatively higher temperature by controlling actuators such as valves 36. The higher temperature control is performed as a normal control function for the system. A second control module provides a lower temperature control to obtain a rapid cooling function. The lower temperature control in this embodiment also obtains a power save function that lowers a power consumption of the motor 66a. The lower temperature control keeps the evaporating temperature in one of the evaporators 16 and 20 relatively lower temperature by controlling actuators such as valves 36. For example, the lower temperature control keeps the evaporating temperature at least lower than that provided by the higher temperature control obtained by the first control module. The lower temperature control may reduce the evaporating temperature from the temperature provided before the lower temperature control is activated. In this embodiment, the second control module at least reduces the evaporating temperature in the evaporator 20 that primarily freezes the compartment where the tray is loaded.

The manual signal and the automatic signal are supplied to a selector module that selects and switches controls of the refrigerating cycle. The selector shown in FIG. 30 activates the second control module for a predetermined time from the manual signal or automatic rapid cooling signal is obtained or until the objective of rapid cooling is achieved. For example, the second control module is continuously activated until the water turn into the ice cubes. Then, the selector automatically deactivates the second control module and activates the first control module. The selector activates the second control module for a predetermined time from the power save request is obtained or until the power save request is lost. For example, the system may be operated by the second control module during the night time.

The second control module lowers the evaporating temperature by operating the actuator such as the valve 36. The second control module decreases or closes an opening degree of the valve 36 to make the evaporating temperature lower. Alternatively, the actuator can be a valve capable of varying a flow ratio of flow amount Gnoz and Ge. For example, the actuator of the cycle may include a needle valve disposed in the nozzle 15e of the ejector 15. Further, the actuator may include a valve instead of the valve 19. Further, the actuator may include a valve disposed on an upstream side of the branch Z.

The lower temperature control also reduces a flow amount of refrigerant into the evaporators 16, 20, since the low temperature control reduces the flow amount to the ejector 15. Meantime, since a suction pressure of the compressor 66 reduces, circulating amount through the compressor 66 is also reduced. If a discharging capacity and rotational speed of the compressor 66 are constant, the circulating amount and a compression ratio are main factors that influence the compressor torque. Therefore, in case that the circulating amount has greater influences than the compression ratio, the lower temperature control may lower the compressor torque and reduce power consumption. This power saving advantage can be achieved for the system equipped with a motor driven compressor such as a hermetic-sealed container type compressor.

Further, the second control module may decrease a flow amount of air supplied to the evaporators 16 and 20 in addition to or instead of the above described evaporating temperature lowering methods. Further, the second control module may increase a super-heat degree of the refrigerant in at least one of the evaporators 16 and 20 in addition to or instead of the described evaporating temperature lowering methods.

While the invention has been described with reference to preferred embodiments thereof, it is to be understood that the invention is not limited to the preferred embodiments and constructions. The invention is intended to cover various modification and equivalent arrangements. In addition, while the various elements of the preferred embodiments are shown in various combinations and configurations, which are preferred, other combinations and configuration, including more, less or only a single element, are also within the spirit and scope of the invention.

What is claimed is:

1. An ejector cycle system with a refrigerant cycle through which refrigerant flows, the ejector cycle system comprising:
    a compressor configured to draw and compress refrigerant;
    a radiator located to radiate heat from high-pressure refrigerant discharged from the compressor;
    an ejector disposed downstream of the radiator, the ejector having a nozzle portion for depressurizing and expanding refrigerant, a refrigerant suction port through which refrigerant is drawn by a high-speed refrigerant flow jetted from the nozzle portion, and a pressure increasing portion for mixing refrigerant drawn through the refrigerant suction port with the high-speed refrigerant flow and for decelerating the mixed refrigerant flow to raise a pressure of the refrigerant flow;
    a first evaporator located to evaporate the refrigerant flowing out of the ejector;
    a branch passage that is branched from a branch portion between the radiator and the nozzle portion of the ejector and is coupled to the refrigerant suction port of the ejector, to guide the refrigerant flowing out of the radiator into the refrigerant suction port;
    a throttling unit located in the branch passage, the throttling unit having a fixed throttle that depressurizes refrigerant flowing through the throttling unit to adjust a flow amount of the refrigerant, the fixed throttle having a throttling opening which is set to a predetermined opening;
    a second evaporator that is located in the branch passage downstream of the throttling unit to evaporate the refrigerant flowing from the throttle unit; and
    a variable throttling device located in a refrigerant passage between the branch portion of the branch passage and a refrigerant inlet port of the nozzle portion to decompress the refrigerant; wherein
    the variable throttling device is configured to adjust an opening degree of a valve body portion, based on at least one of a superheat degree of refrigerant at a refrigerant outlet side of the first evaporator, a temperature and a pressure of refrigerant at the refrigerant outlet side of the radiator, a flow amount of refrigerant discharged from the compressor, a temperature of a space to be cooled by the first evaporator and the second evaporator, and an ambient temperature of the space to be cooled; and
    refrigerant always flows through the throttling unit when the compressor operates.

2. The ejector cycle system according to claim 1, wherein the branch passage is a single passage connected only to the branch portion and the refrigerant suction port such that the refrigerant flowing through the branch passage is only received from the branch portion and the second evaporator only receives the refrigerant from the branch portion.

3. The ejector cycle system according to claim 1, further comprising a heat exchanger exchanging heat between a flow of refrigerant flowing in the branch passage and a flow of refrigerant flowing between the first evaporator and the compressor.

4. The ejector cycle system according to claim 1, wherein the variable throttling device is configured to adjust a ratio between a flow amount of refrigerant flowing into the nozzle portion and a flow amount of refrigerant flowing through the branch passage.

5. The ejector cycle system according to claim 4, wherein the variable throttling device adjusts the flow amount of refrigerant such that the superheat degree of the refrigerant at the refrigerant outlet side of the first evaporator approaches a predetermined value.

6. The ejector cycle system according to claim 1, further comprising
    a gas-liquid separator located downstream of the radiator to separate the refrigerant flowing out of the radiator into gas refrigerant and liquid refrigerant, wherein
    the branch portion is configured such that the separated liquid refrigerant of the gas-liquid separator is branched at the branch portion into a first flow flowing into the branch passage and a second flow flowing to the nozzle portion.

7. An ejector cycle system with a refrigerant cycle through which refrigerant flows, comprising:
    a compressor configured to draw and compress refrigerant;
    a radiator located to radiate heat from high-pressure refrigerant discharged from the compressor;
    an ejector disposed downstream of the radiator, the ejector having a nozzle portion for depressurizing and expanding refrigerant, a refrigerant suction port through which refrigerant is drawn by a high-speed refrigerant flow jetted from the nozzle portion, and a pressure increasing portion for mixing refrigerant drawn through the refrigerant suction port with the high-speed refrigerant flow and for decelerating the mixed refrigerant flow to raise a pressure of the refrigerant flow;

a first evaporator located to evaporate the refrigerant flowing out of the ejector;

a branch passage that is branched from a branch portion between the radiator and the nozzle portion of the ejector and is coupled to the refrigerant suction port of the ejector, to guide the refrigerant flowing out of the radiator into the refrigerant suction port;

a throttling unit located in the branch passage, the throttling unit having a fixed throttle that depressurizes refrigerant flowing through the throttling unit to adjust a flow amount of the refrigerant, the fixed throttle having a throttling opening which is set to a predetermined opening a second evaporator that is located in the branch passage downstream of the throttling unit to evaporate refrigerant flowing from the throttle unit; wherein the branch portion is configured to branch the refrigerant flowing out of the radiator into a first stream flowing into an inlet of the nozzle portion and a second stream flowing through the branch passage extended from the branch portion to the refrigerant suction port;

a variable throttling device is located to decompress the first stream of the refrigerant at an upstream side of the nozzle portion in the refrigerant flow of the first stream, the refrigerant of the second stream having passed through the throttling unit and the evaporator is drawn into the refrigerant suction port by suction action of the refrigerant flow jetted from the nozzle portion; and refrigerant always flows through the throttling unit when the compressor operates.

8. The ejector cycle system according to claim 1, wherein the throttling unit is coupled to the refrigerant suction port such that only the refrigerant having passed through the throttling unit flows into the refrigerant suction port.

9. The ejector cycle system according to claim 8, wherein the refrigerant having passed through the throttling unit and the second evaporator is drawn into the refrigerant suction port by suction action of the refrigerant flow jetted from the nozzle portion.

10. The ejector cycle system according to claim 1, wherein the refrigerant having passed through the throttling unit and the second evaporator is drawn into the refrigerant suction port by suction action of the refrigerant flow jetted from the nozzle portion.

11. The ejector cycle system according to claim 7, wherein the throttling unit is coupled to the refrigerant suction port such that only the refrigerant having passed through the throttling unit flows into the refrigerant suction port.

12. The ejector cycle system according to claim 11, wherein the refrigerant having passed through the throttling unit and the second evaporator is drawn into the refrigerant suction port by suction action of the refrigerant flow jetted from the nozzle portion.

13. The ejector cycle system according to claim 7, wherein the refrigerant having passed through the throttling unit and the second evaporator is drawn into the refrigerant suction port by suction action of the refrigerant flow jetted from the nozzle portion.

14. The ejector cycle system according to claim 1, wherein when the variable throttling device reduces the refrigerant flow to the nozzle portion of the ejector, the refrigerant flow through the first and second evaporator is reduced and when the variable throttling device increases the refrigerant flow to the nozzle portion of the ejector, the refrigerant flow through the first and second evaporators is increased.

15. The ejector cycle system according to claim 7, wherein when the variable throttling device reduces the refrigerant flow to the nozzle portion of the ejector, the refrigerant flow through the first and second evaporator is reduced and when the variable throttling device increases the refrigerant flow to the nozzle portion of the ejector, the refrigerant flow through the first and second evaporators is increased.

16. An ejector cycle system with a refrigerant cycle through which refrigerant flows, the ejector cycle system comprising:

a compressor configured to draw and compress refrigerant;

a radiator located to radiate heat from high-pressure refrigerant discharged from the compressor;

an ejector disposed downstream of the radiator, the ejector having a nozzle portion for depressurizing and expanding refrigerant, a refrigerant suction port through which refrigerant is drawn by a high-speed refrigerant flow jetted from the nozzle portion, and a pressure increasing portion for mixing refrigerant drawn through the refrigerant suction port with the high-speed refrigerant flow and for decelerating the mixed refrigerant flow to raise a pressure of the refrigerant flow;

a first evaporator located to evaporate the refrigerant flowing out of the ejector, a branch passage that is branched from a branch portion between the radiator and the nozzle portion of the ejector and is coupled to the refrigerant suction port of the ejector, to guide the refrigerant flowing out of the radiator into the refrigerant suction port;

a throttling unit located in the branch passage, the throttling unit having a fixed throttle that depressurizes refrigerant flowing through the throttling unit to adjust a flow amount of the refrigerant, the fixed throttle having a throttling opening which is set to a predetermined opening;

a second evaporator that is located in the branch passage downstream of the throttling unit to evaporate the refrigerant flowing from the throttle unit; and a variable throttling device located in a refrigerant passage between the branch portion of the branch passage and a refrigerant inlet port of the nozzle portion to decompress the refrigerant; wherein the variable throttling device is configured to adjust an opening degree of a valve body portion, based on at least one of a superheat degree of refrigerant at a refrigerant outlet side of the first evaporator, a temperature and a pressure of refrigerant at the refrigerant outlet side of the radiator, a flow amount of refrigerant discharged from the compressor, a temperature of a space to be cooled by the first evaporator and the second evaporator, and an ambient temperature of the space to be cooled; and the fixed throttle comprises one of a capillary tube and an orifice.

17. An ejector cycle system with a refrigerant cycle through which refrigerant flows, comprising:

a compressor configured to draw and compress refrigerant;

a radiator located to radiate heat from high-pressure refrigerant discharged from the compressor;

an ejector disposed downstream of the radiator, the ejector having a nozzle portion for depressurizing and expanding refrigerant, a refrigerant suction port through which refrigerant is drawn by a high-speed refrigerant flow jetted from the nozzle portion, and a pressure increasing portion for mixing refrigerant drawn through the refrigerant suction port with the high-speed refrigerant flow and for decelerating the mixed refrigerant flow to raise a pressure of the refrigerant flow;

a first evaporator located to evaporate the refrigerant flowing out of the ejector;

a branch passage that is branched from a branch portion between the radiator and the nozzle portion of the ejector and is coupled to the refrigerant suction port of the ejector, to guide the refrigerant flowing out of the radiator into the refrigerant suction port;

a throttling unit located in the branch passage, the throttling unit having a fixed throttle that depressurizes refrigerant flowing through the throttling unit to adjust a flow amount of the refrigerant, the fixed throttle having a throttling opening which is set to a predetermined opening a second evaporator that is located in the branch passage downstream of the throttling unit to evaporate refrigerant flowing from the throttle unit; wherein the branch portion is configured to branch the refrigerant flowing out of the radiator into a first stream flowing into an inlet of the nozzle portion and a second stream flowing through the branch passage extended from the branch portion to the refrigerant suction port;

a variable throttling device is located to decompress the first stream of the refrigerant at an upstream side of the nozzle portion in the refrigerant flow of the first stream, the refrigerant of the second stream having passed through the throttling unit and the evaporator is drawn into the refrigerant suction port by suction action of the refrigerant flow jetted from the nozzle portion; and the fixed throttle comprises one of a capillary tube and an orifice.

18. An ejector cycle system with a refrigerant cycle through which refrigerant flows, the ejector cycle system comprising:

a compressor configured to draw and compress refrigerant;

a radiator located to radiate heat from high-pressure refrigerant discharged from the compressor;

an ejector disposed downstream of the radiator, the ejector having a nozzle portion for depressurizing and expanding refrigerant, a refrigerant suction port through which refrigerant is drawn by a high-speed refrigerant flow jetted from the nozzle portion, and a pressure increasing portion for mixing refrigerant drawn through the refrigerant suction port with the high-speed refrigerant flow and for decelerating the mixed refrigerant flow to raise a pressure of the refrigerant flow;

a first evaporator located to evaporate the refrigerant flowing out of the ejector;

a branch passage that is branched from a branch portion between the radiator and the nozzle portion of the ejector and is coupled to the refrigerant suction port of the ejector, to guide the refrigerant flowing out of the radiator into the refrigerant suction port;

a throttling unit located in the branch passage, the throttling unit having a fixed throttle that depressurizes refrigerant flowing through the throttling unit to adjust a flow amount of the refrigerant, the fixed throttle having a throttling opening which is set to a predetermined opening;

a second evaporator that is located in the branch passage downstream of the throttling unit to evaporate the refrigerant flowing from the throttle unit; and a variable throttling device located in a refrigerant passage between the branch portion of the branch passage and a refrigerant inlet port of the nozzle portion to decompress the refrigerant; wherein the variable throttling device is configured to adjust an opening degree of a valve body portion, based on at least one of a superheat degree of refrigerant at a refrigerant outlet side of the first evaporator, a temperature and a pressure of refrigerant at the refrigerant outlet side of the radiator, a flow amount of refrigerant discharged from the compressor, a temperature of a space to be cooled by the first evaporator and the second evaporator, and an ambient temperature of the space to be cooled; and the flow amount of refrigerant flowing through the throttling unit decreases when the opening degree of the variable throttling device is increased to increase a flow amount of refrigerant flowing through the variable throttling device, and the flow amount of refrigerant flowing through the throttling unit increases when the opening degree of the variable throttling device is decreased to reduce the flow amount of refrigerant flowing through the variable throttling device.

\* \* \* \* \*